US012135859B2

(12) United States Patent
Lee

(10) Patent No.: US 12,135,859 B2
(45) Date of Patent: Nov. 5, 2024

(54) PERVASIVE 3D GRAPHICAL USER INTERFACE

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 0 days.

(21) Appl. No.: 16/056,752

(22) Filed: Aug. 7, 2018

(65) Prior Publication Data

US 2020/0050342 A1 Feb. 13, 2020

(51) Int. Cl.
| | |
|---|---|
| *G06F 3/04815* | (2022.01) |
| *G06F 3/0484* | (2022.01) |
| *G06F 17/16* | (2006.01) |
| *G06T 19/00* | (2011.01) |

(52) U.S. Cl.
CPC ........ *G06F 3/04815* (2013.01); *G06F 3/0484* (2013.01); *G06F 17/16* (2013.01); *G06T 19/003* (2013.01)

(58) Field of Classification Search
CPC .............. G06F 3/04815; G06F 3/0484; G06F 3/04845; G06F 17/16; G06T 19/00; G06T 19/003; G06N 3/02
USPC .......................................... 715/50, 848, 850
See application file for complete search history.

(56) References Cited

U.S. PATENT DOCUMENTS

| | | | |
|---|---|---|---|
| 4,835,528 A | 5/1989 | Flinchbaugh | |
| 5,404,439 A * | 4/1995 | Moran | G06T 11/00 715/814 |
| 5,798,761 A | 8/1998 | Isaacs | |
| 5,825,945 A | 10/1998 | Stolis et al. | |
| 6,078,312 A | 6/2000 | Liebenow | |
| 6,389,154 B1 * | 5/2002 | Stam | G06T 17/20 345/582 |
| 6,392,632 B1 | 5/2002 | Lee | |

(Continued)

FOREIGN PATENT DOCUMENTS

| | | |
|---|---|---|
| EP | 1 113 385 | 7/2001 |
| EP | 1 473 623 | 11/2004 |

(Continued)

OTHER PUBLICATIONS

Chen et al., "Interactive-Motion Control of Modular Reconfigurable Manipulators", Proceedings of the 2003 IEEE/RSJ, Intl. Conference on Intelligent Robots and Systems, Las Vegas. Nevada. Oct. 2003, pp. 1620-1625. (Year: 2003).*

(Continued)

*Primary Examiner* — Hwei-Min Lu
(74) *Attorney, Agent, or Firm* — Saile Ackerman LLC; Stephen B. Ackerman; Rosemary L. S. Pike

(57) ABSTRACT

A three-dimensional graphical user interface (3D GUI) configured to be used by a computer, a display system, an electronic system, or an electro-mechanical system. The 3D GUI provides an enhanced user-engaging experience while enabling a user to manipulate the motion of an object of arbitrary size and a multiplicity of independent degrees of freedom, using sufficient degrees of freedom to represent the motion. During operation, the 3D GUI fetches positional data in absolute address mode and translational and rotational motion vector data from a unique 3D navigation device that uses color as a means of motion detection. The 3D navigation device transforms color index data to the 3D GUI through a matrix representation of the six degrees of freedom (DOF) of motion of an object.

15 Claims, 13 Drawing Sheets

(56) References Cited

U.S. PATENT DOCUMENTS

Figure 1A:
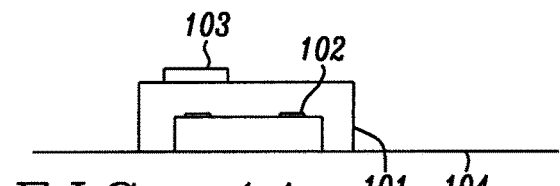

| | | | |
|---|---|---|---|
| 6,426,745 B1* | 7/2002 | Isaacs | G06F 3/04845 |
| | | | 345/619 |
| 6,697,053 B2 | 2/2004 | Kajihara | |
| 6,720,949 B1 | 4/2004 | Pryor et al. | |
| 6,844,871 B1 | 1/2005 | Hinckley et al. | |
| 7,019,733 B2 | 3/2006 | Koay | |
| 7,081,612 B1 | 7/2006 | Lu | |
| 7,161,682 B2 | 1/2007 | Xie et al. | |
| 7,301,531 B2 | 11/2007 | Wu | |
| 7,321,359 B2 | 1/2008 | Xie et al. | |
| 7,355,160 B2 | 4/2008 | Cheah et al. | |
| 7,439,954 B2 | 10/2008 | Theytaz et al. | |
| 7,656,395 B2 | 2/2010 | Pope et al. | |
| 7,872,639 B2 | 1/2011 | Theytaz et al. | |
| 7,924,266 B2 | 4/2011 | Larsen | |
| 8,077,147 B2 | 12/2011 | Krah et al. | |
| 8,279,279 B2 | 10/2012 | Hattori et al. | |
| 8,291,322 B2 | 10/2012 | Klappert et al. | |
| 8,527,896 B2 | 9/2013 | Matthews et al. | |
| 8,553,235 B1 | 10/2013 | Lee | |
| 8,736,561 B2 | 5/2014 | Anzures et al. | |
| 8,954,887 B1 | 2/2015 | Tseng et al. | |
| 9,113,077 B2* | 8/2015 | Mirzaei | G01C 21/206 |
| 9,189,254 B2 | 11/2015 | Kushman et al. | |
| 9,405,430 B2 | 8/2016 | Ullmann | |
| 9,690,446 B2 | 6/2017 | Forstall et al. | |
| 9,703,396 B2 | 7/2017 | Lee | |
| 9,720,525 B2 | 8/2017 | Lee | |
| 9,733,727 B2 | 8/2017 | Lee | |
| 9,904,874 B2 | 2/2018 | Shoaib et al. | |
| 10,255,716 B1* | 4/2019 | Godzaridis | G06T 17/20 |
| 11,024,065 B1* | 6/2021 | Baron | G06T 19/006 |
| 2004/0036721 A1* | 2/2004 | Anderson | H04L 41/0686 |
| | | | 715/848 |
| 2004/0088289 A1 | 5/2004 | Xu | |
| 2005/0168460 A1* | 8/2005 | Razdan | G06F 16/2428 |
| | | | 345/419 |
| 2006/0066572 A1 | 3/2006 | Yumoto et al. | |
| 2006/0132443 A1 | 6/2006 | Chien Wu | |
| 2007/0198581 A1* | 8/2007 | Nonclercq | G06F 30/00 |
| 2008/0036773 A1 | 2/2008 | Bae | |
| 2009/0102793 A1 | 4/2009 | Bohn et al. | |
| 2009/0153486 A1 | 6/2009 | Bohn | |
| 2009/0160772 A1 | 6/2009 | DePue et al. | |
| 2009/0262071 A1 | 10/2009 | Yoshida | |
| 2010/0001950 A1 | 1/2010 | Fouquet et al. | |
| 2010/0036393 A1 | 2/2010 | Unsworth | |
| 2010/0261526 A1 | 10/2010 | Anderson | |
| 2011/0128288 A1* | 6/2011 | Petrou | G06V 10/235 |
| | | | 345/428 |
| 2011/0234815 A1 | 9/2011 | Zahnert et al. | |
| 2011/0304541 A1 | 12/2011 | Dalal | |
| 2013/0002555 A1 | 1/2013 | Lee | |
| 2013/0241835 A1 | 9/2013 | Lee | |
| 2014/0201670 A1 | 7/2014 | Mallya et al. | |
| 2014/0354548 A1* | 12/2014 | Lee | G06F 3/0321 |
| | | | 345/166 |
| 2015/0127031 A1 | 5/2015 | Yagi et al. | |
| 2015/0149965 A1* | 5/2015 | Bakhash | G06F 3/04815 |
| | | | 715/836 |
| 2015/0276400 A1* | 10/2015 | Gonzalez-Banos | G06T 7/277 |
| | | | 348/169 |
| 2015/0317792 A1 | 11/2015 | Wiemker et al. | |
| 2016/0059412 A1* | 3/2016 | Oleynik | B25J 19/02 |
| | | | 700/250 |
| 2016/0063706 A1* | 3/2016 | Gonzalez-Banos | G06T 7/73 |
| | | | 348/222.1 |
| 2016/0188159 A1* | 6/2016 | Dayde | G06T 15/08 |
| | | | 715/782 |
| 2016/0225182 A1* | 8/2016 | Bosscher | G06F 3/04815 |
| 2017/0076194 A1* | 3/2017 | Versace | G06N 3/02 |
| 2017/0103584 A1* | 4/2017 | Vats | G06T 19/20 |
| 2017/0299676 A1 | 10/2017 | Anderson et al. | |
| 2018/0082119 A1 | 3/2018 | Zilberman | |
| 2019/0035149 A1* | 1/2019 | Chen | G06V 40/166 |
| 2019/0087020 A1* | 3/2019 | Robinson | G06F 3/0346 |
| 2019/0138194 A1 | 5/2019 | Ryan | |
| 2019/0354689 A1* | 11/2019 | Li | G06N 3/045 |

FOREIGN PATENT DOCUMENTS

| | | |
|---|---|---|
| EP | 1 804 154 | 7/2007 |
| WO | WO 2006/053271 | 5/2006 |
| WO | WO 2006/137077 | 12/2006 |
| WO | WO 2011/028620 | 3/2011 |

OTHER PUBLICATIONS

Fukumoto et al., "Hand-Centered Whole-Body Motion Control for a Humanoid Robot", Proceedings of 2004 IEEE/RSJ International Conference on Intelligent Robots and Systems, Sep. 28-Oct. 2, 2004, Sendai, Japan, pp. 1186-1191. (Year: 2004).*

Andujar et al., "Virtual Pads: Decoupling Motor Space and Visual Space for Flexible Manipulation of 2D Windows within VEs", IEEE Symposium on 3D User Interfaces 2007, Mar. 10-11, pp. 99-106. (Year: 2007).*

Bakari "The Development of a Multi-Arm Mobile Robot System for Nuclear Decommissioning Applications", thesis for the degree of Doctor of Philosophy in Science and Technology, Control and Instrumentation Research Group, Engineering Department, Lancaster University, Dec. 2008. (Year: 2008).*

Ru et al., "A Method of Reconstruction Building's 3D Model from Perspective Images", 2009 Second International Conference on Information and Computing Science, vol. 2, pp. 255-258, 2009. (Year: 2009).*

Khalid, "Understanding Scene Structure From Images", Thesis for the degree of Master of Science in Computer Science, University of Illinois at Urbana-Champaign, 2014. (Year: 2014).*

Orvalho, "Position Manipulation Techniques for Facial Animation", Thesis for Departamento de Ciencia de Computadores, Faculdade de Ciencias da Universidade do Porto, Jul. 2016. (Year: 2016).*

Terri Lively, "Are digital impressions REALLY the better choice?", published in https://www.dentalproductsreport.com/view/are-digital-impressions-really-better-choice, Aug. 2016. (Year: 2016).*

Big Commerce, "Understanding Impressions in digital marketing", published in https://www.bigcommerce.com/ecommerce-answers/impressions-digital-marketing/ recorded on Nov. 26, 2017. (Year: 2017).*

Chang et al., "Vanishing Point Extraction and Refinement for Robust Camera Calibration", Sensors 2018, 18, 63, pub. on Dec. 12, 2017 (Year: 2017).*

Educba, "Introduction to Neural Networks", May 13, 2020, from hhttps://www.educba.com/types-of-neural-networks/. (Year: 2020).*

Preetipadma, "Understanding Graph Neural Networks (GNNS): A Brief Overview", Feb. 8, 2021, from https://www.analyticsinsight.net/understanding-graph-neural-networks-gnns-a-brief-overview/. (Year: 2021).*

"Visualization of multidimensional and multimodal tomographic medical imaging data, a case study," by Yan Zhang et al., Philosophical Transactions of the Royal Society A, (2009) 367, Aug. 13, 2009, pp. 3121-3148.

Photonics Rules of Thumb, Optics, Electro-Optics, Fiber Optics, and Lasers, by John Lester Miller & Ed Friedman, McGraw-Hill Copyright 1996, ISBN 0-07-044329-7, pp. 297-298 and pp. 306-307.

Optics, Fourth Edition, International Edition, by Eugene Hecht, Adelphi University, Copyright 2002, Pearson Education Inc., Chapter 4, 11 pgs.

"Capacitive Proximity Sensing Using the FDC1004," by David Wang, Texas Instruments, Application Report SNOA928—Mar. 2015, 9 pgs.

"Determining Shape and Reflectance of Lambertian, Specular, and Hybrid Surfaces using Extended Sources," by Shree K. Nayar et al., International Workshop on Industrial Applications of Machine Intelligence and Vision (MIV-89), Tokyo, Apr. 10-12, 1989, pp. 169-175.

(56) References Cited

OTHER PUBLICATIONS

Labshpere, A Halma Company, Technical Guide, Reflectance Materials and Coatings, North Sutton, NH 03260 USA, Jan. 1, 1991, 25 pgs.
"Xerox PARC Develops Hyperspectral Imager," by Vladimir Koifman, Image Sensors World, Oct. 27, 2015, 4 pgs., http://image-sensors-world.blogspot.tw/2015/10/xerox-parc-develops-hyperspectral-imager.html.
European Search Report, Application No. 13368043.9-1972 / 2741179, Applicant: Wen-Chieh, Geoffrey Lee, Mail date: Mar. 31, 2015, 11 pgs.
"About BlueTrack Technology," Bluetrack Technology in a Computer Mouse/Microsoft Hardware, pp. 1-3, found: http://www.microsoft.com/hardware/en-us/bluetrack-technology, Sep. 14, 2011.
"Metamerism (color)," from Wikipedia, the free encyclopedia, pp. 1-4, http://en.wikipedia.org/wiki/Metamerism_(color), Jul. 14, 2011.
European Search Report, Application: No. 13 368 011.6-1959, Applicant: Wen-Chieh, Geoffrey Lee, Mail date: Nov. 8, 2016, 7 pgs.
"Hyperspectral imaging with a liquid crystal polarization interferometer," by Alex Hegyi et al., Copyright 2015 Optical Society of America, 13 pgs., Optics Express vol. 23, Issue 22, pp. 28742-28754 (2015), Received: Jul. 22, 2015, https://doi.org/10.1364/OE.23.028742.
"Ink-Paper Interaction, A study in ink-jet color reproduction," Linkoping Studies in Science and Technology Dissertations No. 806, by Li Yang, Apr. 2003, Linkoping University, Sweden, pp. 13 and 14, ISBN 91-7373-613-9.
"Sensing angular change through a small optical window," by Tim Poston et al., May 29, 2006, pp. 1-18, found: www.mit.edu/~srimano/papers/3DoFSensing.pdf.
"Sensing Linear and Angular Change Through a Small Optical Window," by Tim Poston et al., pp. 1-9, found Oct. 3, 2013, htp://www.mit.edu/~srimano/research/mushaca/SLA.htm.
Principles of Color Technology, Third Edition, by Roy S. Berns, John Wiley & Sons, Inc, New York, pp. 56-57, Copyright 2000.

Partial European Search Report, Application No. EP 14 36 8025, Search date: Feb. 27, 2015, Munich, 4 pages.
"Inside the Trackpad: a BlackBerry Science Lesson," Inside BlackBerry, The Offical BlackBerr Blog, found: BlackBerryBlog #Five TipFriday: #BlackBerry Social, Dec. 18, 2009, 2 pgs.
"HTC Touch Diamond vs. Samsung i900 Omnia: Head-to-Head," HTC Status, found: http://www.gsmarena.com/htc_touch_diamond_vs_samsung_i900_om . . . Jul. 2, 2008, 2 pgs.
"Brace yourself for the era of the 'fingermouse'," by Stephen Shankland, Deep Tech—CNET News, pp. 1-4, Mar. 25, 2010, found: http://news.cnet.com/8301-30685_3-20001191-264.html.
"Samsung Launches Optical Joystick Phone," by Allen Tsai, Dec. 20, 2006, found: http://www.mobiledia.com/news/54829.html, pp. 1-4.
"Review of CMOS image sensor," by M. Bigas, et al., Microelectronics Journal 37, Sep. 6, 2005, pp. 433-451, www.elsevier.com/locate/mejo.
"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.
"TwistMouse for Simultaneous Translation and Rotation," by Jacqui Hannagan, A dissertation submitted for the partial fultulment of the requirements for the degree of Bachelor of Commerce (Honours), at the University of Otago, Dunedin, New Zealand, Nov. 14, 2007 , pp. 1-117.
US Office Action, U.S. Appl. No. 16/164,928, Applicant: Wen-Chieh Geoffrey Lee, Mail date: May 14, 2020, 22 pages.
US Office Action, U.S. Appl. No. 16/164,928, Applicant: Wen-Chieh Geoffrey Lee, Mail date: Oct. 28, 2020, 9 pages.
US Office Action, U.S. Appl. No. 16/456,009, Applicant: Wen-Chieh Geoffrey Lee, Mail date: Mar. 9, 2021, 38 pages.
US Notice of Allowance, U.S. Appl. No. 16/164,928, Applicant: Wen-Chieh Geoffrey Lee, Mail date: Aug. 3, 2021, 13 pages.
US Notice of Allowance, U.S. Appl. No. 16/456,009, Applicant: Wen-Chieh Geoffrey Lee, Mail date: Sep. 1, 27, 2021, 12 pages.

* cited by examiner $$\overrightarrow{BB'} = \overrightarrow{b_1} + \overrightarrow{b_2} + \ldots + \overrightarrow{b_x} + \ldots \overrightarrow{b_n}$$

$$Tolerance\_relative\_motion = \sum Error_{b_x} = Error_{b_1} + Error_{b_2} + \ldots + Error_{b_x} + \ldots + Error_{b_n}$$

$$\overline{CC'} = (X_{C'}, Y_{C'}, Z_{C'}) - (X_C, Y_C, Z_C)$$

$$Tolerance\_absolute\_address = Error_C + Error_{C'}$$

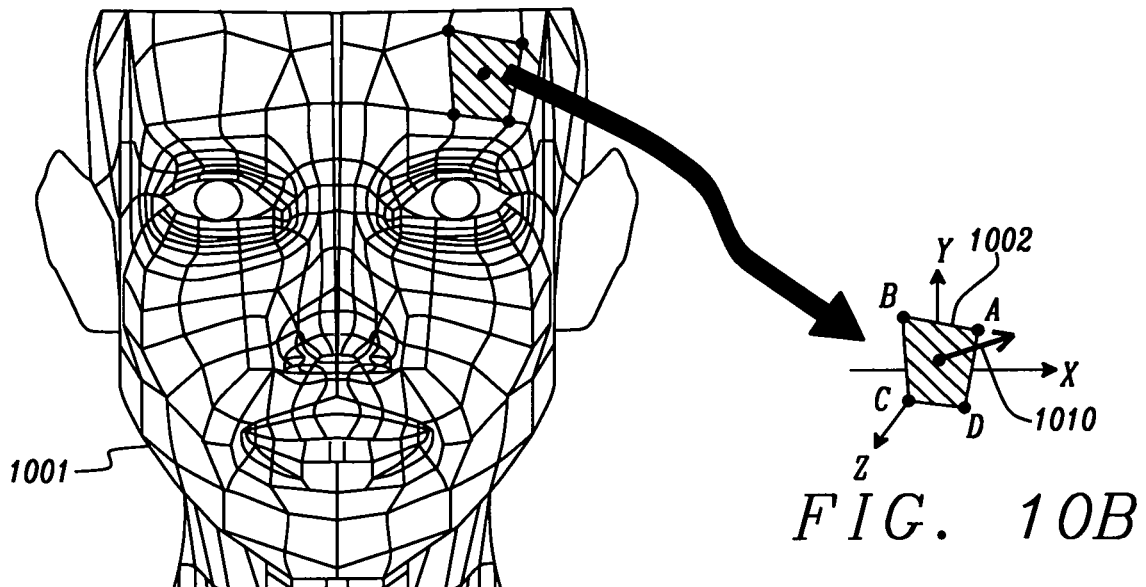
FIG. 10A
FIG. 10B
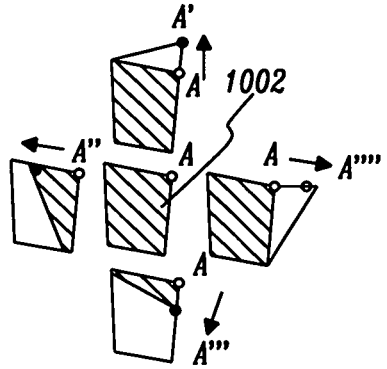
FIG. 10C
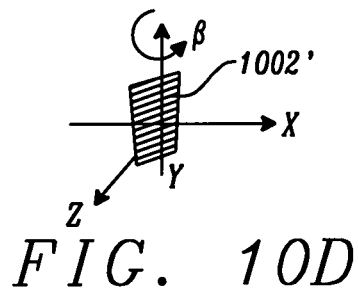
FIG. 10D
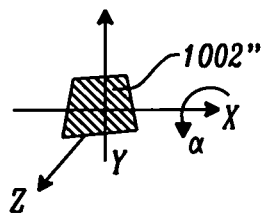
FIG. 10E
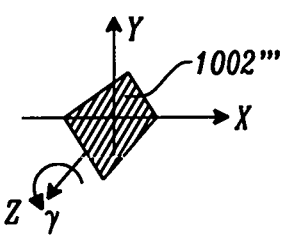
FIG. 10F
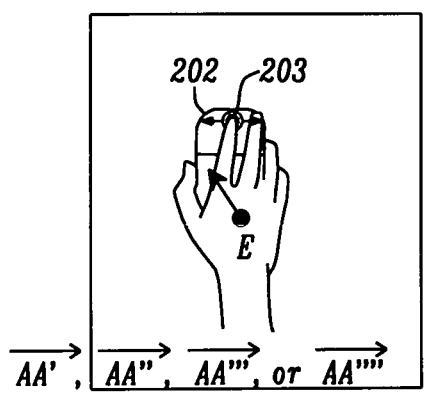
FIG. 10G

PERVASIVE 3D GRAPHICAL USER INTERFACE

1. RELATED APPLICATIONS

The present disclosure relates the following US patent applications and US patents, all of which are owned by the owner of the instant application, and all of which are incorporated by reference in their entirety: U.S. Pat. No. 9,720,525, filed on May 29, 2012, Ser. No. 13/834,085, filed on Mar. 15, 2013, U.S. Pat. No. 9,733,727, filed on Oct. 17, 2013, Ser. No. 14/294,369, filed on Jun. 3, 2014, U.S. Pat. No. 9,703,396, filed on Jul. 12, 2013.

2. TECHNICAL FIELD

The present disclosure relates to a three-dimensional graphical user interface (3D GUI) for a computer, an electronic display, a control system or an electro-mechanical system. The 3D GUI provides an absolute address and linear and non-linear motion vectors for describing the motion of a 3-dimensional (3D) object with at least three independent degrees of freedom and moving in accord with three-dimensional kinematics and visualized in a graphic rendering device.

3. BACKGROUND

A Graphical User Interface (GUI) generally denotes a software module embedded in an electronic system such as a computer or, more specifically, in its operating system, or embedded in one or more servers. The ultimate object of the GUI is to enable its user to engage with the graphical features presented in a displaying device associated with the electronic system, such as icons, menu bars, title bars or ribbons. A GUI can not only provide these graphical features to a user, but it can also provide the user with access to non-graphical functionalities, such as audio, speech recognition, fingerprint reading, intelligent agents, robotic manipulation, the use of advanced techniques of analysis such as machine learning or neural networks, the use of automated functions such as turning an electronic device on or off, or even surveying the habits/desires of a user. We consider a well-designed GUI to be one that engages its user(s) relatively easily, initiating many intuitive/direct interactions. For decades, the GUI of a computer has been in two-dimensional (2D) format (e.g. its icons, cursors, etc., are all in 2D format). With the arrival of the era of 3D digital graphics, there has been a corresponding need for the development of a user-engaging type of 3D GUI, allowing for new features such as moving a 3D cartoon character or manipulating a robot following the instruction of the user, all in an intuitive, direct, real-time, and intelligent manner. The prior arts disclose many approaches to improving the design and versatility of GUI's, but these efforts do not provide the capabilities to be presented herein. For example, Ullman (U.S. Pat. No. 9,405,430) discloses a GUI that includes a menu tree to reduce the distance that a cursor has to move during an instruction selecting process. Anzures (U.S. Pat. No. 8,736,561) discloses a method of adjusting properties, content or context of a graphical object. Tseng (U.S. Pat. No. 8,954,887) discloses a GUI that pops-up a new window when a touch-sensitive screen is pressed for an extended period of time. Kushman (U.S. Pat. No. 9,189,254) discloses an automated tool that can interact with a plurality of users on web server through the use of a GUI by each user. Fostall (U.S. Pat. No. 9,690,446) discloses a plurality of profiles of finger gestures that are detected by a touch-sensitive display panel to make the use of a GUI more intuitive. Matthews (U.S. Pat. No. 8,527,896) discloses a GUI having an icon that can be made to visually hover over other icons so that the user is informed that the position of his cursor is over that icon. Mohammed (U.S. Pat. No. 9,904,874) discloses a neural network system that provides a time-domain-to-frequency-domain converter for the input signals prior to extracting features from the input signals as a means of reducing the loading on the processors of the neural network system.

Figure 1B:
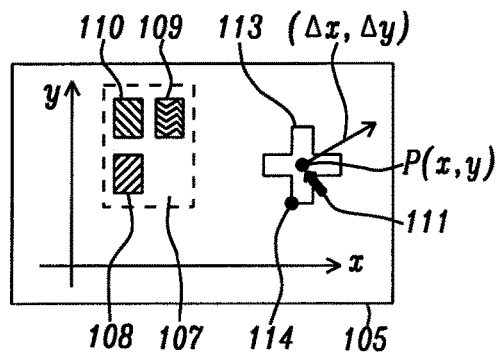
Figure 1C:
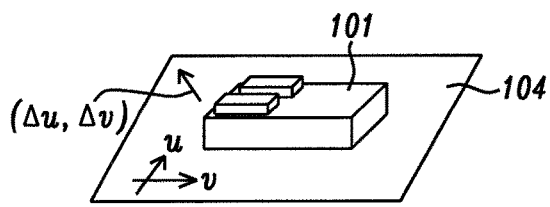
Figure 1D:
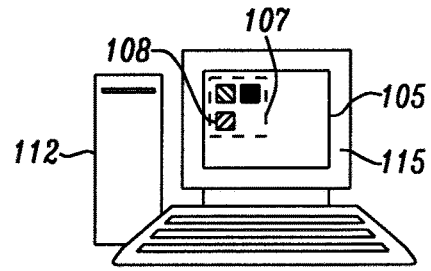

FIG. 1D schematically shows a conventional two-dimensional (2D) graphical displaying device (115) such as a monitor. FIG. 1D also shows that the GUI (105) that is applied to the displaying device (115) is also a 2D GUI. Correspondingly, as FIG. 1D further shows, the formats of the graphical features (e.g. icon 108) within that GUI (105) are also in a 2D format. Based on this 2D design correspondence, the motion vector provided by the conventional navigational device (such as a mouse) shown in FIG. 1A (101) is in 2D format as well, as further shown in FIG. 1C. During operation, a user moves a navigational device (101), such as a mouse, on a two-dimensional (2D) planar reference surface, such as a mouse pad or a desktop surface (104). The mouse (101) compares a series of images of the surface captured by its image sensor (102) as it moves along the reference plane (104) and sends relative motion vectors to the electronic system or to one or more servers (i.e., a group of servers linked by a network, such as the internet, or a means of equivalent effect). Upon the receipt of the motion vector data by the computer shown in FIG. 1D (112), the cursor, shown as (111) in FIG. 1B, will be moved on the 2D GUI (105) accordingly. In further detail, as FIG. 1C shows, when the mouse (101) is moved on a mouse pad or a desktop surface (104) by a 2D motion vector with components (Au, Av), it creates a corresponding positional motion vector (Ax, Ay) of the cursor (111) that appears on the 2D GUI (105). When a conventional 2D navigational device (101) is used by a 3D GUI, such as the one that will be described herein and which is pictured schematically for reference hereinafter as (207) in FIG. 2A, several technological challenges will be encountered: first, a significant amount of CPU (central processing unit) or GPU (graphic processing unit) power will be consumed by the matrix (i.e., array, tensor) transformation process required for the 2D mouse data to be converted to a 3D format for the subsequent use by the 3D GUI. Secondly, perhaps even more importantly, the conventional 2D mouse (101) cannot provide the angular displacement data for a 3D GUI which would be needed to move the fanciful Genie (204) about. Lastly, there is a major limitation on the conventional 2D navigational device (101) in that it lacks a comprehensive means to provide a depth value (z).

4. SUMMARY

To address the shortcomings cited above, it is an object of the present disclosure to provide a "pervasive" (i.e., comprehensive and fully integrated) 3-dimensional graphical user interface (3D GUI) for a computer, electronic control system, or electro-mechanical system that enhances the user's engagement experience by allowing the user to manipulate the motions of an object by sufficient degrees of freedom, regardless of its size, e.g. from an object as small as a single pixel to one that is as large as a network of computers. For all future reference herein, the 3D GUI provided by this disclosure is the one represented schematically as (207) in FIG. 2A. It will hereinafter simply be referred to as "the presently disclosed 3D GUI" or, more simply, the 3D GUI.

To achieve the above object, the 3D GUI will provide absolute addresses and linear and non-linear motion vectors for a 3D object, enabling a user to gain an extraordinary and "transparent" experience of engaging directly with that 3D object so that there is no conscious experience that a GUI is being used. Further, when providing input to the 3D GUI by using the high resolution and high sensitivity 3D navigational device, whose functionality is fully disclosed by, U.S. Ser. No. 14/294,369 (and further discussed below), the presently disclosed 3D GUI will provide its fullest capabilities and advantages. It will then be able to provide an absolute address for an object and the positional accuracy of that object will be kept constant during the entirety of its motion, instead of the accuracy of the motion continually deteriorating as a result of successive approximations. This motional accuracy is a result of the 3D navigational device being moved on a specially tinted reference surface. Still further, the presently disclosed 3D GUI can provide a 2.5D coordinate system (a 2D system with a separate rotational axis) to help the user learn by interacting with 3D scenery, i.e., renderings that are created using 3D vector graphics. By manipulating a perspective angle by moving a world space camera (i.e., perspective camera) using linear and non-linear motion vectors in six degrees of freedom, the 3D GUI is able to classify a plurality of 3D graphical vectors into several classes, i.e., the basic graphical entities that are used to construct the 3D vector graphics and/or 3D motion vectors selected for denoting the levels of user engagement.

5. BRIEF DESCRIPTION OF DRAWINGS

Figure 2A:
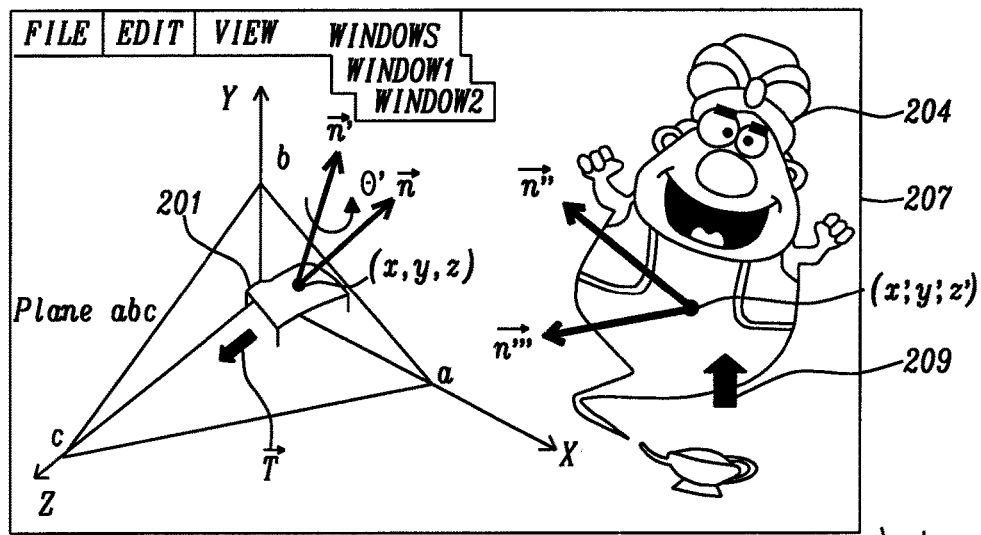
Figure 3A:
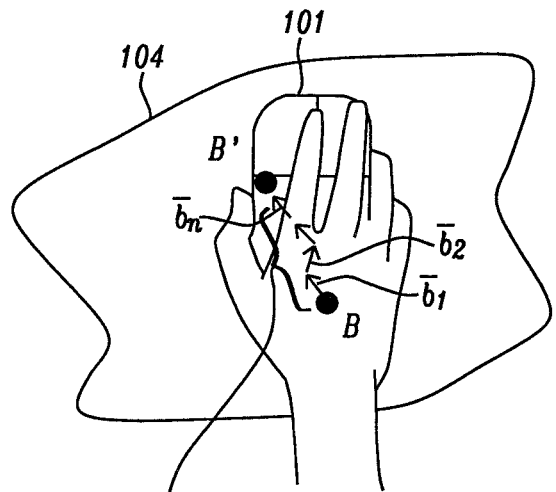
Figure 3B:
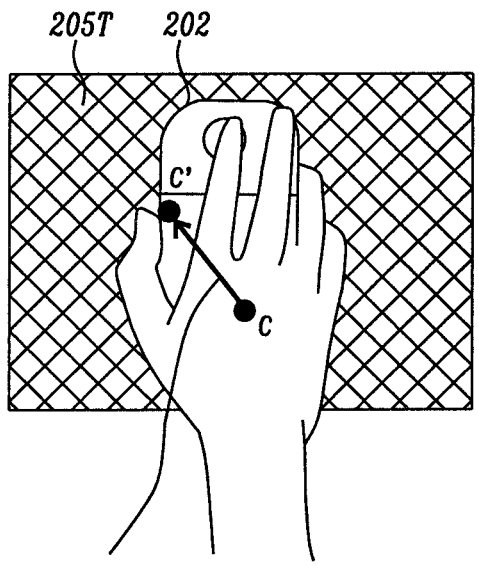
Figure 5A:
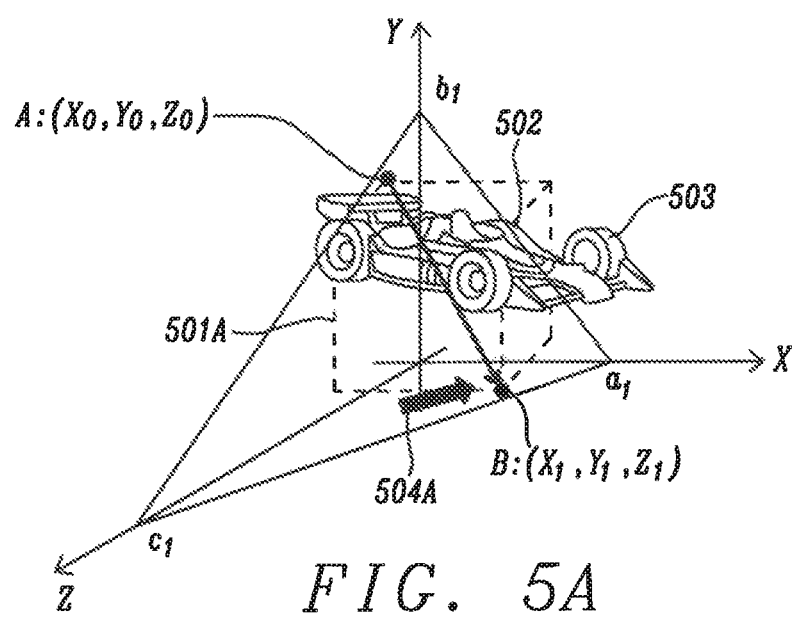
Figure 5B:
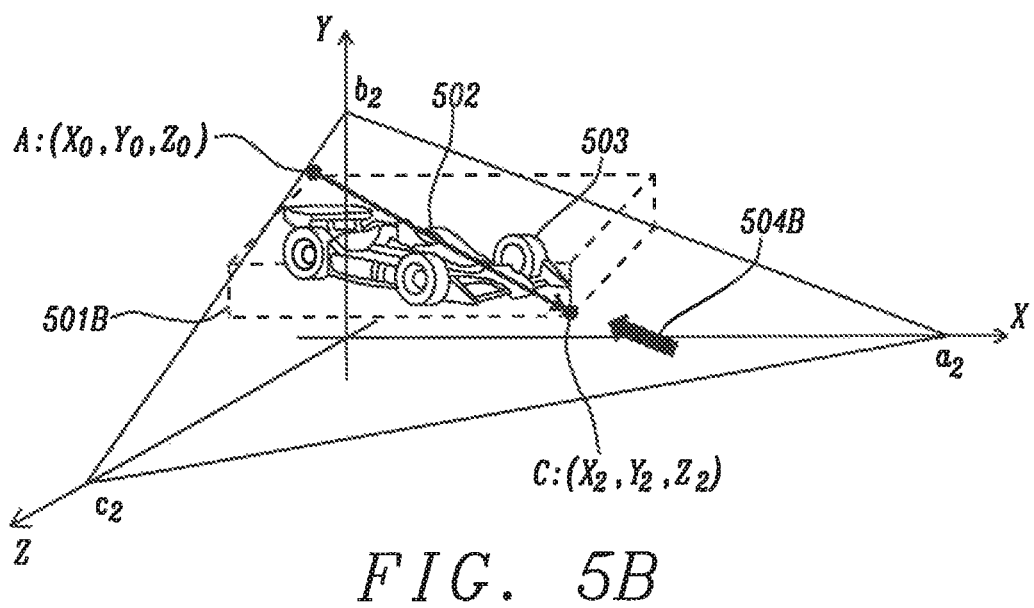
Figure 6A:
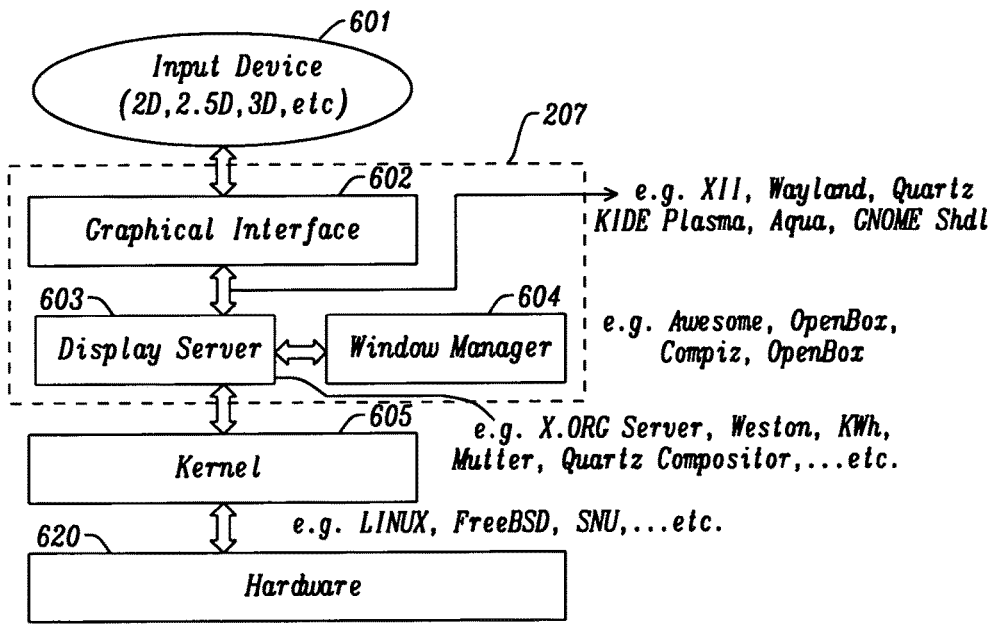
Figure 6B:
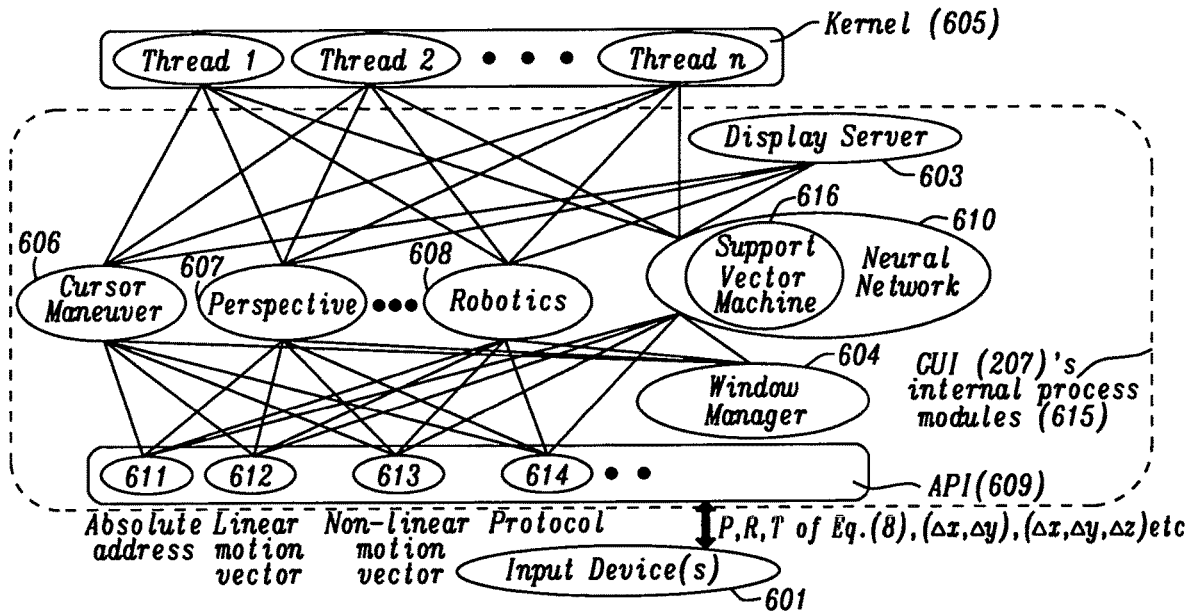
Figure 7A:
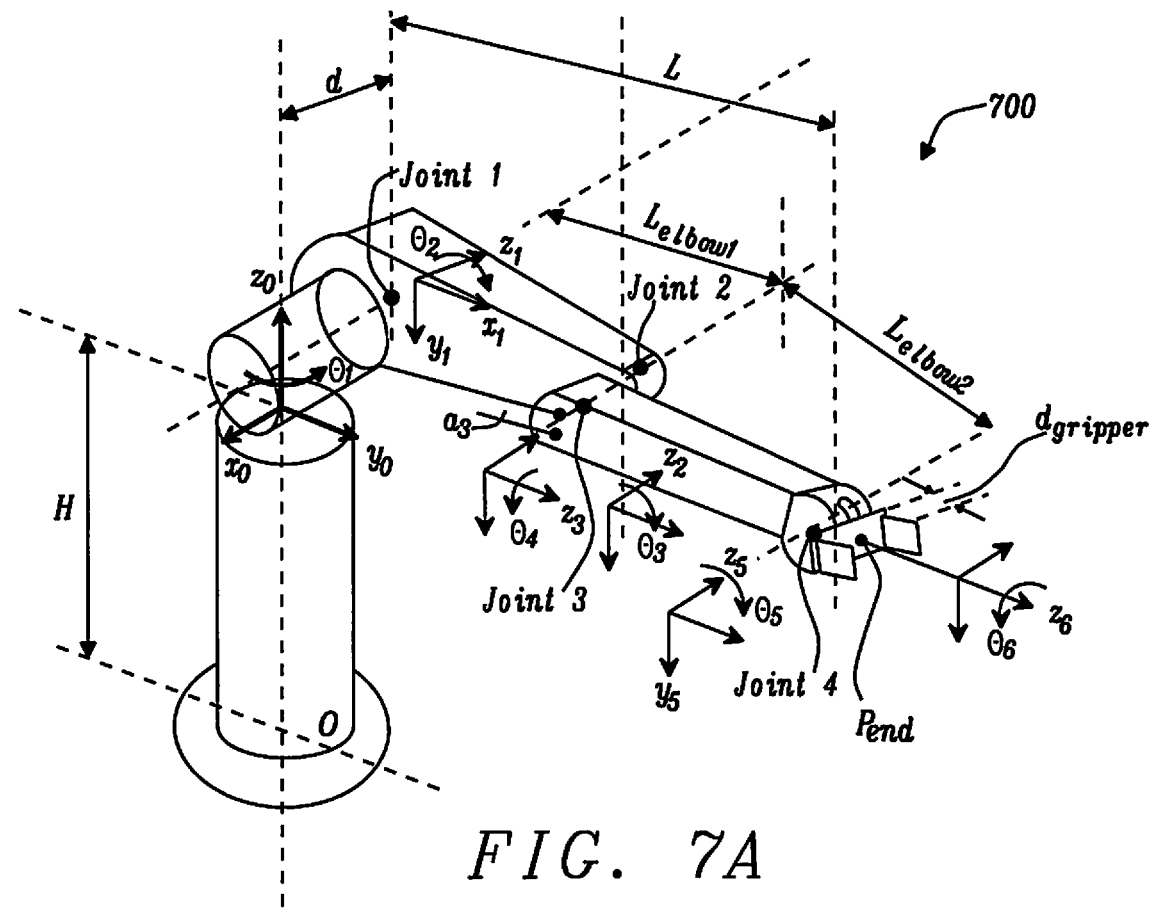
Figure 7B:
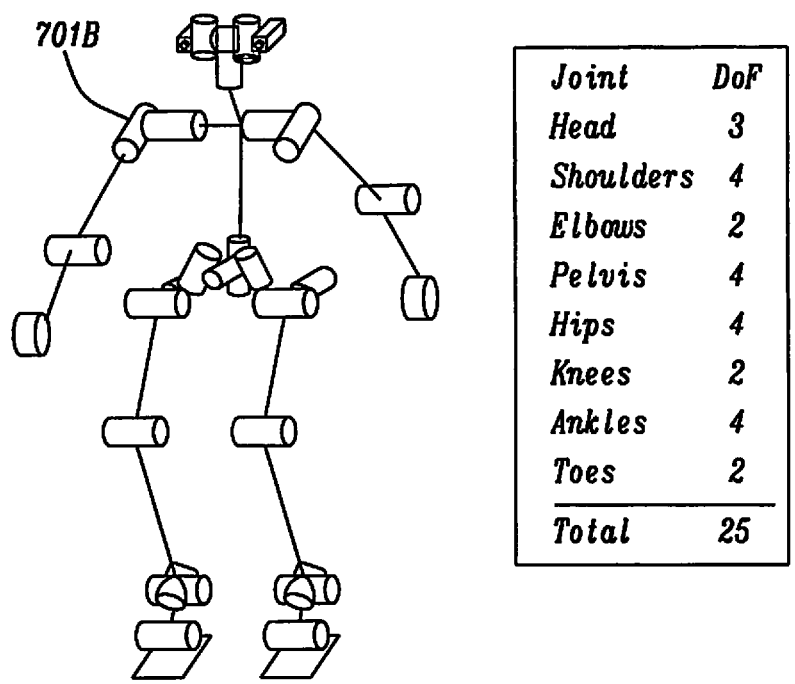
Figure 8A:
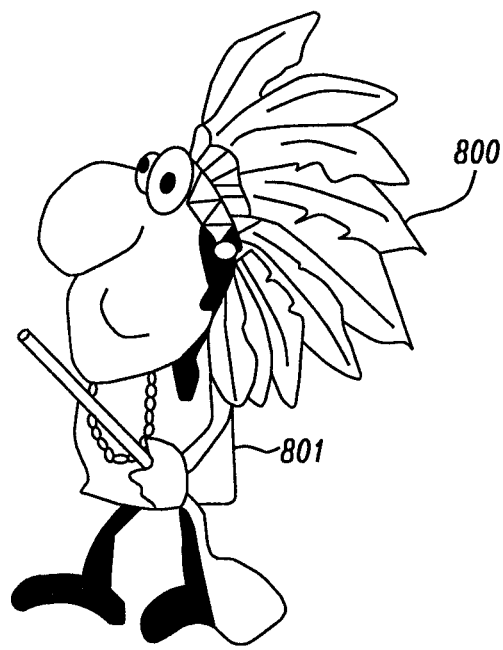
Figure 8B:
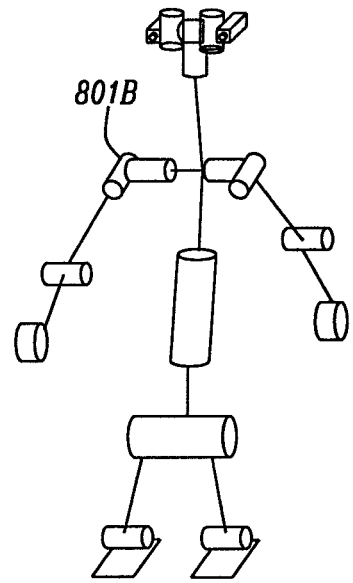
Figure 9:
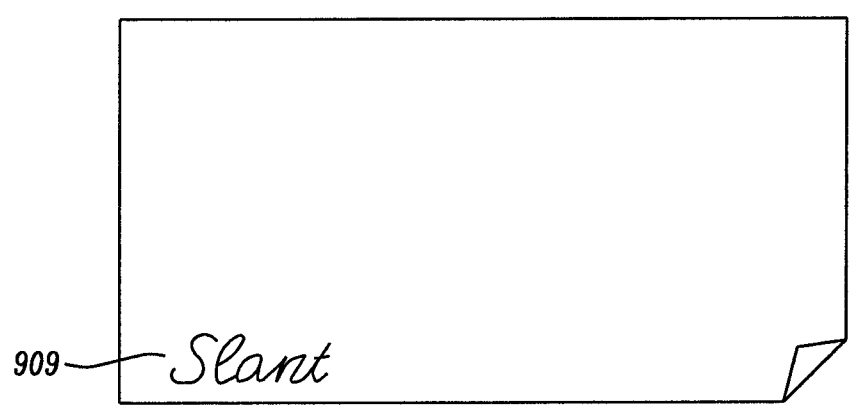
Figure 10H:
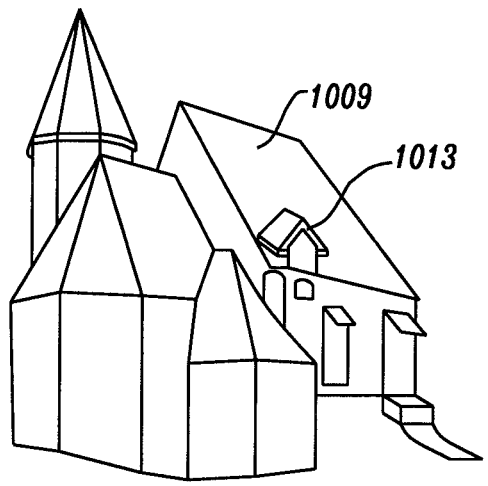
Figure 10I:
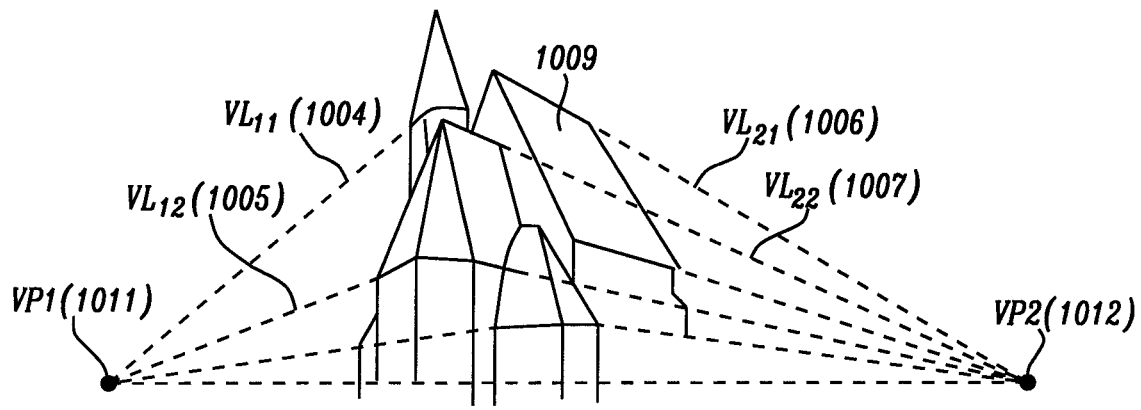
Figure 10J:
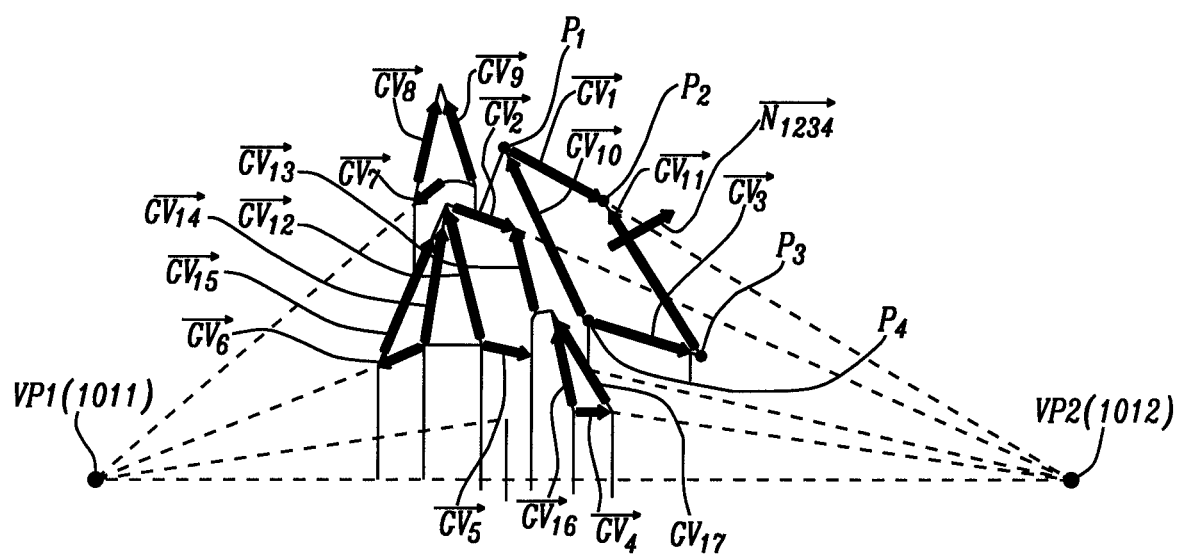

FIGS. 1A, B, C, and D schematically depict elements associated with a conventional 2D GUI that uses a 2D navigational device to maneuver a cursor;

FIGS. 2A, B, C, and D schematically depict elements associated with the presently disclosed 3D GUI that uses a unique 3D navigational device to provide 3D motion vectors for an object by six degrees of freedom (DOF);

FIG. 3A schematically depicts a typical integration process of a relative motion detection device, e.g. conventional navigational device, to derive its position;

FIG. 3B schematically depicts a typical process of deriving motion vector of an absolute address detection device, i.e., the presently disclosed 3D navigational device (202) being placed on a tinted reference surface (205T);

FIG. 4A-4E schematically depicts the performance of state of art motion detecting devices, e.g. depth camera, virtual reality headset, touch-sensitive displaying panel, etc.;

FIGS. 5A and 5B schematically depict a unique method that is developed by the presently disclosed device to select a 3D object in space reliably; the method has to do with designating a rotational plane for a 3D cursor;

FIG. 6A schematically shows layers of the 3D GUI based on a windowing system, in which a specific GUI layer may be positioned between the input device and the kernel of an operating system, designed for controlling user's viewing experience; several vendors in this market segment are also listed;

FIG. 6B schematically shows application interface (API) that bridges different types of input devices with the presently disclosed 3D GUI;

FIG. 7A schematically shows a robot that can be directly manipulated by the presently disclosed 3D GUI;

FIG. 7B schematically shows a Humanoid using 25 degrees of freedom to generate various kinds of motions;

FIG. 8A schematically shows a cartoon character that uses a simplified Humanoid skeleton to generate motions;

FIG. 8B schematically shows the robotic structure of the cartoon character shown in FIG. 8A, which uses fewer joints as compared to those of FIG. 7B to generate motions;

FIG. 9 schematically shows that a signature is actually an outcome of a plurality of hand motions generated by the neural network signals of the hand;

FIGS. 10A, B, C, D, E, F and G schematically show that the pattern of a patch of a polygon network can be manipulated by the translational motion of the corner points as well the rotational motions of the vertex;

FIGS. 10H, 10I, and 10J schematically show that by aligning some of the graphical vectors in 3D scenery, the present 3D GUI makes the scenery more comprehensible to the viewer.

Figure 11A:
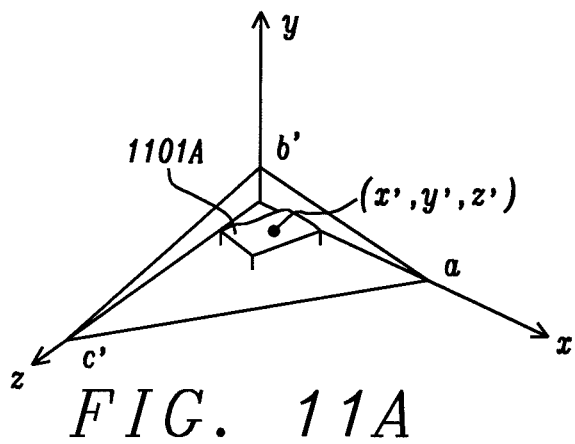
Figure 11B:
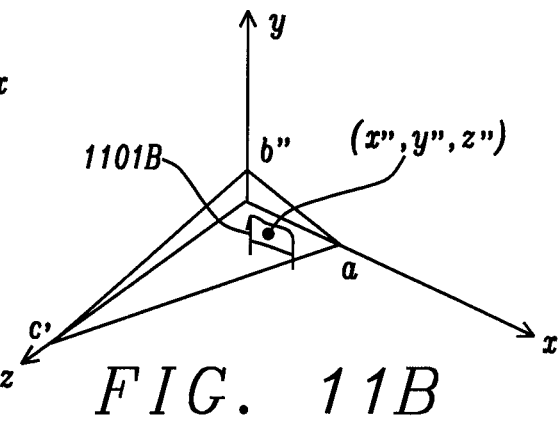
Figure 11C:
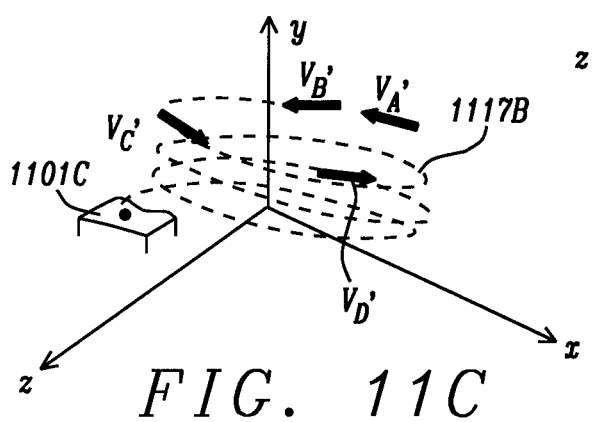
Figure 11D:
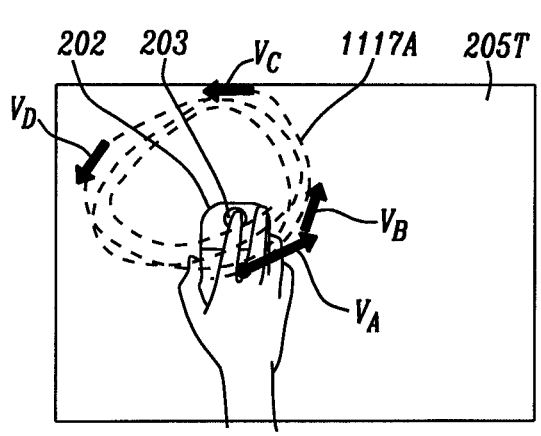
Figure 11E:
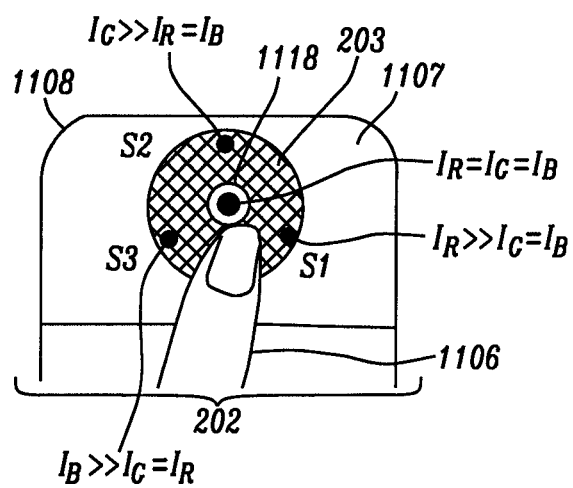
Figure 12:
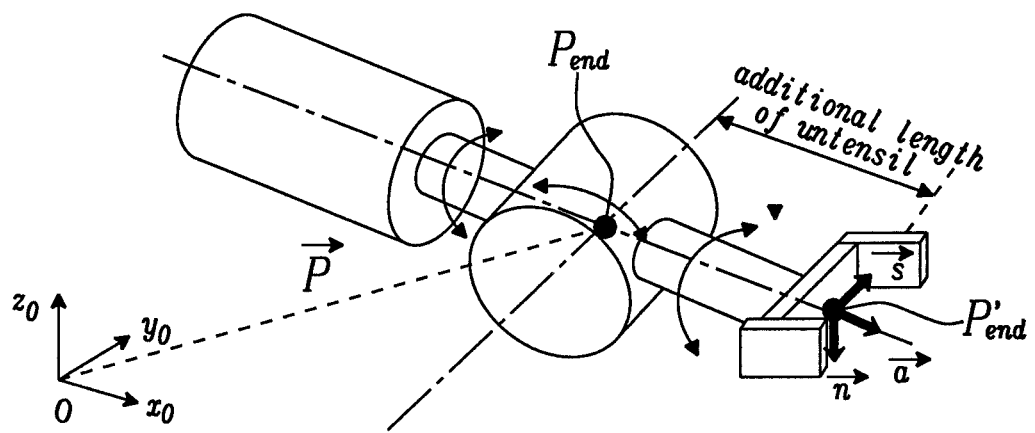
Figure 13A:
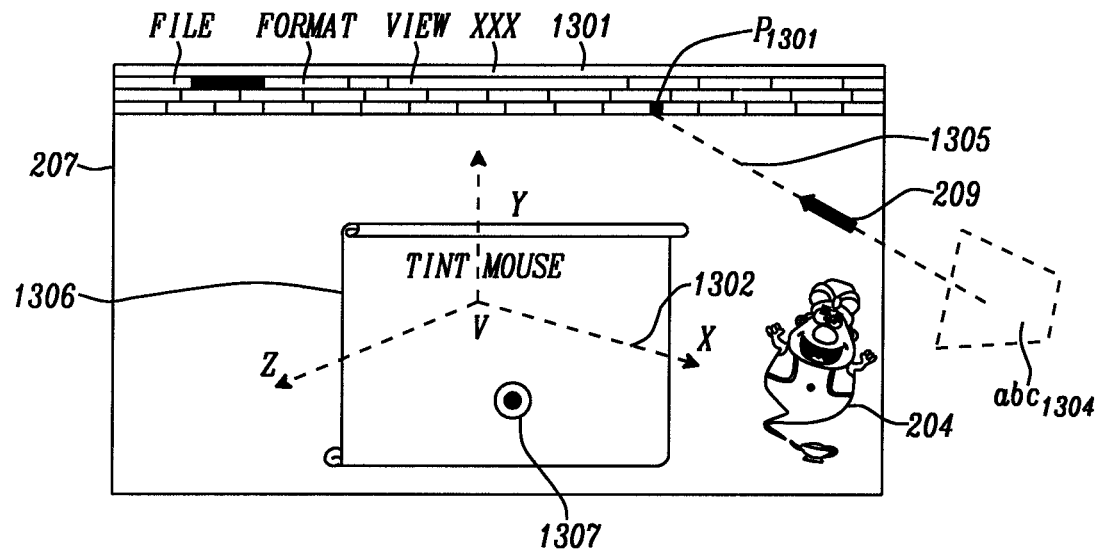
Figure 13B:
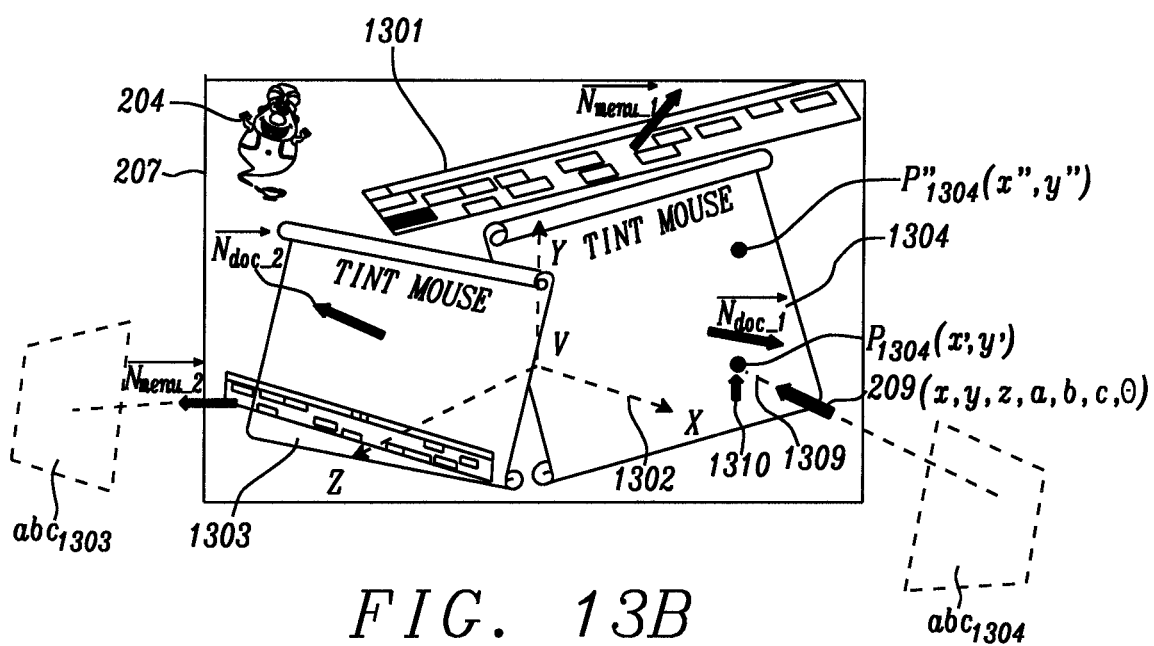

FIGS. 11A and 11B schematically depict how the rotational plane abc is changing the gesture of an object;

FIGS. 11C and 11D schematically show a unique situation that a spiral can be created by a rotating motion of the presently disclosed 3D navigational device while its illumination is varying concurrently (e.g. the intensity of one light source is dimming);

FIG. 11E schematically shows how an operator changes the gesture, i.e., tilting condition, of an object by moving his/her finger to different locations on the gesture sensing plane (203) of the presently disclosed 3D navigational device;

FIG. 12 schematically shows the position and motion vectors of a robot's gripper; the effective length of the gripper is increased by the length of the utensil it holds;

FIGS. 13A and 13B schematically demonstrate that the presently disclosed 3D GUI can work seamlessly with the conventional 2D windows (e.g. Microsoft® WORD); the fundamental merit of the 3D cursor generated by the presently disclosed 3D GUI justifies the presently disclosed GUI as a pervasive 3D one.

Figure 14:
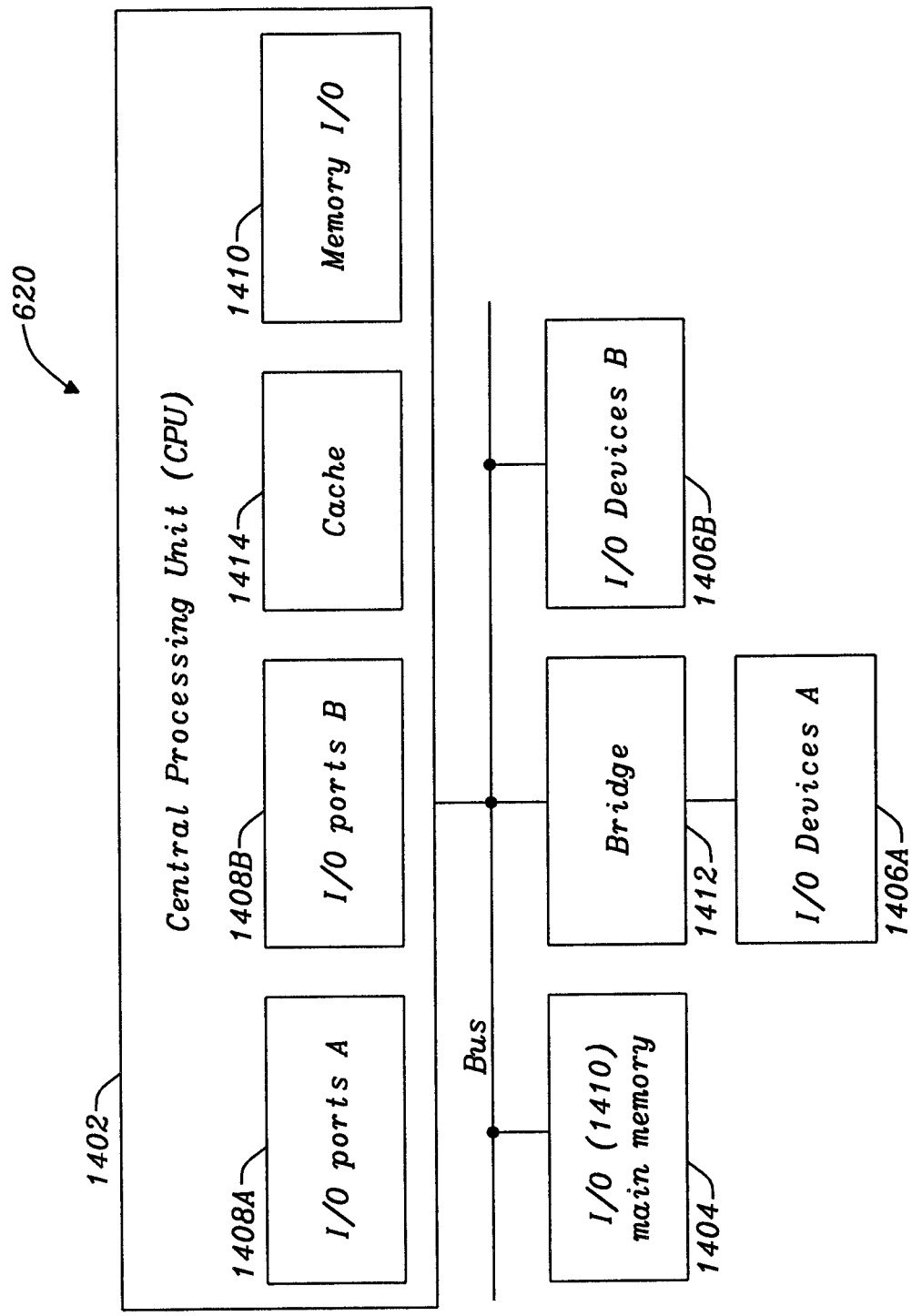

FIG. 14 illustrates a hardware environment in which the 3D GUI of the disclosure operates.

6. DETAILED DESCRIPTION

As stated above, the present disclosure describes a three-dimensional (3D) graphical user interface (3D GUI) of an electronic system, such as a computer, shown schematically in FIG. 2A as 207. This device provides the absolute address and linear and non-linear motion vectors for a 3D object, which gives its user the experience of engaging directly with that 3D object. Over years of technological development, the GUI of the prior art has evolved so as to provide many types of "outlooks" (i.e., general forms of visual presentation) and special features such as hovering icons and cursor "snapping". If judged by the general outlook it provides, a GUI can be largely categorized by the degrees of freedom (DOF) imparted to the object it presents, e.g. 2D, 2.5D, or 3D (2.5D hereinafter means 2D format with a separate rotational axis capability). However, from the perspective of how it can reinforce a user's experience of engagement and learning, the performance of a GUI is not only a function of the overall outlook it provides, but also includes the more subtle and complex combined effects resulting from software and hardware engineering. For example, when an icon is displayed by a GUI as hovering, the viewer might assume that the GUI has a true 3D rendering capability; but when the viewer discovers that the GUI cannot maneuver the hovering icon in a 3D manner, there is the sad realization that it is the full interaction between a GUI and its user that determines the ultimate capabilities and value of that GUI, not superficialities. Cursor "snapping" is another example; it was a mechanism originally designed to let a computer compensate for the positioning inaccuracy problem of a conventional navigational device, which is a generic problem with all relative motion detection devices. When a modern (although still prior art) GUI is equipped with a touch-sensitive feature, however, it has the capability of accessing icons by absolute address. As a result, snapping becomes a feature of less importance and the above stated cursor position inaccuracy problem turns out to be of historical interest only, one that has mostly affected the conventional navigational device (101 of FIG. 1A).

Recently, the growth of the entire GUI industry has slowed. Occasionally when a new input device was introduced to the market, the performance of the GUI could be improved to some extent by using it; nevertheless, dramatic changes have rarely been a hallmark of the GUI industry. As the electronic industry entered the 3D graphics era more fully in recent years, its evangelists acclaimed that an upheaval of the electronic industry was imminent. In accord with that anticipation, new "gimmicky" devices, such as eye glasses with an embedded depth camera and virtual reality (VR) headsets emerged in the market. Unfortunately, as of yet the anticipated revolution has not occurred. In the present disclosure, we point out that some fundamental issues such as how a 3D GUI engages with a user in a comprehensive and realistic manner must be addressed before the anticipated revolution in the electronic industry can arrive. It is an object of this disclosure to complete the evolutionary journey of GUI technology and provide a genuinely user engaging 3D GUI.

6.1 Directly Fetching an Absolute Address from a Navigational Device is an Effective Way to Avoid Accumulating Positional Errors Most computer users have had the experience that the performance of a GUI becomes better and better as the peripheral functionalities of the computer operating system themselves improve, but few have acquired the deeper understanding of this phenomenon that can be provided by the fundamental physics explaining exactly how a GUI engages more completely with a user. When the computer mouse was first introduced, it was a relative motion detection device, knowing nothing about its absolute position on a reference surface. Due to that limitation, an operator had to move the mouse on a reference surface step by step, as if by crawling, in order to steer the cursor on the screen to some desired final destination. Such a process may not be as accurate as expected. To make the process of cursor maneuvering more efficient, the later versions of Microsoft® Windows operating systems (e.g. Windows 10, etc.) have developed a new feature that allows a cursor to be automatically placed at some designated positions (i.e., "snapping"). This feature reduces, by a significant amount, the energy and time required to crawl the cursor on a GUI in many little steps. This does not necessarily mean that a high-performance GUI can simply take and use the input data from a complex navigational device such as an EM (electromagnetic) tracker, depth camera, accelerometer, or laser associated navigational device. In the end, it is the basic means of positioning and maneuvering (e.g. absolute addressing, providing translational motion vector and rotational motion vector simultaneously, etc.) that makes the presently disclosed 3D GUI (e.g. 207 in FIG. 2A) more interactive (i.e., more engaged) with the user. To achieve this object, the present 3D GUI works with a unique 3D navigational device (202 in FIG. 2B) which is disclosed in NU11-009 Ser. No. 14/294,369 and fully incorporated herein by reference. It is the collaboration between the present 3D GUI and that 3D navigational device that makes a computer or electronic system a truly user-engaging one. Although other navigational devices may also be used with the presently disclosed 3D GUI, the performances obtained are usually inferior to that provided by collaboration between the 3D GUI (207 in FIG. 2A) and the 3D navigational device (202 in FIG. 2B).

It is, therefore, an aspect of the presently disclosed 3D GUI that, in combination with the high resolution and high sensitivity 3D navigational device discussed above, the presently disclosed 3D GUI is able to provide an absolute address for an object. As a result, the positional accuracy of the corresponding cursor/object will be maintained, rather than being continually deteriorated, while the 3D navigational device is being moved on a specially tinted reference surface (e.g. 205T of FIG. 2D). "Snapping" is not required.

6.2 Treating a Graphical Object as a Realistic Entity Rather than a Mathematical Point is One of the Features of the Presently Disclosed 3D GUI A further aspect of the presently disclosed 3D GUI is its capability of simultaneously providing the translational (i.e., linear) and rotational (non-linear) motion vectors for an object. A current state of the art GUI lacks a direct means to combine the translational and rotational motion vectors of an object in a comprehensive manner because it treats the object as a mathematical point (note that while a "point" is a mathematical idealization and a "dot" is a pictorial means of representing a "point", we will use both terms interchangeably herein and note if a distinction is required). Readers of the present disclosure need hardly be reminded that nearly all objects that move in the real world, simultaneously execute both translational and rotational motions. Quite simply, real objects are not "points" and they have physical extension. A 3D GUI that is intended to provide a lifelike and fully engaging experience for the user must, therefore, provide an easy and comprehensive means to manipulate these two simultaneous motions of real objects. In the past, this issue has been hidden by a conventional 2D GUI. In a conventional 2D GUI, the position of an object is denoted by 2D coordinate parameters, e.g. (X, Y); correspondingly, the motion vector of a 2D object is denoted by a 2D parameters as well, e.g. the changes in the coordinate parameters, ($\Delta X$, $\Delta Y$). Thus, using a 2D navigational device such as the conventional navigational device (e.g., a mouse) to provide a 2D motion vector (e.g. $\Delta X$, $\Delta Y$) for an object, one must somehow confront the technical requirement of maneuvering an object in the 2D GUI. When 3D GUI are more common (ushered in by the present 3D GUI), the fortunate "coincidence" that there are the same number of degrees of freedom in positional space and motion vector space, will no longer exist. In short, a 3D object not only can translate, but also can rotate and usually does both simultaneously. Mathematically, there are three degrees of freedom of translational motion in a 3D coordinate system (i.e., $\Delta X$, $\Delta Y$, and $\Delta Z$), and the number of degrees of freedom of a rotational motion in 3D coordinate system is also three (e.g. $\alpha$, $\beta$, $\gamma$ of FIG. 4B). When combining the two types of motions, a 3D GUI must be able to provide six degrees of freedom for the motion of an object in order to maneuver it in a 3D space with complete freedom. Similarly, a 3D navigational device meant to be used with the 3D GUI must also be able to provide six degrees of freedom to the 3D GUI in order to maneuver an object in a 3D space freely. These two requirements have not previously been addressed in the conventional art.

In a conventional 2D GUI, a tiny object can be represented by a graphical entity as small as a pixel (or, voxel). At this minimal scale of dimension (i.e., pixel, voxel), the corresponding object is treated as a mathematical point (or graphical dot) by the conventional (prior art) GUI; note that a point does not have any characteristics pertaining to extension (volume) or directionality. By adopting this fundamental design rule, the prospect of rotational motion has been literally discarded by the conventional 2D GUI. If a situation requires a conventional 2D GUI to rotate an object, then, as FIG. 1B shows, the conventional 2D GUI has to do the rotating in a cumbersome and indirect way. Referring now to FIG. 1B, the motion of a cursor (111) in a conventional GUI (105) is denoted by a translational motion vector ($\Delta x$, $\Delta y$); note that there is no rotational component imparted into the motion of the cursor (111). Occasionally, when an application requires a user to provide a rotational motion vector for an object that is larger than a pixel (e.g. the cross 113), the conventional GUI does not have any direct means to do it; it has to go through some indirect processes such as dragging a point (114) that has departed from the pivot point P (x, y) by a distance; then, using linear algebra, the conventional GUI is able to derive the rotational angle. From the above, it can be seen that manipulating an object in a GUI by the arbitrary means of deriving the rotational motion vector (e.g. not knowing the distance between the pivot point P and the dragging point 114) may lead to unpredictable results. Different means of manipulating the object can lead to different combinations of its translational and rotational motion vectors. As one sees from the above, in a realistic 3D GUI, such as the present one, the above phenomenon is just one small part of a larger situation since most of the objects in the 3D world are moving with both translational and rotational motion vectors simultaneously. There are still other technological issues in the conventional GUI when a motion involves rotation. If a GUI design engineer does not have a decent knowledge of fundamental physical laws (i.e., that literally all 3D objects have rotational motions), they may easily encounter the pitfall of the conventional 2D GUI without realizing it, namely giving up the feature of rotating an object as small as a pixel/voxel. The following is an example; it shows how a cursor maneuvering process affects the fundamental performance of a 3D GUI that requires the rotational motion and directionality of a cursor.

6.3 Using the 3D GUI to Engage with a Plurality of 3D Objects at a Single Time

Referring again to FIGS. 1B and 1C, the above described rotating process of an object (e.g. rotating the cross 113) has an unfortunate feature: during the course of rotating that object 113 (e.g. by dragging a point 114), the cursor (111) itself is not rotating. In the next generation of such electronics, that feature will not satisfy the demand for a highly user engaging 3D GUI. Today, it is a common situation that a user may want to engage with more than one icon/object at a time. When doing so by using a conventional 2D GUI, as FIG. 1A shows, the operator may press down a mouse button (e.g. 103) and drag the mouse body (101) on a mouse pad or desktop surface (104) in a slantwise direction over a distance, thereby several icons (i.e., 108, 109, and 110) can be enclosed by a rectangular box (still a 2D object), which is typically drawn by dashed lines (107). Contextually, this indicates that the icons/objects enclosed in box (108), (109), and (110) specifically, have been selected for the subsequent processes of the electronic system (112 in FIG. 1D). Compared to the original GUI invented decades ago, having no cursor dragging capability, the above feature (i.e., allowing a user to engage with multiple objects simultaneously) denotes a higher level of user engagement. When a device engineer tries to extend that capability from a 2D GUI to a 3D GUI, he/she has to develop a means of engaging a group of 3D objects by designating a specific 3D volume in the space. Such a process is desired to be similar to the standard operating process of the conventional 2D GUI, i.e., maneuvering a 3D cursor in a 3D GUI by dragging a unique navigational device such as the 3D navigational device (202 in FIG. 2B) over a reference surface (205 in FIG. 2D). In this respect, FIGS. 5A and 5B show a solution. Note carefully that in order for an operator to designate a rectangular volume in the 3D space (e.g. box 501A), as FIG. 5A shows, one has to drag the cursor (504A) along the diagonal line ($\overrightarrow{AB}$) of the rectangular volume (501A). As FIG. 2A shows, based on the fundamental design rule of the presently disclosed 3D GUI (207), this cursor dragging process requires designating a specific rotational plane (i.e., plane $a_1b_1c_1$, in FIG. 2A hereinafter is called the rotational plane) for the cursor (504A in FIG. 5A) to crawl on. Using the presently disclosed navigational device (202), the task of designating such a rotational plane is delegated to the gesture (or appearance) sensing feature (203). The prior art navigational device (mouse) does not have any feature dedicated to this task (i.e., tilting the gesture of the cursor). FIGS. 5A and 5B show that selecting different rotational planes may lead to different rectangular volumes (i.e., the shape and sizes of 501A and 501B are different); such a difference can be readily seen by the diagonal lines (i.e., $\overrightarrow{AB}$ and $\overrightarrow{AC}$) of the rectangular volumes (501A, 501B) of FIGS. 5A and 5B. Specifically, the rotational plane $a_1b_1c_1$ denotes the rectangular volume (501A), which is created by the diagonal line ($\overrightarrow{AB}$); the rotational plane $a_2b_2c_2$ denotes the rectangular volume (501B), which is created by the diagonal line ($\overrightarrow{AC}$). Comparing the shapes and dimensions of the two rectangular volumes, one realizes that only volume (501B) is able to enclose the racing car (502) completely (as an evidence, note that wheel 503 is enclosed by the rectangular volume 501B). On the other hand, the volume created by the rotational plane $a_1b_1c_1$, (i.e., 501A) only partially encloses the racing car 501 (note that wheel 503 is not enclosed by the rectangular volume 501A). If a GUI design engineer is not aware of the fundamental characteristic of the presently disclosed 3D GUI, the above advantageous ability of dragging the 3D navigational device (202) along a specific rotational plane in a 3D space will be lost, inadvertently. In fact, this problem has been endemic in most of the navigational devices and GUIs in today's market. In accord with this commonality, today we see many graphical sketching programs relying on two devices/processes to perform one task as described above, e.g. it requires the combined, separate actions of a rotational knob and a conventional 2D navigational device to get the job done. The fundamental product design rule of these kinds of devices/processes stipulates that a 3D object is always treated as a mathematical point regardless of its size (e.g. from one that is as small as a pixel to one that is as large as the whole screen, etc.). Lacking an in-depth understanding of the fundamental physical properties of a real 3D object, the prior art delegated the tasks of translating and rotating a 3D object, or literally any feature that has a volume (e.g. in this sense, the rectangular volume (501A) or (501B) can be deemed as a 3D object), to different navigational devices/processes (e.g. using separate devices/processes to do the job). Once a 3D object maneuvering process (we may consider cursor (e.g. 504A) as a 3D object) has to be divided into a plurality of intermediate devices/steps, the presently disclosed 3D navigational device dragging process is literally eliminated; the level of user engagement and the creativity of the user using such a prior art GUI are both immediately reduced.

Prior art lacks the support of a genuine 3D navigational device. This makes a prior art 3D GUI merely a "quasi 3D" GUI, i.e., it does not have any effective and direct means to maneuver a 3D cursor or object in a comprehensive manner (a detailed assessment of a "quasi 3D" GUI is provided in section 6.5). In order to provide some unique motion vectors to a 3D object that conventional 2D optical mice have difficulty generating, a state of the art "quasi 3D" GUI has to restrict some aspects of the motion of the 3D object in order to gain access to a specific degree of freedom that is needed. We now can better understand why the best prior art GUI does not have sufficient degrees of freedom to describe 3D motion. For example, many current professional graphics programs (e.g. AUTOCAD®, 3DS MAX®, MAYA®, Microsoft® PowerPoint, etc.) still use conventional 2D optical mice to maneuver an object/cursor in their proprietary "quasi 3D" features. In an exemplary process of editing the profile of a 3D object in one of the above professional graphical programs, an operator can use a means with less than six degrees of freedom to modify certain edges/facets of a 3D object while keeping some of the other edges/facets unchanged; but this kind of ad hoc divisional process can hardly be acceptable for applications that require high performance, such as video games or medical robots (simulators), in which there is no time left for an operator to dissect a single motion into a few intermediate ones. There are other professions that require the exercise of sophisticated finesse by the operators facing the same kind of hindrance, but for the simplicity of explanation we do not list them all. Based on the above technological assessment, one realizes that the presently disclosed device is a necessary and comprehensive technological solution for the 3D GUI industry.

6.4 how a Navigational Device that Provides an Absolute Address for an Object can Eliminate the Accumulated Errors Caused by a Navigational Device that Detects Relative Motion In section 6.1, we have briefly explained that the conventional 2D navigational device (e.g. 101 in FIG. 1A) only provides relative motion vectors. Today, there are many navigational devices in the market that are categorized as relative motion detecting. Will these be sufficient for use in the present 3D GUI? An operator may have to perform many highly skillful tasks by manually maneuvering the objects in the presently disclosed 3D GUI. For example, a digital graphic artist may need to delineate a sophisticated profile of a graphical object or an anatomical design with high positional accuracy. This task prefers that an operator use the absolute address. In this situation, most of the relative motion detecting devices in today's market are outdated. To help the readers understand the drawback of relative motion detecting device clearly, the following explains its fundamental problems.

When an operator uses a conventional 2D navigational device (101 of FIG. 1) to maneuver a cursor/object in the screen, the positional accuracy of the device (or mouse) is occasionally subjected to unpredictable errors in that the density/pattern of the microscopic particles/surface imperfections on the reference surface (e.g. 104 in FIG. 1A) varies from place to place. As a result, the motion vectors derived by the conventional navigational device keep fluctuating while the mouse body (101 in FIG. 1A) is being moved on the reference surface (104). The above issue of positional inaccuracy is exacerbated when a final motion vector (e.g. $\vec{BB'}$ of FIG. 3A) of an object is constructed of a plurality of small steps (e.g. $\vec{b}_1, \vec{b}_2, \ldots \vec{b}_x,$ and $\vec{b}_n$ of FIG. 3A). That is, when an operator drags a conventional navigational device (101 in FIG. 1A) over an arbitrary reference surface (e.g. 104 of FIG. 1A) for a distance, it is equivalent to asking the GUI (105 of FIG. 1A) that receives the motion vector data sent from said mouse to integrate all these small steps (i.e., $\vec{b}_1, \vec{b}_2, \ldots \vec{b}_x,$ and $\vec{b}_n$ of FIG. 3A), as a result of which the errors embedded in the respective motion vectors are also accumulated. Affected by such a generic problem (i.e., error accumulation), inevitably, a conventional 2D GUI (105 of FIG. 1A) that uses a relative motion detecting device (e.g. 101 of FIG. 1A) to maneuver object/cursor will gradually lose its positional accuracy after it has moved the cursor (111 of FIG. 1B) in the screen for some distance. Using improvised methodologies/devices (e.g. increasing the frame rate of a navigational device) to improve the accuracy of the relative motion vectors may temporarily alleviate the problem; but the situation as described in the above has never gone away. The ultimate solution is using the absolute address, which is why some high-resolution touch-sensitive displaying devices have become popular in recent years. FIGS. 3A and 3B show the difference of performance between a relative motion detecting device (e.g. conventional navigational device 101 FIG. 1A) and an absolute address detecting one (e.g. the presently disclosed 3D navigational device 202 in FIG. 2B). As FIG. 3A shows, when a conventional relative motion detecting device (e.g. moves on a reference surface (104), a corresponding motion vector $\vec{BB'}$ can be denoted as:

$$\vec{BB'} = \vec{b}_1 + \vec{b}_2 + \ldots + \vec{b}_x + \ldots + \vec{b}_n \tag{1}$$

Where $\vec{b}_1, \vec{b}_2, \ldots \vec{b}_x,$ and $\vec{b}_n$ denote the intermediate relative motion vectors (i.e., the small steps stated in the above) generated by said navigational device (101).

As has been explained in the above, within each of the intermediate relative motion vectors (i.e., $\vec{b}_x$, etc.), there lies an error of measurement (i.e., $Error_{bx}$), which is largely attributed to the different densities/profiles of the microscopic particles/imperfections on the reference surface (104). Thus, when the relative motion detecting device (101) has completed its journey to reach the destination B', the total error of the final motion vector (i.e., Tolerance relative motion) would be a summation, as expressed in the following equation (2):

$$\text{Tolerance\_relative\_motion} = \sum_{x=1}^{n} Error_{bx} = Error_{b1} + Error_{b2} + \ldots + Error_{bx} + \ldots + Error_{bn} \tag{2}$$

As Eq. (2) shows, the value of Tolerance relative motion is derived by adding all errors of each of the small steps (e.g. summing up all $Error_{bx}$; x=1~n). The series of Eq. (2) is a divergent one (i.e., theoretically, n can be as large as a user wants, per the choice of n, the value of Tolerance relative motion will be increased accordingly); as of such, as the operator moves the mouse body (101 FIG. 1A) on the reference surface (104 FIG. 1A) step by step, a corresponding error of measurement is continually added to the final value of said Tolerance relative motion. Since Error$_{bx}$ is always a positive number, at a certain number of n, Tolerance relative motion will be too large to be accepted as a nominal value. Whenever that happens, the positional accuracy of the navigational device (101 FIG. 1A) has exceeded the tolerance, the corresponding cursor maneuvering process, or even the application associated with it, has to be terminated (usually this is controlled by the GUI), and the cursor positional data pertaining to latest input of relative motion vector has to be reset (much like the snapping process described earlier). This fundamental drawback makes state of art relative motion detecting devices (e.g. a navigational device such as a mouse) unable to continually and steadily provide relative motion vector data for a user to delineate an object which has an extended length of profile line (many artistic sketches fall into this category). In the next generation 3D GUI (such as the present one), there will be many professional applications that require an input device to continually and steadily provide the positional data; a navigational device that runs at a frame rate of thousands frames per second, but suffers from the occasional running away problem of positional accuracy, may not be accepted by a professional worker. For example, when a digital graphic artist is using a professional graphical art program such as MAYA or 3DS MAX to sketch a cartoon character, he/she would not want the positional accuracy of the graphical art program to be continually deteriorating as he/she is moving the mouse on a reference surface. Using a touch screen product (e.g. WACOM, which relies on a proprietary stylus to poke the surface of a displaying panel comprising a grid of delicate transparent conductor lines) may temporarily alleviate the problem, but the degrees of freedom of such a touch screen product is far less than six. Thus, despite its limited degrees of freedom, the above stated unique characteristic of makes today's touch screen product more useful for drawing the static pictures. Since the problem did not really go away, after using it for a while, a graphic artist may feel physical discomfort in the wrist because of the restricted degrees of freedom allowed by the touch screen.

FIG. 3B shows a motion detection device (i.e., the presently disclosed 3D navigational device) that is able to measure the absolute address from a reference surface (205T). As FIG. 3B shows, when the presently disclosed 3D navigational device (202) moves on a reference surface tinted by a means of tri-coloration (205T); (note, a tinted reference surface is referred as item 205T in the present disclosure, whereas the same reference surface that is not tinted is referred as item 205), using the method taught by NU11-009 to convert the color index data as measured to 3D positional data (i.e., X, Y, Z), the final motion vector $\vec{CC'}$ can be denoted as:

$$\vec{CC'} = \sqrt{(X_C, Y_C, Z_C) - (X_{C'}, Y_{C'}, Z_{C'})} \quad (3)$$

Where ($X_C$, $Y_C$, $Z_C$) and ($X_{C'}$, $Y_{C'}$, $Z_{C'}$) denote the absolute address of the two end-points of the vector $\vec{CC'}$, C and C' specifically.

As FIG. 3B shows, the errors accumulated by the measuring process of the absolute address of said two terminals of $\vec{CC'}$ (i.e., C and C') are denoted as Error$_C$ and Error$_{C'}$, respectively (note, there are totally two and only two errors incurred by this process). When a GUI is calculating the final displacement data $\vec{CC'}$, the value of Tolerance_absolute_address is denoted as:

$$\text{Tolerance\_absolute\_address} = \text{Error}_C + \text{Error}_{C'} \quad (4)$$

Here the readers are advised that Tolerance_absolute_address will not be affected by the intermediate steps. We now come to an understanding that despite some of the conventional optical mice claiming that they can boost the frame rate of image capturing process to a stunning level, such as thousands of frames per second, their merit is still limited by the above generic problem. From time to time, when a delicate stroke of a graphical artwork (e.g. cartoon) requires a user to generate a long series of relative motion vectors, the conventional navigational device is likely to fail. For a motion detection device that uses absolute address, the positional error will not be deteriorated in accordance to the number of measurement (e.g. image frame taken for measurement); to reiterate, this is not the case for the device that provides relative motion vectors; and this is the fundamental reason why we envision that the operators of graphic art and robotics industry, etc., will prefer to use the presently disclosed 3D navigational device (202) in conjunction with the presently disclosed 3D GUI to perform their professional jobs.

If we characterize some of the navigational devices in the market today based on the knowledge disclosed in the above, we conclude that a high-resolution touch-sensitive panel (e.g. the product of WACOM, etc.) can be deemed an absolute addressing device in the X-Y plane; on the other hand, said touch-sensitive panel suffers from a fundamental limitation in that it cannot provide six degrees of freedom for the motion of an object in a 3D GUI. The same situation happens on the touch pad used by most of the laptop computers (e.g. the touch pad provided by Synaptics Corp.), i.e., it cannot easily provide six degrees of freedom for the motion of an object in a 3D GUI. A game console that uses a few buttons to designate the specific motions, e.g. a translation, of an object is largely a relative motion detecting device. Lastly, a depth camera is a hybrid product, i.e., it can provide the Z (depth) value in absolute addressing manner, but the motion vectors derived from the RGB image sensor embedded in that depth camera are relative ones ($\Delta X$, $\Delta Y$). Other portable devices such as 3D touch force sensitive Smartphone, etc., face the same kind of situation. i.e., the touch sensitive displaying panel embedded therein may detect the absolute address in an X-Y plane (i.e., the displaying panel) by a means of, say, capacitance measurement, but the touch force sensitive feature such as a piezoelectric film is a relative motion detecting one (i.e., $\Delta Z$). Combining the two features in one system does not necessarily lead to any realistic meaning of moving an object in a true 3D manner. An embedded gyro-sensor may add the sense of rotation to a Smartphone, but, after all, it is a relative motion sensing device, and it is a device distinctly different from the displaying panel bonded to the printed circuit board of the Smartphone. Hence, the above stated conventional navigational devices cannot provide the translational and rotational motion vectors for a 3D object simultaneously and many of them just don't provide the rotational motion vector at all. When the presently disclosed 3D GUI uses the above conventional navigational devices to control the motion of a 3D object in a real-time manner, some of the motions of the 3D object pertaining to rotational motion will have to be restricted. When the presently disclosed 3D GUI (207) collaborates with the presently disclosed 3D navigational device (202 of FIG. 2B), whose entire specification is disclosed in NU11-009, Ser. No. 14/294,369, it is able to provide the translational motion vector, rotational motion vector, and absolute address for the 3D object simultaneously.

6.5 Fundamental Advantages of a 3D GUI that Provides Six Degrees of Freedom

From the above assessment, one can realize that the performance of a GUI is keenly affected by the fundamental capability of the navigational device. Lacking an effective means to solve the above stated problem (i.e., providing an "intrinsic" rotational motion vector for a 3D object regardless of its size), state of art GUIs claiming to have the capability to provide 3D cursor maneuvering features are merely a "quasi 3D" ones. By saying "quasi", we mean that the GUI still can present a static object in a 3D manner (i.e., it has a 3D address, it has a depth value, and it has a volume), but the GUI has no comprehensive means by which the user can engage the 3D object when the object is required to be moved by quite a few degrees of freedom (e.g. translation and rotation motion). As a result of this fundamental limitation, the performance of a "quasi 3D" GUI is quite restricted.

If a layman sees that a GUI provides a 3D address, she may speculate, incorrectly, that any navigational device having the capability to provide three independent parameters of position (e.g. either (X, Y, Z) or ($\Delta$X, $\Delta$Y, $\Delta$Z) for a 3D object, will certainly meet the sufficient condition to maneuver the object in 3D space freely. As a matter of fact, providing three independent parameters barely meets the necessary (i.e., minimal) condition of providing a 3D property to an object. Prompted by the above expectations, various navigational devices have been developed in an attempt to maneuver a 3D object by three parameters (e.g. ($\Delta$x, $\Delta$y, $\Delta$z), which is a relative motion vector, or (X, Y, Z), which is an absolute address). Today, we can find many navigational devices falling into this category in the market. For example, a virtual reality (VR) headset (405 FIG. 4E) uses ($\Delta$x, $\Delta$y, $\Delta$z) to move the landscape/object in its displaying device; a 3D printer head uses ($\Delta$x, $\Delta$y, $\Delta$z) to acknowledge a printer head to control the amount of the plastic droplets ejected onto a mold, an electromagnetic motion tracker uses ($\Delta$x, $\Delta$y, $\Delta$z) to designate the position of an object in a video game, a touch force sensitive panel that uses ($\Delta$x, $\Delta$y, $\Delta$z) to move an object in a displaying device uses the data $\Delta$z to designate the change of depth value, a video gaming console that provides a specific value e.g. ($\Delta$x, $\Delta$y, $\Delta$z), in accordance with the pressing of a button (e.g. A, B, X, Y), etc. In the physical world, the motion of a 3D object has more than three degrees of freedom (a full set of 3D motions could have as many as six, or even more, degrees of freedom) literally at all times. The above stated devices are short by several degrees of freedom that are required to manipulate the position of an object in 3D space in a comprehensive manner. To mask the problem (i.e., the shortage of the degrees of freedom provided by the conventional navigational device), some of the "quasi 3D" GUIs may contain certain proprietary software packages that, by restricting one degree of freedom at a time, allows the user to gain access to the other. Obviously, this tradeoff is still a contingent means. In essence, although the motions of a realistic object include translational and rotational elements, there is no practical way for prior arts (e.g. VR headset, depth camera, game console, EM tracker, etc.) to identify or calculate the rotational elements easily, so the existence of rotational elements are, in effect, ignored, and prior arts (i.e., said navigational devices) send the motional data to the electronic system as though all were translational. We now get to the second fundamental reason why the present disclosure calls this kind of GUI, "quasi 3D". Here the adjective "quasi" means that the perception of the object provided by such a "quasi 3D GUI" may resemble that of a true 3D GUI, but when it comes to interacting with a user, the "quasi 3D" GUI lacks an effective way to generate sophisticated motions. Thus, the quasi-3D GUI only provides a few "rudimentary" degrees of freedom for a user to maneuver a 3D object. This shortage of usable degrees of freedom may not be so obvious when the designated motion of an object has less complex "dynamics" (i.e., in this situation, there might be some degrees of freedom that remain unused), but the problem becomes aggravated when a video game or a cartoon feature is highly active (i.e., the motions are quite dynamic). In the past, some GUIs will delegate the tasks of providing translational motion vector and rotational motion vector for an object to different devices/processes; in this situation, the GUI that works with said different devices/processes do not provide a comprehensive and direct means to integrate said two kinds of motions into one simultaneously. The consequence is: despite the fact that the rendering effect of a static digital graphic art work can be quite stunning (e.g. today the effect of shading of the state of art cartoon feature movie can be quite realistic), the kinetics of motion of the objects are still relatively stiff and mechanistic. This is because the GUI of the graphic art drawing programs, such as 3DSCorp. MAX® or MAYA®, etc., have not provided sufficient degrees of freedom (i.e., six) for the object. In these programs, a user may select some special icons/instructions to designate a specific rotational or translational motion to an object during certain period of time. For example, if an operator clicks an icon that is designated to provide the rotational motion, he/she is able to rotate a 3D object by not allowing the 3D object to perform the other motions (e.g. translation) at the same time. Through this restriction, when a cartoon character is sketched by such a method, it has to restrict one or more degrees of freedom within a specific period of time during the sketching process (e.g. a process specifically designated by icon selection) in order to gain access to a desired degree of freedom; by restricting the degree of freedom here and there, a graphical artist may still accomplish his/her sketching process without using all 6 degrees of freedom to depict any single stroke—however, after such a tedious process of sketching is finished, the final behavior of the cartoon character may turn out to be quite mechanistic and unrealistic, and the root cause may not be appreciated by the laymen of artwork easily. The above syndrome may not be so obvious when a person just makes one or two strokes in a screen. However, after a cartoon character has been constructed by many strokes (i.e., where each stroke suffers from the insufficient degrees of freedom problem to certain extent), the impact on the final quality of the graphical art work product becomes apparent. So, we come to an understanding that the creativity of a digital graphic artist will be suppressed by the limited degrees of freedom of conventional GUI (which is keenly affected by the performance of the navigational device used). Here is an example: if a person compares the facial structure of the princess sketched by the state of art digital graphical program (e.g. MAYA®, 3DS MAX®, etc.) to the one sketched by the classical cartoon artists, he/she may easily recognize that in terms of aesthetics, those sketched by the digital graphic art programs can hardly meet the criteria of the "golden rule" of sketching beautiful features (e.g. width of cheek to the height of skull, etc.); quite often, the polygon network (e.g. FIG. 10A)

imparted to the cartoon feature turned out to be the highest barrier for a graphic artist to overcome in order to implement some of the "golden rules" in his/her mind to the cartoon character. Thus, despite the fact that today's digital cartoon character can appear funny because of their bizarre profiles (e.g. a monster), or that their shading effects can be outrageously realistic, when it comes to classical aesthetics, which is the core value of most graphical artworks, the state of art digital cartoon is no match for the classical cartoon.

Figure 2B:
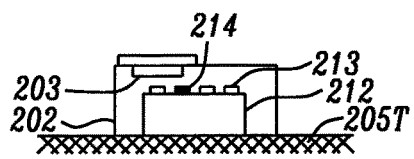
Figure 2C:
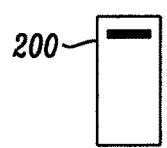

To infuse the sensibility of aesthetics to an artwork, it requires collaboration between the neural cells in an artist's finger, wrist, elbow, and arm, etc. to navigate the presently disclosed 3D navigational device (202 FIG. 2B). We all have this experience: every time when a human invents a new technology (e.g. digital graphics), some new advantages may be brought in (e.g. stunning shading effect, etc.); however, it is also a natural consequence that the new technology may carry certain side effects (e.g. movement is more mechanistic as compared to hand sketched cartoon), and the side effects thus await the arrival of even newer technologies to overcome them. It is an important aspect of the present disclosure to bring in more degrees of freedom to a GUI to overcome the above stated side effects (i.e., insufficient degrees of freedom to fully depict a 3D motion), such that the immense power of two neural networks, i.e., a human body and a computer that is operated by the human body, may synergize, fostering a new type of computing technology, allowing for the entire electronic industry to continue to grow, striding into the era of artificial intelligence (AI). From the above assessment, one comes to an understanding that the presently disclosed device is a valuable asset in the electronic industry, which is expected be strongly supported by AI. Among the many features of AI, the presently disclosed 3D GUI plays the key role in that it seamlessly bridges two technological fiefdoms, i.e., a technical terrain that connotes every motion by linear/translational motions (e.g. conventional 2D GUI, 105, FIG. 1B), and one that connotes literally every motion by nonlinear/rotational motions (i.e., the presently disclosed 3D GUI, 207, FIG. 2A). If one uses the computer terminologies to characterize the above stated two technological fiefdoms, the first one relates to an electronic system that runs purely based on Boolean logic, whereas the second one has more to do with the neural network functions (i.e., where decisions are made largely based on the observations of a recurrent phenomenon rather than a predetermined logical relationship). As was explained in the above, classical cartoon graphic artists do not suffer from the generic problems of digital cartoon graphic art; a classical cartoon graphic artist can sketch a character with his hand using a full set of (six) degrees of freedom. So, when transferring a job from paper to computer, the navigational device preferred by a classical cartoon artist would be the presently disclosed 3D GUI (207 FIG. 2A). When certain properties (e.g. complex motions, heat transfer rate, flow rate, etc.) of an object are denoted by many degrees of freedom (including some that are not motional), the interactions among a plurality of said objects can be quite complicated. Matrix operations, such as the one shown in Eq. (8) becomes an effective means to characterize properties of object in many (e.g. >=3) degrees of freedom.

The presently disclosed 3D GUI not only can benefit the digital cartoon industry, but also other industries as well. In the future, people in the professions relying on finesse to perform their jobs (e.g. surgery simulation trainer, video game player, 3D mechanical drawing, etc.) will rely on the presently disclosed 3D GUI to accomplish their missions. In the end, it is envisioned that most of the computer operating systems will adopt the presently disclosed 3D GUI. In that situation, even a household user will be benefit from the presently disclosed 3D GUI through its contribution to their routine processes. For example, the presently disclosed 3D GUI can provide some simple 3D sketching features for a presentation program, or the presently disclosed 3D GUI can provide a unique 3D cursor to support an operator to select a 3D icon more easily, or the presently disclosed 3D GUI facilitate an application environment that incorporates a plurality of 3D windows in the GUI (e.g. 1303 and 1304 of FIG. 13B), etc. In essence, the presently disclosed 3D GUI (207) denotes the incipience of a true 3D operating system, which is far more interactive, intelligent, and user engaging than state of art GUI.

Figure 4A:
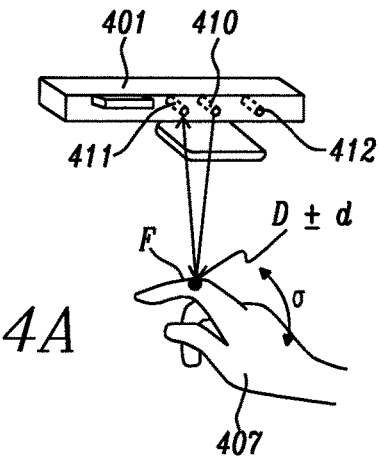
Figure 4B:
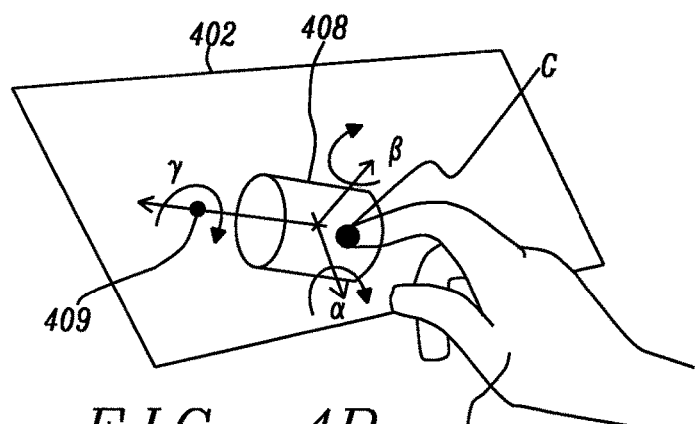
Figure 4C:
Figure 4D:
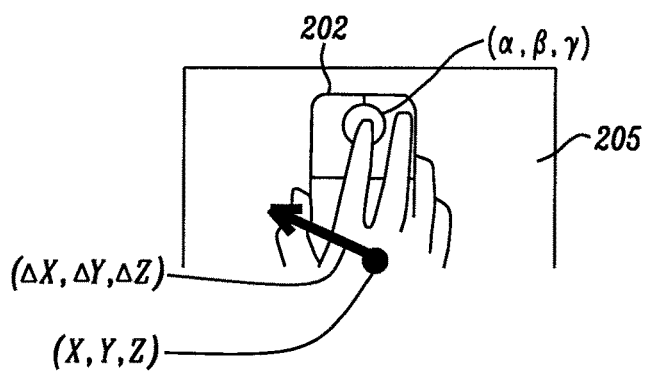
Figure 4E:
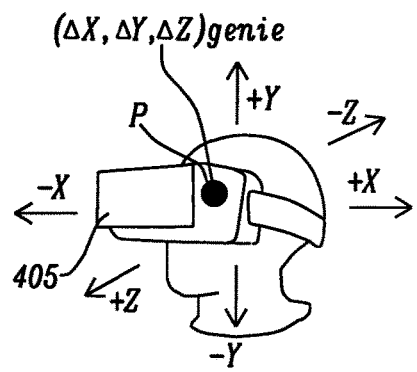

It is clear that as the electronic industry more fully enters the 3D graphics regime, a new 3D GUI that can provide sufficient degrees of freedom to describe an object must be developed. To meet this goal, a GUI designer has to answer a question to him/herself squarely to make sure he/she really understand where the core value of the presently disclosed 3D GUI (207) lies. The answer has to do with its ability to provide motion vectors in six degrees of freedom simultaneously. What has been ignored is that an object whose motion requires six degrees of freedom also requires the collaboration of the neural network of a human's finger/hand in order to manipulate it skillfully. In the past, several vendors have endeavored to develop some "gimmicky" devices to cover over this problem. For example, Microsoft® and Apple® have developed a depth camera (e.g. Kinect) to measure the depth value of the targeted object (i.e., distance between a speckle in IR light projected on a viewer' hand, e.g. point F of FIG. 4A, and said depth camera 401). Measuring relative displacement of the speckles in an invisible light wavelength regime is an algebraic method; it does not lead to any effective result of measuring the rotational displacement of the speckles. FIG. 4A shows such kind of depth camera (401). Alternatively, some vendors (e.g. Facebook®, Samsung®, etc.) provide the virtual reality (VR) headset (405 FIG. 4E) for the viewer. This kind of VR headset (405) uses unique sensors (i.e., accelerometers, GPS, or means of equivalent effect) to detect the relative motion vectors of the headset's body (i.e., movement of point P in FIG. 4E). Hence, during the operation, a relative displacement/motion (i.e., $+\Delta X$, $-\Delta X$, $+\Delta Y$, $-\Delta Y$, $+\Delta Z$, $-\Delta Z$) can be generated for manipulating the scene/object presented to the viewer of said VR headset (405). Note that regardless the depth camera (401) or VR headset (405), the information provided does not constitute a comprehensive set of data denoting the position and/or motion of a 3D object by six degrees of freedom at one time. To provide a comprehensive set of data to denote the position and/or motion of a 3D object, a high-quality 3D GUI (such as the present) has to provide:

(1) 3D positional data, preferably in absolute mode (e.g. (X, Y, Z);

(2) 3D translational motion vector (e.g. ($\Delta X$, $\Delta Y$, $\Delta Z$) and rotational motion vector, simultaneously (e.g. ($\alpha$, $\beta$, $\gamma$) of FIG. 4D; in certain prior arts such as aviation, these rotational motion vectors $\alpha$, $\beta$, and $\gamma$ may be called as the pitch, yaw, and roll motions);

(3) An optional feature of providing a spinning motion data ($\Theta$ of FIG. 2A; this feature often has to do with the higher order terms (HOT) of object's motions), whose method of measurement is disclosed by (U.S. Pat. No. 9,733,727). As is disclosed in U.S. Pat. No. 9,733,727, (Col 22, line 1 through 7): "human hands, particularly fingers, are capable of many gestures. When a human hand moves, the present device will sense a motion that may not necessarily be solely translational. There are many factors capable of generating the second or even the third terms on the right-hand side of Eqs. (5) and (6)".

$$\Delta x = \Delta x_{t0} + \frac{\partial}{\partial t}\Delta x_{t0}(t-t_0) + \frac{1}{2}\frac{\partial^2}{\partial t^2}\Delta x_{t0}(t-t_0)^2 + \ldots \quad (5)$$

$$\Delta y = \Delta y_{t0} + \frac{\partial}{\partial t}\Delta y_{t0}(t-t_0) + \frac{1}{2}\frac{\partial^2}{\partial t^2}\Delta y_{t0}(t-t_0)^2 + \ldots \quad (6)$$

where ($\Delta x$, $\Delta y$) denotes the positional displacement of a targeted object, which can be a function of time (i.e., measured as elapsed from time to $t_0$ t).

As is further disclosed in fully incorporated U.S. Pat. No. 9,733,727, (Col 22, line 7 through 16): "Together, these terms provide the contributions of delicate motion vectors of the hand gestures such as jittering, waving, rotation, and stroking, that the conventional art does not have the comprehensive knowledge to utilize. Being able to detect and manipulate the respective signals (i.e., variation in the pixel values) in the non-linear regime will make the next generation object navigation device described herein and the operating systems, and the electronic devices that use it, much more interactive with their operators". Here the readers are advised that the above stated third, fourth, etc. terms on the right-hand side of Equ's. (5) and (6) denotes the "higher order terms" or HOTs of the motions of the objects that are maneuverable by the presently disclosed 3D GUI. The first term on the right-hand side of Equ's. (5) and (6) denotes the linear motion vector, which is in effect the translational motion vector. As to the second term on the right of Equ's. (5) and (6), it denotes the spinning motion vector, which is in effect the rotational motion vector of the object (i.e., O' for the object 201 of FIG. 2A). A rotational movement can be caused by a relative displacement between two objects, e.g. earth's globe rotates around the sun, or by an intrinsic process of an object itself, e.g. the earth's globe spins about an axis; the latter case is denoted a spinning movement. In order to extract the HOT data reliably, a means of measuring the position (i.e., absolute address) in high accuracy is preferred; to meet this goal, the presently disclosed navigational device (202) takes pictures from a tinted reference surface (205T). The associated techniques of tinting said reference surface (205T) has been disclosed in fully incorporated (U.S. Pat. No. 9,703,396).

In U.S. Pat. No. 9,733,727 we have explained that the direction of the rotational motion vector (i.e., second term on the right of Eqs. (5) and (6) is perpendicular (i.e., orthogonal) to that of the translational motion vector; that is, each single term of the HOTs of said Eqs. (5) and (6) is orthogonal to its immediate predecessor. Depending on the sensitivity and resolution of the navigational devices (202), and the tinting condition of the reference surface (205T FIG. 2D), the length of the HOT is in effect expendable. When the presently disclosed 3D GUI adds together the contribution of many HOTs, its total degrees of freedom can be more than six. For the simplicity of narration, the proceeding discussions of the present disclosure focus on the motions having six degrees of freedom.

(4) A neural network of a human body that, in a highly transparent manner, controls the motion of an input device (e.g. the presently disclosed 3D navigational device 202) based on the graphical rendering effect of the present high-quality 3D GUI.

A conventional GUI does not incorporate the above understandings in its design philosophy, let alone its merits. Regarding (4) above, we will discuss its value in section 6.10. The current section focuses on the first three numbered paragraphs. As FIG. 4A shows, when an operator rotates his/her hand (407) by a small angle σ (e.g. σ<3), state of the art depth cameras (401) only registers that the depth value of the tracking point F is subjected to some kind of errors (e.g. D±d). This situation resembles the one disclosed in (U.S. Pat. No. 9,733,727). As has been disclosed there, a conventional navigational device treats rotational motion as a source of noise. Since this is a historical problem of the pattern recognition industry, the same syndrome occurring on a conventional navigational device may also happen on the other image sensors, such as the ones used by said depth camera (401 FIG. 4A). Specifically, the above stated "error" d is not a real error; it is just a rotational motion vector superimposed on the translational motion vector D. The image sensors (i.e., 411 and 412 FIG. 4A) used by said depth camera (401) do not have any effective means to measure said rotational angle α directly, rotational displacement (e.g. σ) is treated as noise. The presently disclosed 3D GUI uses a 3D navigational device that incorporates the fundamental design of fully incorporated U.S. Pat. No. 9,733,727; hence, an operator can provide a rotational angle for an object under maneuvering process reliably.

If a depth camera (401) is intended to solve the above problem (i.e., measuring rotational motion for the individual IR speckle F) for itself, obviously, the associated calculation process (i.e., deriving the rotational motion vector for said IR speckle F) will be very complicated. Worse of all, the performance of different calculation processes may vary from one image sensor to the other; as of today, the depth camera industry has not tackled this problem effectively, yet. In the end, a development engineer may find out that the algorithm used by depth camera (401) still use similar algebraic means to calculate the rotational angle as convention 2D GUI does for its object (e.g. rotating the cross 113 in FIG. 1B).

FIG. 4B shows a touch sensitive panel (402) that engages a finger with a touching event at point G. Following the didactics given by the conventional navigational device (see section 6.2for detail), the relative motion of point G with regard to a predefined pivot point on the panel (e.g. 409) can be used to determine a rotational motion of the object (408). Note that such a method is neither intuitive nor comprehensive. For example, to rotate the cylinder (408) by a specific angle, different vendors may require the user to move his/her hand (407) by different gestures. Fundamentally speaking, as FIG. 4B shows, the root cause of this problem has to do with the shortage of degrees of freedom of the GUI; a touch-sensitive feature of the displaying panel (402) has two degrees of freedom, i.e., X and Y axes; but a rotational motion of a 3D object (408) has three degrees of freedom, i.e., α, β, and γ of FIG. 4B. So, if a person intends to use a 2D touch panel shown as the above (i.e., 402) to rotate a 3D object (408), there will be several degrees of freedom-lacking.

When the situation comes to using a 2D touch panel to provide the positional data for an object in a 2D GUI, the above stated problem is temporarily alleviated in that the degrees of freedom of said 2D touch panel matches those of said 2D GUI. The problem (i.e., insufficient degrees of freedom to provide rotational motion vector directly) surfaces when one is intended to measure the relative displacement of two points on said 2D GUI to denote a rotational motion of an object. The root cause is in fact the same as the one disclosed in section 6.2, i.e., the area of the touch panel engaging with the finger touching event is considered as a mathematical point, and the intrinsic property of finger-tip rotating motion has been sacrificed by the 2D GUI.

We have explained that the situation occurring in the depth camera is similar to that of a conventional navigational device (i.e., rotation motion vector of point object cannot be measured). When a person waves his/her hand (407) in front of a depth camera (401), there will be many speckles in invisible light wavelengths (e.g. IR) projected from a light source (410) of that depth camera to his/her hand. These speckles are usually formed by laser light in IR wavelength regime; upon leaving said depth camera and entering ambient, said laser light rays must pass through some microscopic slits. Through slit interference effects, the intensity of the speckles (e.g. total intensities of the first order, second order of the interference fringes, etc.) varies with the relative distance between said hand (407) and said depth camera (401). Using the theory of slit interference, one may understand that the intensities of said speckles will vary in accordance with the depth value of the respective object. So, when an operator waves his/her hand, the depth camera (401) is able to recognize the changes of the depth information (i.e., data D of FIG. 4A) of the respective speckles projected to the operator's hand (using an IR image sensor 411). Note carefully, the above stated speckle itself does not carry any information pertaining to rotation. If one is intending to calculate the rotational angle of an object (e.g. hand 407), he/she has to compare the relative displacement of a few objects in an image (e.g. using an RGB image sensor 412 to capture a few images of the operator's hand, etc). The above method usually requires linear algebra, or some means of equivalent effect. As one can imagine, the entire process of calculating said rotational angle is cumbersome, time consuming, and the result is subjected to many sources of noise. In U.S. Pat. No. 9,733,727, the rotational motion vector of the body of a navigational device is calculated by imposing a pseudo circle to the image captured from a reference surface; this method is far more accurate than the prior art. In NU11-009, the tilting condition (which can be considered as a kind of rotation) of an object in a 3D GUI is controlled by adjusting the tinting condition of a reference surface (e.g. varying the intensities of light illuminating the reference surface 205T). Thus, as NU11-009 has disclosed, the presently disclosed 3D GUI is able to provide the translational motion vector, rotational motion vector, and absolute address for an object simultaneously; together, these parameters provide a full set, six degrees of freedom for the motions of a 3D object.

6.6 Operations Provided by the Presently Disclosed 3D GUI

Figure 2D:
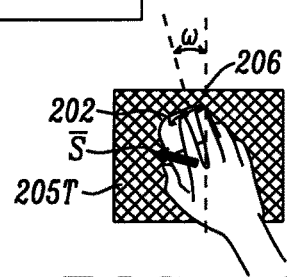

FIG. 2D depicts a 3D navigational device (202) that is able to work seamlessly and advantageously with the presently disclosed 3D GUI (207). As FIG. 2D shows, when an operator wiggles his/her finger (206) on the gesture sensing feature (203), the gesture of a 3D object (e.g. the flying carpet 201) in a presently disclosed 3D GUI (207) can be adjusted by the operator directly (e.g. denoted by the change of normal vector from $\vec{n}$ to $\vec{n}'$). Still further, when the operator wiggles his/her finger on the gesture sensing feature (203) while said mouse body (202) is being moved over the tinted reference surface (205T), said 3D navigational device (202) is able to provide the absolute address (x, y, z), translational motion vector (T), the tilting motion vector, which can be deemed as a first kind of "rotational" motion vector (e.g. change of the normal vector $\vec{n}$). In addition to the first kind of rotational motion vector, the presently disclosed 3D navigational device (202) is able to provide a spinning motion vector; such a spinning motion vector can be deemed as a second kind of rotational motion vector. Mathematically, adjusting the tilting gesture of a 3D object (e.g. 201) is the simplest kind of rotational motion the object can be made to execute in that it adjusts the normal vector $\vec{n}$ of said 3D object. According to Eq. (12), changing the normal vector of a 3D object (i.e., tilting) would require the change of the parameters $n_1$, $n_2$, or $n_3$. If an operator desires to spin the 3D object, the presently disclosed 3D navigational device has to provide the second kind of rotational motion vector. According to Eq. (12), spinning a 3D object would require the parameter co. As FIG. 2A shows, the process of spinning a 3D object (e.g. 201) by an angle Θ' in the presently disclosed 3D GUI (207) requires rotating the mouse body (202) by an angle co on the reference surface (205). Meanwhile, the process of tilting a 3D object involves adjusting the intersections with the X, Y, and Z axes, i.e., the values of a, b, and c of plane abc, which is hereinafter referred as the plane of rotation. Note carefully that when the object (201) is spinning, its pivot axis (i.e., the unit vector $\vec{n}$) is not changed. This denotes that said two kinds of rotational motions are orthogonal to one another. In computer vision technology, both of the above stated processes (i.e., adjusting a, b, and c and spinning an object by an angle θ) are categorized as rotational process; they may combine to form the parameters $R_{11}$~$R_{33}$ of the matrix R of Eq. (8); we will discuss them in detail afterwards. Said in a different way, some people may categorize the motion of an object by linear (translational) and non-linear (rotational) motions. In U.S. Pat. No. 9,733,727, we have further disclosed the method of extracting the higher order terms of the motions of a navigational device (i.e., HOT), when this feature is implemented into the presently disclosed 3D GUI (207), the total degrees of freedom of an object can be higher than six; in such a situation, it may not be as suitable to call the presently disclosed GUI (207) as exactly a 3D one or a six DOF one; rather, the present device is simply a high quality GUI, able to depict very sophisticated kinematics of motions that goes beyond six degrees of freedom. In order to meet the challenges of depicting a motion of a 3D object by means of linear and non-linear motion vectors, the presently disclosed 3D GUI provides the following:

1. an application interface (API) that provides the motion vector(s) for moving a 3D object in linear mode (i.e., translation) and non-linear mode (e.g. rotation) simultaneously;
2. a navigational device (i.e., a 3D navigational device (202)) that is capable of providing a 3D object with a 3D absolute address (i.e., (x, y, z) in FIG. 2A) directly, such that the redundant matrix transformation process from 2D to 3D can be avoided/minimized;
3. a comprehensive means of editing/modifying said two modes of motion vectors (translation and rotation) that, based on the input of the above stated 3D navigational device (202), a user can arrange/modify series of movement of said 3D object intuitively and effectively;
4. an intelligent means of processing a plurality of 3D objects in accordance with an intelligent neural network function (e.g. series of operations of matrix, whose values of elements can be manipulated by the presently disclosed 3D navigational device), imparted as a software package within a 3D GUI module, such that its interaction with the users is a more engaging one as compared to that of prior art, and the calculation load of the CPU or GPU (graphic processing unit) can be minimized/reduced effectively.

FIG. 6A shows a typical GUI in software layer formation, running on Hardware 620. Hardware 620 is further shown and described in FIG. 14. As FIG. 6A shows, a GUI is a plurality of layers of software lying between the input devices (601) and the kernel (605) of an operating system (e.g. Windows, Linux, OS, Android); note that Microsoft Corp. refers to its operating system which comprises the Kernel 605 and GUI 207 as WINDOWS. In the generic definition of a GUI, a window is a region of a screen (i.e., 207) that is allocated to a specific application (examples are the windows 1303, 1304, and 1306 of FIG. 13A-B); a window manager (e.g. 604) is a system software that controls the placement and appearance of windows within a windowing system in a graphical user interface (e.g. 207). The typical types of window managers comprise the stacking type, tiling type, dynamic type, or the composite type. For the detailed characteristics of a GUI, readers may refer to the Wikipedia article titled "Graphical User Interface" Note that although conventional art tends to implement the above described layers of functions as software (e.g. 602, 603, and 604, of FIG. 6A), it does not rule out the possibility that a next generation 3D GUI (207) implements certain of these layers (i.e., internal process modules of FIG. 6B, such as Support Vector Machine 616, Neural Network 610, etc.) into hardware (e.g. Application Specific IC, ASIC). a GUI, a window is a region of a screen (i.e., 207) that is allocated to a specific application (examples are the windows 1303, 1304, and 1306 of FIG. 13B); a window manager (e.g. 604) is a system software that controls the placement and appearance of windows within a windowing system in a graphical user interface (e.g. 207). The typical types of window managers comprise the stacking type, tiling type, dynamic type, or the composite type. For the detailed characteristics of a GUI, readers may refer to the Wikipedia article titled "Graphical User Interface" Note that although conventional art tends to implement the above described layers of functions as software (e.g. 602, 603, and 604, of FIG. 6A), it does not rule out the possibility that a next generation 3D GUI (207) implements certain of these layers (i.e., internal process modules of FIG. 6B, such as Support Vector Machine 616, Neural Network 610, etc.) into hardware (e.g. Application Specific IC, ASIC).

Referring now more particularly to FIG. 14, hardware 620 (as shown in FIG. 6A) is (as referred variously herein) a computer, display system, electronic system, or electromechanical system, or more generally for purposes of this disclosure—a computing device. The computing device typically includes a central processing unit (CPU) 1402, a main memory 1404, input/output devices 1406A/B, input/output ports 1408A/B, memory I/O 1410, a bridge 1412, and a cache memory 1414 in communication with the central processing unit 1402. The central processing unit 1402 is any logic circuitry that responds to and processes instructions received from the main memory 1410, and which reads and writes data to and from memory 1410. The main memory 1410 may include one or more memory chips capable of storing data and allowing any storage location to be directly accessed by the main processor 1402.

The graphical user interface of the disclosure is typically displayed on an I/O device 1406A such as an electronic display. Input device 601 (from FIG. 6A) similarly is represented in FIG. 14 as another I/O device 1406A or 1406B, which interacts with CPU 1402.

FIG. 2A shows how the appearance of an object in the presently disclosed 3D GUI (207) can be affected by the two kinds of rotational motion vectors discussed above. Note that object (201) of this GUI has been deliberately sketched as a cartoon object, i.e., a flying carpet; through this way of sketching, the viewer receives a contextual message that the carpet (201) can fly, and a motion of flying denotes that the object of interest (201) is positioned in a 3D space. In that sense, the gesture of a flying object is not a feature only for appearance (e.g. a 2D icon, 2.5D icon, or 3D icon); rather, it has to do with the motions in a 3D space. As FIG. 2 shows, object (201), the flying carpet herewith, not only has a specific positional address (x, y, z) in the 3D coordinate system (denoted by X, Y, and Z axes), but also a unique "tilting gesture", that can be denoted by a unique plane; this plane intersects with the X, Y, and Z axes of a coordinate system at points a, b, and c, respectively (as has been specified, we call it the plane abc, or, the plane of rotation abc). Mathematically, said plane of rotation abc can be expressed as:

$$\frac{x}{a} + \frac{y}{b} + \frac{z}{c} = 1 \qquad (7)$$

According to the fundamental design rule of the presently disclosed 3D GUI, providing a motion vector for a 3D object (e.g. the flying carpet 201) involves the following scenario:

(1) when an operator (see FIG. 2D) moves the presently disclosed 3D navigational device (202) by a motion vector S over the reference surface (205), which is in effect the plane of rotation abc, the flying carpet (201) shall be moved (like crawling) on said plane of rotation abc in accordance with a corresponding translational motion vector:

(2) Providing a rotational motion for said 3D object involves a different scenario:

(i) while the mouse body (202) is being moved on the reference surface by the above stated translational motion vector, the operator may wiggle his/her finger (206) on the gesture sensing feature (203), such that the values of the intersecting points a, b, and c of plane of rotation abc can be changed;

(ii) from the point of view of differential geometry, this effect (i.e., tilting the plane of rotation abc) is equivalent to changing the normal vector of said plane of rotation abc (e.g. from $\vec{n}$ to $\vec{n}'$). If a viewer is investigating the outlook of the flying carpet (201) closely, the change of the normal vector from $\vec{n}$ to $\vec{n}'$ shall be demonstrated by the change of the appearance of the flying carpet (201).

(iii) When a point (e.g. pixel or voxel) is moved by a combination of rotational and translational displacement, whose parameters is represented by the operators R and T of Eq. (8), it will reach a new position, denoted by P'.

$$P' = R \cdot P + T = \begin{bmatrix} X' \\ Y' \\ Z' \end{bmatrix} = \begin{bmatrix} R_{11} & R_{12} & R_{13} \\ R_{21} & R_{22} & R_{23} \\ R_{31} & R_{32} & R_{33} \end{bmatrix} \cdot \begin{bmatrix} X \\ Y \\ Z \end{bmatrix} + \begin{bmatrix} T_X \\ T_Y \\ T_Z \end{bmatrix} \qquad (8)$$

As is illustrated by EQ. (8), the rotational displacement R is not a single valued object, it is represented by a (3×3) matrix, i.e., $$\begin{bmatrix} R_{11} & R_{12} & R_{13} \\ R_{21} & R_{22} & R_{23} \\ R_{31} & R_{32} & R_{33} \end{bmatrix} \quad (9)$$

Likewise, the translational displacement data T is not a single parameter data, it is a (3×1) matrix containing three displacement parameters, denoted as $$\begin{bmatrix} T_X \\ T_Y \\ T_Z \end{bmatrix} \quad (10)$$

Using Eq. (8), the above two displacements (i.e., translational and gestural movements of an object; or, they can be called motion vectors) may combine as one, i.e., the final motion vector of an object is the superposition of the translational motion vector and rotational motion vector. Note that such a combined motion vector can be applied to an object as small as a pixel (or voxel, if one desires to emphasize it volumetric property); this is one of the most fundamental features that differentiates the presently disclosed 3D GUI from that of the conventional "quasi 3D" GUI.

The rotation matrix R can be transformed into different formats. As Eq. (11) shows, the rotation matrix R can be treated as a combination (i.e., successive matrix multiplications) of three rotational matrixes, each of which designates a rotational motion around a single axis (i.e., X-axis, Y-axis, and Z-axis). Thus, as Eq. (11) shows, the rotational displacement of a point in a 3D coordinate system can be represented by three angular displacement data, i.e., $\varphi$, $\phi$, $\theta$. Substituting $\varphi$, $\phi$, $\theta$ for $R_{11}$~$R_{33}$ in Eq. (8), one can re-write the rotation matrix R, as is expressed in Eq. (11), and vice versa.

$$R = \begin{bmatrix} \cos\varphi & \sin\varphi & 0 \\ -\sin\varphi & \cos\varphi & 0 \\ 0 & 0 & 1 \end{bmatrix} \begin{bmatrix} \cos\phi & 0 & \sin\phi \\ 0 & 1 & 0 \\ \sin\phi & 0 & \cos\phi \end{bmatrix} \begin{bmatrix} 1 & 0 & 0 \\ 0 & \cos\theta & \sin\theta \\ 0 & -\sin\theta & \cos\theta \end{bmatrix} \quad (11)$$

Alternatively, the rotational matrix R can also be depicted by Eq. (12), in which the parameters $n_1$, $n_2$, and $n_3$ denote the unit vector of the rotational axis $\vec{n}$ (i.e., the pivot axis), $\omega$ denotes the rotational (e.g. spinning) angle around said rotational axis $\vec{n}$.

$$R = \begin{bmatrix} n_1^2 + (1-n_1^2)\cos\varpi & n_1 n_2(1-\cos\varpi) - n_3\sin\varpi & n_1 n_3(1-\cos\varpi) - n_2\sin\varpi \\ n_1 n_2(1-\cos\varpi) + n_3\sin\varpi & n_2^2 + (1-n_2^2)\cos\varpi & n_2 n_3(1-\cos\varpi) - n_1\sin\varpi \\ n_1 n_3(1-\cos\varpi) - n_2\sin\varpi & n_2 n_3(1-\cos\varpi) - n_1\sin\varpi & n_3^2 + (1-n_3^2)\cos\varpi \end{bmatrix} \quad (12)$$

In practice, depending on the applications, the presently disclosed 3D GUI may select Eq. (11) or (12), or other formats of rotational matrix R (e.g. a quaternion, etc.) for its own use, and the outcome should be the same. For example, Eq. (11) requires three angular data to describe a rotational movement ($\varphi$, $\phi$, $\theta$); as for Eq. (12), only one angular displacement data is required ($\omega$). Depending on the applications, different formats of rotation matrix R may require different parameters to denote a rotational motion; hence, the presently disclosed 3D GUI (207) provides an application interface (API) allowing for the presently disclosed 3D navigational device to provide the parameters it needed for the respective calculations. FIG. 6B shows such an API (609) in FIG. 6B. Note that the data may be acquired from the input devices (601), not necessarily just the presently disclosed 3D navigational device. In practice, because the other navigational devices may also be accepted by the API (609), they can use the presently disclosed API (609) as a portal and subsequently their data inputs can be processed by different internal process modules (e.g. 615) such as the ones designed for cursor maneuver (606), Perspective (607), and Robotics (608), etc. For example, in the video game industry, the most commonly used format of the rotational matrix R is a quaternion. In that situation, the presently disclosed 3D GUI (207) will send a notification through said API (609) to the 3D navigational device (202) to request it to send the parameters, i.e., p, q, r, and s, to represent a quaternion, i.e., $$Q = p + qi + rj + sk \quad (13)$$

where p, q, r, and s are real numbers; i, j, and k are the fundamental quaternion units.

In prior art, maneuvering a cursor/object by translational and rotational motion vectors requires an operator to use different navigational devices (e.g. using a rotation knob and a navigational device, etc.) to accomplish the mission. The entire process becomes very cumbersome when a motion is composed of multiple intermediate steps of the navigational devices. With the presently disclosed 3D GUI, the combined motion vector (i.e., Eq. 8) can be provided by the gestural movement of one hand (i.e., the movement of one hand that comprises the translational motion of the palm and the finger wiggling activity). This unique capability allows an operator to engage with the presently disclosed 3D GUI (i.e., icons or other 3D object) in a direct and interactive manner.

We now further investigate the "rudiments" of the traditional 2D GUI (e.g. 105 in FIG. 1B). As FIG. 1B shows, when a cursor is presented in a traditional displaying device by a specific pattern (e.g. arrow 111), it aims at point P (on the cross) to denote where it is focusing at (i.e., x, y). To both the viewer and the computer (112), all information that matters to that cursor (111) is that point P; there is no additional meaning in geometry or directionality on said point P. For example, rotating the arrow cursor (111) around said point P by 45 degrees will not make any difference on the point P (a mathematical point/dot does NOT have any meaning in directionality). Lacking the property of rotating, an action of rotating point P alone will not make the cross (113) object rotate at all. Ever since computer mouse was invented, the above stated method of designating the position/motion of an object in a GUI has been widely accepted by the electronics industry. Take cross (113) as an example, since the geometrical property of the cross (113) has been retrograded to a mathematical point P, there is no way for a conventional navigational device (e.g. 101) to rotate the cross (113) by only engaging said point P with a translational motion vector. When one intends to rotate said cross (113), he/she has to designate another point on the cross (e.g. point 114); by dragging said point (114) by a translational motion vector, said conventional GUI gets the knowledge how many degrees that said cross (113) has been rotated. Hence, to perform the task of rotating the cross (113), prior art often has to resort to linear algebra to derive the new position of an object; this explains why the process of rotating an object by the conventional GUI is not a direct one. Affected by this generic shortcoming, today consumers face a difficult situation when they are buying navigational devices from the mass market. Regardless said device is a wand, stick, glove, stylus, goggle, eye glasses, or turning knob, etc., they all face a same situation: the GUI they are linking to still reckons the object(s) as a set of mathematical points, thereby the associated method of manipulating motions of object still is not a direct one. In essence, as has been explained in the above, per mathematics, a point object by itself does not have any attribute associated with rotation; for decades, the entire GUI industry has been bounded by this overly simplified product design policy.

6.7 Embedding Robot Kinematics in the Present 3D GUI

As robots have come into more common use, the conventional method (e.g. algorithm or software) used to calculate the position/motion of a robot turned out to be quite outdated in that it has no effective way to manipulate the position or motion of a robot in a real time manner. For the applications that require an in-situ monitoring/modifying process of a robot, the presently disclosed 3D GUI (207) becomes a time-saving and welcome device. FIG. 7A shows an exemplary robot, e.g. a robotic arm, that can benefit from the presently disclosed 3D GUI (e.g. a six-joint PUMA® robot, hereinafter refereed as robot 700). As FIG. 7A shows, the motion of the respective joints or elbows of said robot (700) can be depicted by their rotational/orientation angles (i.e., $\theta_1, \theta_2, \theta_3, \theta_4, \theta_5$, and $\theta_6$). When the six joints are linked in a way as FIG. 7A depicts, the associated matrix operation of each respective joint can be expressed as:

$$^0A_1 = \begin{bmatrix} C_1 & 0 & -S_1 & 0 \\ S_1 & 0 & C_1 & 0 \\ 0 & -1 & 0 & H \\ 0 & 0 & 0 & 1 \end{bmatrix} \quad {}^1A_2 = \begin{bmatrix} C_2 & -S_2 & 0 & L_{elbow1} \cdot C_2 \\ S_2 & C_2 & 0 & L_{elbow1} \cdot S_2 \\ 0 & 0 & 1 & d \\ 0 & 0 & 0 & 1 \end{bmatrix} \quad (14)$$

$$^2A_3 = \begin{bmatrix} C_3 & 0 & S_3 & a_3 \cdot C_3 \\ S_3 & 0 & -C_3 & a_3 \cdot S_3 \\ 0 & 1 & 0 & 0 \\ 0 & 0 & 0 & 1 \end{bmatrix} \quad {}^3A_4 = \begin{bmatrix} C_4 & 0 & -S_4 & 0 \\ S_4 & 0 & C_4 & 0 \\ 0 & -1 & 1 & L_{elbow2} \\ 0 & 0 & 0 & 1 \end{bmatrix}$$

$$^4A_5 = \begin{bmatrix} C_5 & 0 & S_5 & 0 \\ S_5 & 0 & -C_5 & 0 \\ 0 & 1 & 0 & 0 \\ 0 & 0 & 0 & 1 \end{bmatrix} \quad {}^5A_6 = \begin{bmatrix} C_6 & -S_6 & 0 & 0 \\ S_6 & C_6 & 0 & 0 \\ 0 & 0 & 1 & d_{gripper} \\ 0 & 0 & 0 & 1 \end{bmatrix}$$

Where C stands for cosine function, S stands for sine function; $L_{elbow1}$ is the length of the elbow linking joint1 and joint2; $L_{elbow2}$ is the length of the elbow linking joint3 and joint4 and the subscripts 1, 2, 3, 4, 5, and 6 in Eq. (14) denote the rotational angles $\theta_1, \theta_2, \theta_3, \theta_4, \theta_5$, and $\theta_6$, respectively. So, when robot (700) is moving, the corresponding kinematics can be expressed by the following matrix multiplication, i.e., $$T_0^i = {}^0A_1 \cdot {}^1A_2 \cdot {}^2A_3 \cdot {}^3A_4 \ldots = \prod_{j=1}^{i} {}^{j-1}A_j = \begin{bmatrix} R_{11} & R_{12} & R_{13} & X \\ R_{21} & R_{22} & R_{23} & Y \\ R_{31} & R_{32} & R_{33} & Z \\ 0 & 0 & 0 & 1 \end{bmatrix}; \quad (15)$$

for $i = 1, 2, \ldots n$

When i=n, we obtain the T matrix, i.e., $T_0^n$, which provides the positional and rotational information of $P_{end}$, i.e., the end point of robot (700) with respect to the base coordinate system (i.e., O of FIG. 7A). Note that the parameters $R_{11} \sim R_{33}$, X, Y, and Z of the $T_0^i$ matrix of Eq. (15) can be directly applied to Eq. (8); this means that the presently disclosed 3D GUI can control the motion of robot (700) directly. Alternatively, said parameters $R_{11} \sim R_{33}$, X, Y, and Z of the $T_0^i$ matrix can be transformed into the other formats; a couple of the corresponding ones are shown in Eqs. (11) and (12), respectively. Readers are advised that when i is less than n, said $T_0^i$ matrix denotes the position and rotation of the internal joint, i.e., $^0A_1, {}^1A_2, {}^2A_3, {}^3A_4, {}^4A_5$, respectively. Special notice is further advised that using the presently disclosed 3D navigational device (202), the presently disclosed GUI (207) can infuse physical meaning to the above stated parameters by considering said T matrix in the following formation:

$$T = \begin{bmatrix} x_n & y_n & z_n & p_n \\ 0 & 0 & 0 & 1 \end{bmatrix} = \begin{bmatrix} n & s & a & p \\ 0 & 0 & 0 & 1 \end{bmatrix} = \begin{bmatrix} n_x & s_x & a_x & p_x \\ n_y & s_y & a_y & p_y \\ n_z & s_z & a_z & p_z \\ 0 & 0 & 0 & 1 \end{bmatrix} \quad (16)$$

n is the normal vector of the hand. If we use a parallel-jaw hand, n will be orthogonal to the fingers of the robot. FIG. 12 shows the direction of $\vec{n}$.

s is the sliding vector of the hand. It is pointing to the direction of the gripper (e.g. a simplified finger) for the opening and closing movement; FIG. 12 shows the direction of $\vec{s}$.

a is the approach vector of the hand. It is pointing in the direction normal to the palm of the hand (the rotating plane denoted by $y_5$ and $z_5$ axes in FIG. 7A); FIG. 12 shows the direction of $\vec{a}$.

p is the position vector of the hand. It points from the origin of the base coordinate system (i.e., point O of FIGS. 7A and 12) to the center of the hand coordinate system when the gripper is closed (i.e., $P_{end}$); FIG. 12 shows the direction of $\vec{p}$.

specifically, (17)

$\vec{n} = [n_x, n_y, n_z], \vec{a} = [a_x, a_y, a_z], \vec{s} = [s_x, s_y, s_z],$ $\vec{p} = [p_x, p_y, p_z];$ $n_x = C_1[C_{23}(C_4C_5C_6 - S_4S_6) - S_{23}S_5C_6] - S_1[S_4C_5C_6 + C_4S_6] =$ $R_{11}$ of Eq. (8);

$n_y = S_1[C_{23}(C_4C_5C_6 - S_4S_6) - S_{23}S_5C_6] - S_1[S_4C_5C_6 + C_4S_6] =$ $R_{21}$ of Eq. (8);

$n_z = -S_{23}[(C_4C_5C_6 - S_4S_6)] - S_{23}S_5C_6 = R_{31}$ of Eq. (8);

-continued $s_x = C_1[-C_{23}(C_4C_5C_6 - S_4S_6) + S_{23}S_5C_6] - S_1[-S_4C_5C_6 + C_4S_6] =$ $R_{12}$ of Eq. (8);

$s_y = S_1[-C_{23}(C_4C_5C_6 + S_4S_6) + S_{23}S_5C_6] + C_1[-S_4C_5C_6 + C_4S_6] =$ $R_{22}$ of Eq. (8);

$s_z = S_{23}[(C_4C_5C_6 + S_4S_6)] + S_{23}S_5C_6 = R_{32}$ of Eq. (8);

$a_x = C_1[(C_{23}C_4C_5 + S_{23}C_5)] + S_1S_4S_5 = R_{13}$ of Eq. (8);

$a_y = S_1[(C_{23}C_4C_5 + S_{23}C_5)] + C_1S_4S_5 = R_{23}$ of Eq. (8);

$a_z = -S_{23}C_4S_5 + C_{23}C_5 = R_{33}$ of Eq. (8);

$p_x =$
$C_1[d_{gripper}(C_{23}C_4S_5 + S_{23}C_5) + S_{23}d_4 + a_3d_4 + a_3C_{23} + a_2C_2] -$
$S_1(d_{gripper}S_4S_5 + d_2) =$ absolute address parameter $X$ of Eq. (8)

$p_y = S_1[d_{gripper}(C_{23}C_4S_5 + S_{23}C_5) + S_{23}d_4 + a_3d_4 + a_3C_{23} + a_2C_2] +$
$C_1(d_{gripper}S_4S_5 + d_2) =$ absolute address parameter $Y$ of Eq. (8)

$p_z = d_{gripper}(C_{23}C_5 - S_{23}C_4S_5) + C_{23}d_4 - a_3d_{23} + a_2S_2 + H =$ absolute address parameter $Z$ of Eq. (8)

FIG. 12 shows robot 700 of FIG. 7A holding a utensil (implement) so that the position of its end point (i.e., $P_{end}$) is extended along the direction of vector $\vec{a}$ by a distance, which is designated by the additional length of utensil in FIG. 12. This makes the end effector reach a new position, i.e., $P'_{end}$. As FIG. 12 also shows, the directionality of the gripper can be characterized by three orthogonal vectors, i.e., $\vec{n}$, $\vec{a}$, and $\vec{s}$, respectively.

We now understand that in order to designate a T matrix at a specific location, one has to provide the respective rotational/orientation angles of the joints, i.e., $\theta_1$, $\theta_2$, $\theta_3$, . . . , and $\theta_6$ (for easier narration, these angles are hereinafter called the rotational angles). As of today, the conventional art has not developed any effective means to derive these rotational angles based on Cartesian coordinate system descriptions. Whenever encountering such a situation, the engineers have to take indirect means, e.g. using iterative algorithms, etc. to find the solutions. To cope with this problem, the presently disclosed 3D GUI (207) uses a unique 3D navigational device (202) of FIG. 2A to adjust the values of the rotational angles $\theta_1$, $\theta_2$, $\theta_3$, . . . , and $\theta_6$ in a real time manner. This is significant for the robot industry as well as the GUI industry; special applications can be found on, for example, the situation that a surgeon manipulating a robotic utensil during operation, etc. The fundamental merit of the presently disclosed 3D GUI (207) lies in its capability of manipulating the absolute address, translational motion and rotational motions of a joint of a robot simultaneously (whose merit is denoted by Eq. 8). In fact, in a general sense, any motion of a 3D object that can be represented by Eq. (8) can use the presently disclosed 3D GUI (207) to achieve an unprecedented experience of interacting with the users. Exemplary applications comprise modifying the motion of a cartoon character by a sketching program using the presently disclosed 3D GUI, drawing the schematics for a mechanical part using the presently disclosed 3D GUI controlling the motion of a role model in a video game using the presently disclosed 3D GUI or manipulating a utensil of a medical diagnosis system using the presently disclosed 3D GUI.

The above stated robot manipulating processes has to do with determining the final position of an end effector of a robot (i.e., $P_{end}$) by forward kinematics. In addition to forward kinematics, the presently disclosed 3D GUI can adjust the positions and rotational angles of the respective joints automatically; this process usually involves inverse kinematics. In an exemplary automatic process of a six-joint PUMA® as depicted in FIG. 7A (i.e., robot 700), there are four possible solutions for the first three joints (i=1~3) and there are two possible solutions for the subsequent three joints (i=4~6) based on each of said four solutions of said first three joints. A typical solution finding process for the first three joints is projecting their 3D vector to the $x_{i-1}$-$y_{i-1}$ plane (shown in FIG. 7A). Solution of the latter three joints are calculated based on the solution of the first three joints, rotation of the sub-matrixes of $T_0^i$ and $^{i-1}A_i$ (i=4~6; we are using sub-matrixes here because joints 4~6 do not lead to any positional change of the elbows), and the projection of the respective positional vectors to the $x_{i-1}$-$y_{i-1}$ plane.

Since there are multiple solutions for the respective joints of said robot (700) in FIG. 7A, artificial intelligence methods may come into the play to help the presently disclosed 3D GUI determine said solutions faster and easier. In a typical navigational process that adopts the functionality of artificial intelligence, a recurrent data processing flow can be implemented by the presently disclosed 3D GUI (207); said data processing flow is able to handle a series of linear and non-linear motional data for the targeted object (e.g. $T_0^i$, $^{i-1}A_i$, etc.) in a timely manner.

For example, in an imagined video game, a cartoon character Peter Pan is battling Captain Hook with a dagger. The presently disclosed 3D navigational device (202) combined with the 3D GUI (207), enable the operator to move Peter Pan's dagger (i.e., by the rotational matrix R and positional data X, Y, Z of Eq. (8) in a 3D coordinate system freely; in the meantime, using the robot kinematics disclosed in the above, the presently disclosed 3D GUI (207) is able to calculate the positional data and rotation vector of the respective joints of Peter Pan's dagger (i.e., using $P'_{end}$ and $\vec{n}$, $\vec{a}$, and $\vec{s}$ of FIG. 12 to represent the position of the dagger). When an operator is instructing Peter Pan to thrust the dagger inward and then swing it to deflect Captain's sword, the entire process is literally as though a fast robot were engaging in a single process combining alternative actions of forward and reverse kinematics. Occasionally, Peter Pan's fighting process may require artificial intelligence to expedite the solution finding process. For example, during the battle, the 3D GUI (207 in FIG. 2A) may occasionally take notice of the relative distance between Peter Pan and Captain Hook; when certain neural network conditions are met, the 3D GUI (207 in FIG. 2A) will adjust its position and respective rotation angles automatically. As has been explained earlier, the performance of a GUI is typically judged by how efficient it is and how fluidly it interacts with the users; the unique feature provided by the presently disclosed 3D GUI (207 in FIG. 2A), i.e., robot kinematics, enhances a user's engaging experience to a level far beyond that of prior art. Note that when Peter Pan is flying in the air, it denotes that Peter Pan, similarly to the flying carpet (201) in FIG. 11C, is subjected to a predefined vector field. When such a vector field is combined with the motion vector provided by the navigational device, a new motion vector for Peter Pan is created.

FIG. 7B shows a robot that mimics a human's skeleton (i.e., a Humanoid). As the exemplary case of FIG. 7B shows, a Humanoid structure (701B) can use as many as 25 degrees of freedom (DOF) to denote the motions generated by the human's head, torso, pelvis, legs, and arms, etc. On manipulating the Humanoid structure (701B), the presently disclosed 3D navigational device (202 in FIG. 2) can provide as many as 6 DOF at one time. At first glance, it may seem to the reader that the presently disclosed 3D navigational device (202) is not able to manipulate the motion of all the joints of the Humanoid structure at one time (which require 25 DOFs in total). Note that the numbers do not add to 25 because they represent the number of degrees of freedom per joint. Nevertheless, the presently disclosed 3D GUI can accommodate the situation in a highly effective way. Note that usually an operator does not have to access to all the 25 degrees of freedom at one time. Thus, the user of the presently disclosed 3D GUI (207 FIG. 2) can select 6 DOF's to manipulate a particular gesture of said Humanoid structure (701B) within some period of time, then, by changing the selection in some segment of the overall processing time, one still obtains a way to manipulate all 25 degrees of freedom effectively throughout the entire overall processing time. If one looks into FIG. 7B closely and finds out that in order to move the head, it requires 3 DOF (i.e., less than 6); to move an elbow, it requires 1 DOF (i.e., still less than 6); to generate a motion from toe to knee, it requires 4_DOF (i.e., still less than 6), etc. If the user of the presently disclosed 3D GUI cycles between the above group of manipulating process in a rapid manner, or uses an intelligent process to determine which of the above manipulating processes will be used, then the 3D GUI still can be a highly effective and user friendly one by properly using less than six degrees of freedom of motions at each time. For example, when the presently disclosed 3D GUI (207 in FIG. 2) is controlling the flying motion of a cartoon character Peter Pan, in this situation, manipulating the gesture of Peter Pan's legs is generally unnecessary; instead, it is the rotational motions of Peter Pan's torso and his two arms that have the most to do with his flying performance.

The above stated Humanoid structure (i.e., 701B in FIG. 7B) still can be modified to accommodate different body construction of a cartoon character (e.g. dog, IDC-$C_1$, AMD,M monster, beauty, etc.). FIG. 8A shows a cartoon character (800), whose pelvic and hip regions have been covered by the garment (801); the corresponding Humanoid skeleton structure of this character (801B) is shown in FIG. 8B. Look out for the simplified joint structure of the pelvic region; through this simplification, the DOF of this entire cartoon character (800) can be reduced significantly, which makes the presently disclosed 3D GUI (207 in FIG. 2) able to control the motion of an entire cartoon body (800) relatively easily. In practice, both the above stated comprehensive Humanoid skeleton structure (701B) and simplified Humanoid skeleton structure (801B) may appear in the presently disclosed 3D GUI simultaneously. For example, an envisioned user creating a cartoon feature movie may use the presently disclosed 3D GUI to manipulate a simplified Humanoid skeleton model (i.e., 801B) as a means of controlling the supporting roles; as to the motions of the protagonist, the associated tasks can be delegated to the more sophisticated Humanoid structure (e.g. 701B). Still further, when it comes to controlling facial expression, the presently disclosed 3D GUI adopts a more fundamental level, i.e., a polygon network. FIG. 10A shows the polygon network of a human face. We now take one patch (e.g. 1002) for analysis. As FIG. 10B shows, in order to modify patch (1002), the presently disclosed 3D GUI allows an operator to access to its corner tips (i.e., A, B, C, and D) and the normal vector (1010) of the patch (1002), which is also called the vertex (1010) of the patch (1002). Take corner point A as an example. When an operator clicks on it and drags the presently disclosed 3D navigational device (202) on the reference surface (205T) for a distance, it will generate a corresponding translational motion vector for said point A. Thus, as FIG. 10C shows, through such a translational movement, and depending on the direction of dragging, point A can be moved to A', A'', A''', or A'''', etc. Correspondingly, the pattern/area of patch (1002) will be changed. Note carefully that while the pattern/area of patch (1002) is being changed by the movement of point A, the position of said normal vector (1010) on patch (1002) is moved concurrently. As FIGS. 10B and 10G show, when an operator clicks on the normal vector (1010) and wiggles his/her finger on the gesture sensing feature (203 of FIG. 2) of the presently disclosed 3D navigational device (202 of FIG. 2), he/she will tilt the rotational plane (1002). As FIGS. 10D, 10E, and 10F show, one may consider the above stated rotational plane tilting process as the rotational motions of plane (1002) around X, Y, or Z axes (i.e., 1002', 1002'', and 1002' of FIGS. 10D, 10E, and 10F); this understanding also matches our former explanation. As Eq. (12) reveals, adjusting the normal vector (i.e., changing the values of $n_1$, $n_2$, or $n_3$) may lead to the changes on $R_{11}$~$R_{33}$ of the rotational matrix R, which also means such a process leads to changes in the angles $\varphi$, $\phi$, and $\theta$ of Eq. (11). In a user engaging cartoon feature movie, a preferred 3D GUI is one that provides both translational and rotational motion vectors for the vertex of a patch in a polygonal network simultaneously. Conventional art requires separate devices/processes to perform the above stated task; when a prior art GUI requires a plurality of input devices/processes to control the motion of an object (a patch of polygon network can be deemed as an object), the purpose of adjusting a cartoon's gesture in real time manner literally has been defeated. The presently disclosed 3D GUI can eliminate this problem, and thus provide for an innovative approach to manipulating the gestures/expressions of objects in realistic manner.

Of course, there are many occasions when an object in a 3D GUI is not a Humanoid. In these situations, the flying carpet (201 in FIG. 2A) can be used to denote the fundamental value of the presently disclosed 3D GUI. As is shown in FIG. 2A, the appearance of the flying carpet to the viewer (201 in FIG. 2A) can be changed when the points of intersection of the rotational plane abc with coordinate axes X, Y, and Z are changed (i.e., values of a, b, and c are changed). The changing of a particular appearance to the viewer (the "gesture") actually illustrates one of the most important characteristics of a 3D object. An overly simplified GUI, such as most of the GUIs found in today's market, considers the flying carpet (201) only as a mathematical point. By doing so, they have also discarded the invaluable information pertaining to the rotational movement and geometrical transformation of a 3D object. We now come to a realization that when the electronic industry enters the 3D regime, it will require a full-fledged 3D GUI that is able to provide six degrees of freedom for a 3D object at one time (i.e., X, Y, Z, $\alpha$, $\beta$, and $\gamma$ of FIG. 4B). This further justifies the assertion that the present 3D GUI is a truly interactive one, since it is capable of engaging a user directly and intuitively, supported by sufficient degrees of freedom.

Based on the above analysis, the rotation matrix required for manipulating a robot is essentially the same as those used to maneuver a 3D cursor/object in a 3D GUI. As the flying carpet (201) shows, most of the objects we encounter in the natural world are subjected to both translational motion (i.e., change of address from one point to another) and rotational motion (change of gesture) concurrently. Given the expected 3D graphics revolution, there is a demand for the electronics industry to develop a new type of 3D GUI (i.e., the one disclosed herein) that, based on the data generated by one gestural motion of one navigational device, that 3D GUI is able to provide linear (translational) and non-linear (rotational) motion vectors for a 3D object or a robotic device simultaneously.

In the following paragraphs, we will explain the fundamental merits of perspective sketching techniques in view of the degrees of freedom of each point (e.g. pixel) in a displaying device. Using a learning theorem, the user of the 3D GUI can present 3D scenery more effectively by classifying the graphical vectors drawn in the 3D GUI in accordance with the perspective sketching techniques. In current section 6.7, the 3D scenery under consideration is static (i.e., no motion vector); therefore, only graphical vectors will be discussed. In section 6.8, we will show how to use the 3D GUI so that a viewer can interact with dynamic 3D scenery (i.e., scenery in which the graphical vectors, motion vectors, and perspective angles are all taking part). The learning theorem (i.e., a support vector machine) is a powerful tool used to classify graphical objects; it will be applied in both sections.

In the former paragraphs associated with FIG. 10A through 10G, we have elaborated how the present 3D GUI adjusts the position/gesture of a 3D object by providing each vertex (e.g. 1010 of FIG. 10B) of a polygon network (1001 of FIG. 10A) with the motion vectors in six degrees of freedom. Once an editing process is completed, the appearance of an exemplary graphical object will be like that of FIG. 10A; in this exemplary case, the polygon network is a human face (1001). It is to be noted that although the 3D GUI can provide a vertex (e.g. 1010) with the motion vectors in six degrees of freedom, the finished product, i.e., a set of vertexes, do not necessarily have any specific physical association with one another. As a result, the patches (e.g. 1002 of FIG. 10B) formed by the vertexes are like unrelated groups of leaves randomly hung on a tree. When a physical scientist denotes a degree of freedom of each vertex (e.g. 1010) as one dimension of a feature vector, the total dimension of the entire feature vector space constructed by the set of all vertex vectors of FIG. 10B (e.g. 1010; say) will involve a total of n vertexes in the 3D GUI. Consequently, if n is large, the number of vertex vectors can be very high (i.e., in this exemplary case, the total dimension of the vertex vector space is n×6). In fact, in a modern digital graphical rendering device, the number of vertex vectors in a polygon network can be stunningly high (e.g. tens of thousands), so that a realistic 3D object (e.g. a human face 1001) established in such a manner can be too complicated for a viewer to comprehend easily. For example, one cannot easily deduce any physical association between different groups of leaves on a tree. Hence, finding a way to reduce the dimension of the feature vector space (i.e., reduce the degrees of freedom of some of the vertex vectors) is a necessity if the next generation high quality 3D GUI is to become truly user friendly. As will be explained in the following, the solution to this problem will be provided by use of another kind of vector in the present 3D GUI, i.e., the graphical vector (which is different than the motion vector), which is one that relates to how a 3D graphical entity is drawn (e.g. a 3D vector graphic is constructed by use of a plurality of 3D graphical vectors). Depending on applications, an object in a 3D GUI can be represented either as a vector graphic (e.g. 1009 of FIG. 10H), or a polygon network (e.g. 1001 of FIG. 10A). Said differently, an object in a 3D GUI can be represented by a plurality of graphical vectors (e.g. $\overrightarrow{GV_1}$, of FIG. 10J); or, it can be represented by a plurality of vertex vectors (e.g. 1010 of FIG. 10B). On a computer, there are two kinds of vectors that may co-exist in the present 3D GUI, i.e., the vertex vectors (1010), which are the normal vectors of the patches (e.g. 1002) that form the outer surface of the graphical entities (hence the vertex vectors may be aiming at all directions in the 3D GUI), and the graphical vectors (e.g. $\overrightarrow{GV_1}$), each of which is actually a 3D vector being projected onto a two dimensional viewing plane (e.g. a flat panel display), thereby allowing for the graphical features in a 3D coordinate system to be mapped to a 2.5D one.

Referring now to Eq. (8), one will notice that a point (say, one located at X, Y, Z) in the 3D GUI acquires its degrees of freedom mainly from the elements of rotation matrix R (i.e., $R_{11} \sim R_{33}$). For example, element $R_{12}$ serves as a parameter to determine how much distance an object can move along the direction of X axis when the object is moved along the direction of Y axis by a specific distance. By the same token, the remaining elements of the rotation matrix R can determine the other linear and non-linear motions of said object along the X, Y, and Z axes. In essence, the present 3D GUI can not only manipulate the positional values of the respective points in a 3D space, but also can store the rotation matrix R for each said point. As an exemplary case, referring back to FIGS. 2A and 2B, when the lighting condition (e.g. intensities) of the light sources (213 in FIG. 2B) embedded in the disclosed 3D navigational device (202) is set at specific values such that $R_{11}$: $R_{12}$: $R_{13}$=1:2:1, then the relative degree of freedom (i.e., displacement) of the object (say, located at a position denoted as X, Y, and Z) along the X axis per its motions along X, Y, and Z axes is 1:2:1. By the same token, one can derive the degree of freedom of said object along the other axes. As such, by setting the lighting conditions of said light sources (213), or by directly adjusting the values of said elements in matrix R, the 3D GUI is able to determine the degrees of freedom for every point in a 3D space. In section 6.9 (or more specifically, as shown in FIG. 11E), an operator will learn that by placing an index finger (1106) on a specific location of the presently gesture sensing feature (203 of FIG. 2B), the presently disclosed 3D maneuvering device (202) is able to determine a unique lighting condition for the light sources S1, S2, and S3, henceforth the degrees of freedom of a specific point in the presently disclosed 3D GUI (207) can be determined. Prior art does not have this ability. Thus, the present 3D GUI is a technology breakthrough for the GUI industry as it provides a means to manipulate the degrees of freedom of the graphical vectors in a pervasive and scale-independent manner (i.e., for an object that is as small as a pixel to one that is as large as a chapel 1009 in FIG. 10H). In practice, placing an index finger at specific locations of the presently gesture sensing feature of the mouse (203 of FIG. 2B) actually denotes the normal vectors of the patches that are denoted by each point on the presently disclosed 3D GUI (207), much like those (1010) of the polygon network (1001). When a set of graphical vectors (they can be derived from the addresses of said points) in the presently disclosed 3D GUI (207) have similar rotation matrixes, it denotes said graphical vectors have constructed a facet in the 3D space, which has its normal vector aiming to a specific direction in the 3D space. One may use this drawing method to sketch the roof ($\Diamond P_1P_2P_3P_4$) of the chapel (1009) FIG. 10J. As FIG. 10J shows, roof ($\Diamond P_1P_2P_3P_4$) is enclosed by four graphical vectors, i.e., $\vec{GV}_1$, $\vec{GV}_3$, $\vec{GV}_{10}$, and $\vec{GV}_{11}$. If an operator does not wiggle his/her index finger (1106) while dragging the presently disclosed 3D navigational device (202 of FIG. 2B) on the reference surface (205) to sketch said four graphical vectors $\vec{GV}_1$, $\vec{GV}_3$, $\vec{GV}_{10}$, and $\vec{GV}_{11}$, then in the presently disclosed 3D GUI(207), all points enclosed by the roof ($\Diamond P_1P_2P_3P_4$) will have a same normal vector, i.e., $\vec{N}_{1234}$. Using perspective sketching technique, one may manifest the 3D sensation of said roof ($\Diamond P_1P_2P_3P_4$), and this is why a vector graphic FIG. 10H can give the viewer such a strong impact of 3D sensation. Extending such a technique, when an operator wiggles his/her index finger while maneuvering the presently disclosed 3D navigational device (202) on the reference surface (205T), he/she is actually creating (and applying) a new method of graphical expression. We call this mode of expression, "digital impressionism", borrowing the term "impressionism" first used by artists as Claude Monet. As used by Monet and his group, impressionism denotes a technique of painting that puts patches of colors into a landscape to indicate the fleeting effects of light that occurred when painting in an outdoor setting. When creating an analogous graphical rendering effect, we feel justified in calling it the beginnings of digital impressionism.

If a GUI designer does not have any means to designate the relationship among a plurality of graphical vectors in a 3D scenery, the dimension of the feature vector space constructed by these graphical vectors will not be reduced effectively; as a consequence, the viewer may have difficulty in comprehending complicated 3D scenery effectively and easily. In the past, whenever facing such a situation (e.g. there is a plurality of objects in a 3D scenery, some of which have very complicated profiles), the conventional GUI may attempt a quick-fix approach by assigning distinctly different depth values (i.e., varied positions along the Z axis) to the respective objects in the 3D scenery. However, a difficult situation arose when a plurality of objects were positioned at different depth values in a prior art GUI, the plurality of objects were separated successfully. This is an overly-simplified design rule when compared to the presently disclosed high quality 3D GUI. As a matter of fact, this mechanistic method has only limited value, i.e., it does not help a conventional GUI depict a 3D scenery as realistically and efficiently as the users have anticipated. In the following, we will provide a more comprehensive solution for this matter.

Recall that we have stated in section 6.2 that a realistic object has both dimensionality and directionality, but a mathematical point does not. Furthermore, a realistic object can come in any size (e.g. as large as the Chapel 1009 of FIG. 10H or as small as a single pixel). That is, the degrees of freedom of the profile lines of a physical object (which can be associated with a fairly large number of vertex vectors) in a 2.5D coordinate system, can still be manipulated for a better viewing effect after the vertexes (i.e., normal vectors of tiny patches denoted by each point) have finished their initial positioning tasks (e.g. FIGS. 10B, C, D, E, and F). When a graphical artist places a plurality of polygon networks into a 3D scenery and aligns some of the graphical vectors toward a principal direction (i.e., the direction of the vanishing lines), such that they are all aiming at a common point (i.e., the vanishing point), the degrees of freedom of those objects, as they appear in the corresponding 2.5D coordinate system, can be reduced without distorting the realistic profile of the group of polygon networks. This allows a viewer to understand the 3D scenery more easily. Enlightened by the technique of perspective painting and artificial intelligence (i.e., the learning theorem), the present 3D GUI permits a graphical artist to pick out a few graphical vectors (e.g. the contour lines of an object) and aim them at a specific vanishing point. In accord with the learning theorem, the above process has the effect of classifying the graphical vectors to a unique group. When 3D scenery can be denoted by several such groups, the entire 3D scenery will look neat and the geographical relationship among the respective objects in said 3D scenery will become more comprehensible to the viewer. FIG. 10H shows a chapel (1009) that is sketched using the present 3D GUI with such a method. As one may notice, the profile of chapel (1009) gives the viewer an extraordinary sensation of three-dimensionality; this is a performance that even the state of art prior art GUI cannot match easily. Perspective sketching is a graphical rendering technique developed in the Renaissance era. At the time of its development, some of the artistic old masters found that by aligning certain contour lines of the objects along certain principal directions, and aiming them at a point that may be invisible to the viewer (i.e., the vanishing point), the entire artwork will be infused with an extraordinary sensation of three-dimensionality that the other rendering techniques cannot match easily. As FIG. 10H shows, such an artistic technique is so strong but so subtle that an ordinary viewer may feel its impact without even recognizing the existence of the vanishing point. To find these traces of alignment, as FIG. 10I shows, one may extend some edge lines of the objects, e.g. roof, eaves, of the chapel (1009), . . . etc., and, by finding the lines of extension, one may further find where they are intersecting with one another (i.e., the two vanishing points VP1 (1011) and VP2 (1012), respectively). The above technique sounds like a historical art lesson to an experienced graphical artist, but note that those old masters did not find out that a perspective painting has many things to do with classifying the graphical vectors for the viewer's better comprehension. An electronic system knowing this can explore the rich information buried in a vast amount of graphical vectors. Referring now to FIG. 10I, we come to an understanding that it is the alignment of some of the profile lines that makes a perspective graphic rendering artwork look so realistic. It has everything to do with the reduction of the degrees of freedom of the profile lines. On the other hand, a state of art learning theorem only knows that reducing the degrees of freedom of a large number of vectors can help a viewer learn from the space constructed by those vectors, it cannot explain why a perspective graphic rendering artwork looks so realistic. For centuries, aligning some of the profile lines and aiming them at a vanishing point has only been considered as an element of finesse of the graphical artist. If one takes FIG. 10I to a scientist skilled in artificial intelligence, the scientist will realize that the above process of aligning the graphical vectors in a 3D scenery has to do with classifying the graphical vectors, but the scientist may not necessarily understand why a vanishing point can have such a powerful visualization effect. Fortunately we can understand that the apparent degrees of freedom of the objects presented by a 2.5D coordinate system are constantly changing in accordance to their relative distances to the vanishing point, and vanishing lines (e.g. $VL_{11}$ (1004), $VL_{12}$ (1005), $VL_{21}$ (1006), $VL_{22}$ (1007), . . . etc.) are the auxiliary features in a graphical rendering device that help reveal such a property most clearly. So, the present 3D GUI is a bridge between science and art. Take FIG. 10I as an example. As FIG. 10I shows, one may extend some of the profile lines (i.e., graphical vectors) denoting the roofs, eaves, . . . of the chapel (1009) to the respective vanishing lines VL$_{11}$ (1004), VL$_{12}$ (1005), VL$_{21}$ (1006), VL$_{22}$ (1007), . . . etc. When a plurality of vanishing lines are converging at a vanishing point, e.g. VP1 (1011) or VP2 (1012), without any understanding of physical laws, anyone could recognize that the 3D graphical rendering effect of the chapel (1009) is outstanding. From a physical point of view, this has to do with reducing the dimension of the feature vector space (i.e., a space constructed by the graphical vectors). Referring now to FIG. 10J, on this perspective sketching (which is a 2.5D coordinate system), one can discover that the roof line of the chapel (1009 in FIG. 10O can be represented by the graphical vector $\overrightarrow{GV_1}$ (which is a 3D vector projected on a 2.5D coordinate system; projection is an effective way to reduce the dimension of a vector space constructed by a plurality of graphical vectors without causing unrealistic distorting effect). Further, both $\overrightarrow{GV_1}$ and the graphical vector denoting the eave line, i.e., $\overrightarrow{GV_3}$, are aiming at a common vanishing point, i.e., VP2 (1012). Such an arrangement helps a viewer recognize that the two graphical vectors belong to the same object, i.e., the roof of the chapel (1009) in a rhombus formation, which is denoted by its four tips P$_1$, P$_2$, P$_3$, and P$_4$. From a physical point of view, the aiming process helps a viewer classify a plurality of graphical vectors into a unique group. Using the same technique, one may further recognize that $\overrightarrow{GV_2}$, $\overrightarrow{GV_4}$, and $\overrightarrow{GV_5}$ are all aiming at the vanishing point VP2 (1012). Based on the theorem of learning (e.g. "support vector machine", whose detailed description may be found in the literature), these graphical vectors are all pointing to a similar direction (i.e., $\overrightarrow{GV_1}$, $\overrightarrow{GV_2}$, $\overrightarrow{GV_3}$, $\overrightarrow{GV_4}$, and $\overrightarrow{GV_5}$); so they can be classified into a first group of graphical vectors. Still further, using the same technique, one may recognize that graphical vectors $\overrightarrow{GV_6}$ and $\overrightarrow{GV_7}$ can be classified as the second group; still further, graphical vectors $\overrightarrow{GV_8}$, and $\overrightarrow{GV_9}$ can be classified as the third group; still further, graphical vectors $\overrightarrow{GV_{10}}$, and $\overrightarrow{GV_{11}}$ can be classified as the fourth group; still further, graphical vectors $\overrightarrow{GV_{12}}$ and $\overrightarrow{GV_{13}}$ can be classified as the fifth group; still further, graphical vectors $\overrightarrow{GV_{14}}$ and $\overrightarrow{GV_{15}}$ can be classified as the sixth group in the associated feature vector space. Hence, classifying graphical vectors in accordance with the techniques of perspective sketching provides the present 3D GUI with an unprecedented level of comprehension of the viewer.

Theoretically, within a high caliber perspective graphic rendering device such as the present 3D GUI, there can be as many vanishing points as a digital graphical artist wants. As a rule of thumb, the more vanishing points, or the more vanishing lines a perspective graphic rendering means/ device has, the stronger the sensation of three-dimensionality provided by the graphical rendering effect will be, and this design rule (vanishing point helps classifying graphical vectors, thereby 3D objects) has never been exploited by any conventional GUI before. On the other hand, the above design rule has a limitation: when the degrees of freedom of the respective graphical vectors in a perspective sketch are reduced to a severely low level by too many vanishing points, some graphical vectors used for denoting certain features may be lost/distorted. When this occurs, a graphical artist has to make a compromise between further classifying and preserving the graphical vectors. An example is the window (1013) of FIG. 10H, which disappeared in FIG. 10I. When a 3D GUI classifies the graphic vectors of the roofs and eaves of the chapel (1009), as FIG. 10I shows, window (1013) becomes a decorative feature that can be removed from the scenery. Upon this situation, it is the judgment of the graphical artist to preserve the window (1013) or not, which may simply depend on the intended applications.

6.8 Key Components of the 3D Navigational Device and their Application to the 3D GUI This section briefly explains the key components of the 3D navigational device (202) in FIG. 2B which is fully disclosed as NU11-009, U.S. Ser. No. 14/294,369. Referring now to FIG. 2B, there is shown a vertical cross-sectional view of the navigational device (202) at its bottom left of FIG. 2B. As this cross-sectional view reveals, the 3D navigational device (202) comprises a cavity (212) which has an opening facing the reference surface (205); within the cavity (212) three light sources (represented as a group entity 213) are installed on its upper portion, each of which is configured for emitting light rays downwardly to illuminate said reference surface (205) in a wavelength range different than those of the others. The cavity (212) further comprises a color image sensor (214), also positioned on its upper portion, facing downwardly to the reference surface (205). On the sensor there is a plurality of pixels, each of which (not shown) is only sensitive to the light rays in one of the above wavelength ranges. On the upper surface of the navigational device (202), there also lies a gesture sensing feature (203). This feature is responsible for adjusting the gesture (e.g. tilting the plane of the carpet) of a 3D object (e.g. the flying carpet 201 in FIG. 2A) to be shown in the 3D GUI following the touching event with the finger (206) as shown in FIG. 2D. FIG. 11E shows an enlarged depiction of the gesture sensing feature (203) beneath a finger tip (1106). As FIG. 11E shows, the gesture sensing feature is a light diffusing surface (203; e.g. a Lambertian surface) that is mounted on a position of the mouse case (202) being touched by an operator's finger (1106). Underneath the light diffusing surface (203), three light sources (S1, S2, and S3) and one color image sensor (1118, denoted by a circle) are enclosed in a cavity (not shown here); special attention: this cavity is NOT the same one as cavity 212 of FIG. 2B); when said three light sources (S1, S2, and S3) emit light rays in different colors/wavelengths (i.e., red, blue, green, IR, or UV) simultaneously, the intensities of the respective light rays reflected from said light diffusing surface (203) varies from one geographic point to another. Together said reflected light rays reflected from said light diffusing surface (203) constitute a unique color gamut (e.g. CIE 1931 RGB, etc.). Note that there are a total of two color image sensors in the 3D navigational device (202), in which one image sensor (shown as 1118 in FIG. 11E) is facing upward to capture images from the inner side of the light diffusing surface (203), the other is facing downward to capture images from the reference surface 205 (i.e., this image sensor is 214). We now call the light sources shining downwardly to the reference surface (205) as the tinting light sources (i.e., 213); and we call the light sources irradiating upwardly to said light diffusing surface (203) as the gesture adjusting light sources (i.e., S1, S2, and S3).

FIG. 11E shows where the three gesture-adjusting light sources (i.e., S1, S2, and S3) are positioned underneath the light diffusing surface (203); lookout, in the former paragraphs of the present disclosure, item (203) is called a gesture sensing feature. When finger (206) is moved to a position close to S1, the intensity of the reflected light rays as is detected by the image sensor (218) largely complies with a unique relationship, i.e., $I_R > I_G = I_B$; by the same token, when the finger (206) moves to close to S2, the intensity of the reflected light as is detected by the image sensor (218) largely complies with another unique relationship, i.e., $I_G \gg I_R = I_B$; Still further, when finger (206) moves to S3, the intensity of the reflected light as is detected by the image sensor (218) largely complies with a third unique relationship, i.e., $I_B > I_G = I_R$. Through the analogue to digital converting (i.e., ADC) circuitry, said image sensor converts said intensities values ($I_B$, $I_G$, $I_R$) to digital signals, and then send the result to an electronic system (e.g. 200) via, for example, an RF channel or a USB cable, etc. As has been explained in the above, said digital signals are suitable for depicting the gestures of a 3D object. So, when such a gestural data (e.g. data originally acquired from CIE color index, etc.) is received by the presently disclosed 3D GUI, their values can be used to determine the values of a, b, and c of Eq. (7) accordingly. Through this process, as FIGS. 11A and 11B depict, the gestures of the object (1101A) and (11011B) appear differently. In further detail, per the mathematic equation (i.e., Eq. (1) explained in the above, said two gestures (1101A and 1101B) denote different planes in a 3D space (i.e., plane ab'c' vs. plane ab"c'). If one uses the other conventional pointing devices as an intention to generate similar effect (e.g. a rotational knob or a navigational device), the result would be nothing more than changing the address of a 3D object from, say, (x', y', z') to (x", y", z")—the gestural information is totally lost. From the above analysis, one comes to an understanding that gesture is a property embedded in all 3D objects.

Note that in the presently disclosed 3D GUI, Eq. (7) is not the only mathematical equation that can be used to depict the gesture of a 3D object. In practice, there are many other different mathematical equations that can be used to depict the gesture of a 3D object. Take FIG. 2A as an example, flying carpet (201) can now be considered as being positioned on an imaginary table with three legs (actually, this imaginary table is plane abc); the length of each leg is denoted by the intensities of the red, blue, and green light measured by the image sensor (1118). When finger (206) moves to different locations (e.g. close to S1, S2, or S3, etc.) on said light diffusing surface (203), the normal vector of said imaginary table shall be changed accordingly (e.g. $\vec{n}$ changed to $\vec{n}'$). The above stated imaginary table is only a fictitious feature brought up for easier illustration of the tilting (or rotating) condition of said flying carpet (201). If one uses a gust of wind in lieu of the imaginary table, then, as FIG. 2 shows, the flying carpet (201) now can "hover", or "sway" in a 3D space. For this situation, the mathematical equation used to depict the gesture of said flying carpet (201) can be changed to the other formation (i.e., different from that of Eq. (7)}. Still further, when the lighting condition of said S1, S2, and S3 light sources changes automatically (e.g. dimmed gradually, etc.), or the shutter speed of said image sensor covered by said light diffusion surface (203) is changed, or certain functionalities of said 3D GUI have been changed, then a unique gesture may be projected on said flying carpet (e.g. the trajectory of the flying carpet (1101C) per a circling movement of (1117A) between 3D navigational device (202) and tinted reference surface 205T is a 3D spiral 1117B)."

Note carefully, the presently disclosed 3D navigational device (202) can decide if the intensities of said tinting light sources (213) are referenced from those of said gesture adjusting light (S1, S2, and S3) or not. If yes, then the presently disclosed 3D navigational device (202) is capable of capturing a tri-colored (i.e., hue) image from the reference surface (205T, which denotes a reference surface 205 being tinted by some tri-coloration features), whose tinting condition can be manually adjusted by the finger (206). In further detail, in said image sensor (214), per the ways of allocating the sensitivity of each individual pixel to different wavelength (e.g. Bayer), three monochromatic sub-images can be extracted from one said tri-colored image, and the overall intensity (i.e., hue variation) of each of said sub-image is denoted by one of said reflected light, i.e., S1, S2, and S3. Thus, in a tri-colored main image as stated in the above, it bears the information pertaining to the translational motion vector (e.g. caused by the relative displacement of the microscopic particles on said reference surface 205 with the image sensor 214) as well as the one pertaining to the tilting (rotation) condition of an imaginary 3D plane (i.e., plane abc), in which the intensity of each of the respective light ray (e.g. red, blue, and green) denotes the intersection of said imaginary 3D plane with the X, Y, and Z axes of a coordinate system (see Eq. (12)).

6.9 how an Absolute Address Provides an Unprecedented Advantage when it is Acquired Directly from a Color Gamut Imprinted on a Reference Surface.

In section 6.1, we have explained that obtaining the absolute address from a navigational device directly is an effective way for a GUI to avoid accumulating positional errors. This section extends that discussion by explaining how a navigational device that provides an absolute address helps a user's hand motion become more transparent to the user's brain and the result can be used to provide an excellent teaching tool. When an operator uses a computer to create a visual effect requiring a high level of artistic skill or craftsmanship, the neural network including the operators's hand, wrist, elbow, and arm, etc., must work with their brain smoothly in order to accomplish the job in a professional manner. At first, the operator may only have a vague mental image of the object intended to be depicted. The subsequent process of fully delineating that virtual object and transferring it onto a medium (e.g. on paper, or on a displaying device associated with a touch-sensitive panel, or the like) is keenly affected by the learning process of that person's neural network. To shape a pattern or to define a trajectory of a motion in a more accurate and elegant way, an artist has to familiarize their hand gestures by repeated "rehearsals", and this can be done by maneuvering the present 3D navigational device (202) on its tinted reference surface (205T). When this is done, the navigational device is able to measure the absolute address repetitively, which is equivalent to the artist moving their hand in an absolute address coordinate system. During the course of this "rehearsal" (i.e., neural learning) process, the result of each movement of the artist's hand is evaluated by the presently disclosed 3D GUI in a real-time manner, thereby said process can be adjusted and gradually be improved to a professional level. In the past, this kind of task would be done by an operator using a sketch pad (e.g. this process is equivalent to sketching on a reference surface that has an invisible absolute address coordinate system); the conventional navigational device plays no role in this respect (in fact, in a broad sense, it is not only the conventional navigational device, but also all relative motion detecting devices, that cannot have a role in this respect). A human's neural network (e.g. the network of neurons in the finger, wrist, and arm, etc.) is an evolving structure; through repetitive learning processes, a unique finesse can be created. FIG. 9 shows an exemplary case of a person's signature (909). The strokes forming this signature denote a unique combination of that person's neural network that are unique to this person. In fact, this is one of the most unique features that Mother Nature endows on a human; other creatures in the world do not have the capability of creating a highly skillful work piece such as painting, writing, playing of music, weaving fabric, etc. Note that in order to practice a signing process reliably, an input device that is able to provide the absolute address is preferred. A conventional "quasi 3D" GUI does not know all this. For decades, absolute address and non-linear motions have been absent in the conventional navigational device; as a result, the above described hand-to-brain transparency is lost in a "conventional" GUI, and this may be considered as one of the contributing reasons for the stagnation of the computer industry in recent years. The genuine inherent creativity of a human neural network was sacrificed to the limitations of conventional input devices. With the presently disclosed 3D GUI, it is expected that the computer industry may restore the momentum of its growth for at least another decade.

In order to make the presently disclosed 3D navigational device (mouse) (202) one that can provide an absolute address, the reference surface (205) on which it moves has to be tinted by a means of tri-coloration (e.g. adding red, blue, and green colors to the reference surface by a chemical/physical means, producing a tinted reference surface as such is referred as item 205T in the present disclosure). The intensities of the reflected light from these three designated colors (e.g. red, blue, and green ingredients) vary in a continual manner along three directions (i.e., X, Y, and Z axes of a 2.5D coordinate system imprinted into said tinted reference surface 205T). When an operator moves the mouse body (202) on this tri-color reference surface (205T), the color index data (e.g. CIE 1931 RGB, etc.) measured by its color image sensor (214) serves as an ideal source of data for providing a 3D absolute address for the presently disclosed 3D GUI (e.g. X, Y, and Z) at unprecedented resolution and sensitivity.

Note carefully that the color index data acquired from the tinted reference surface (205T) actually forms a 2.5D coordinate system; when the color image sensor (214) is taking images from the color gamut, it facilitates a process of mapping said 2.5D coordinate system into the pixel array of said color image sensor (214). Using a circuitry (e.g. analogue to digital converter, etc.) to convert the color index value of each geographical point to positional values (e.g. x, y, and z of FIG. 2A), every geographical point on said color gamut can represent a unique set of 3D positional data. Hence, that tinted reference surface (205T) serves for the presently disclosed 3D GUI (207) as a source of 3D absolute address at unprecedented sensitivity and/or resolution.

There are many ways to tint the reference surface, e.g. applying illuminating light rays at different wavelengths to a reference surface is one way, dying the reference surface with inks/pigments is another. To dye or not to dye the reference surface (205), and how to choose a suitable means of dying, are the questions a GUI designer must answer when considering how high he/she would like the sensitivity or resolution of the GUI to be. In general, this question does not have to have a fixed answer; a GUI designer can make their own decision based on the final performance desired of the application. This decision has to do with the fundamental design of the navigational device (e.g. 202 and/or 205) as well. In a relatively relaxed situation, the reference surface (205) can be not tinted by the above stated methodology of tri-coloration; in such a case an arbitrary surface with no specific profile of coloration can be used. Per this product designing policy, a regular wood surface, or a marble surface, etc., would meet the purpose. Obviously, without tinting the reference surface by dyes/pigments, the sensitivity and/or resolution of said 3D navigational device (202) is a rough one as compared to that of the ones using said tinted reference surface (205T). An RGB mouse without a tinted mouse pad resembles that disclosed in Ser. No. 13/834,085. Note that without said tinted mouse pad, all the motion vectors that Ser. No. 13/834,085 provides are relative motion vectors instead of absolute address data. So, this kind of mouse literally cannot support the learning process of human's neural network (e.g. signing a signature using conventional navigational device is difficult). Nevertheless, compared to the performance of conventional navigational device (which only uses monochromatic light), the resolution and/or sensitivity of the RGB navigational device, i.e., that disclosed in Ser. No. 13/834,085, is still higher than that of prior art. For ordinary 2D documentation processes (e.g. Microsoft® WORD, etc.), such a feature may be good enough for job requirement.

In section 6.2, we have explained that treating a graphical object as a realistic entity instead of a mathematical point is one of the main features of the presently disclosed 3D GUI (207); it has to do with providing a complete set (i.e., 6 degrees of freedom) of motion vectors for the object. This complete set of motion vectors in fact comprises two kinds of rotational motions, i.e., gestural tilting and spinning (in the present invention, spinning denotes a mode of rotation that is intrinsic to an object itself rather than being caused by the relative displacement of two objects). In U.S. Pat. No. 9,733,727, we have disclosed the method of extracting the rotational motion vector from a "lumped" motion vector. Thus, U.S. Pat. No. 9,733,727 provides a powerful means for a GUI to adjust the perspective angle of a 2.5 D coordinate system. By saying 2.5D, we mean that it is a 2D coordinate system incorporating a separate rotational axis. The rotational motion vector provided by U.S. Pat. No. 9,733,727 can be used to adjust said separate rotational axis. When an object in a 2.5D coordinate system receives an instruction from NU11-007 (i.e., U.S. Pat. No. 9,733,727) to rotate, it can perform an autonomous action of spinning, or, it can perform a relative displacement with respect to the other object, i.e., rotating. In either case, a spinning or rotating motion can denote the H.O.T. (higher order term) of the motion of an object.

Note that the performance of the above stated 2.5D navigational device (202) is superior to that of its conventional 2D counterpart not only because it has an additional 0.5D degree of freedom. Formerly (e.g. section 6.6) we have stated that providing translational and rotational motion vectors for a 3D object simultaneously makes the presently disclosed 3D GUI a user engaging one. From physical point of view, this feature has to do with the "kinetics" of motion. When the motion of an object is extremely dynamic, buttressed up by the gestural sensing feature (203) and the capability of the image sensor (214) to detect rotation angle ω, the presently disclosed 3D navigational device (202) provides parameters a, b, c, and Θ for the presently disclosed 3D GUI (207) to provide translational and rotational motion vectors (i.e., tilting and spinning) for a 3D object simultaneously. Providing absolute address directly from a navigational device for a 3D object can further enhance the performance of the presently disclosed 3D GUI (e.g. reduce the transformation process that is originally needed for 2D navigational device). As of such, in the future, people in the professions that use finesse to perform their jobs (e.g. graphical artists, surgeon, etc.) may rely on the presently disclosed 3D GUI (207) to improve their professional performance.

FIGS. 11A, B, C, D, and E denote an example showing how the present 3D GUI manipulates the output data of the present 3D navigational device (e.g. the Z positional data of the flying carpet 201) based on certain embedded neural network functions. In this exemplary case, an operator moves the 3D navigational device (202) on said tinted reference surface (205T) in a circular manner (i.e., 1117A) while the intensity of one of the three light sources denoting flying height (i.e., Z axis) is changing concurrently (say, the light used to denote the z value of the coordinate system shown in FIG. 11A; per said embedded neural function, it is dimming while the navigational device (202) is moving), the trajectory of the 3D positional data converted from color index data (e.g. CIE 1931 RGB, which subsequently is converted into the absolute address of the flying target 1101C) would be somewhat like that of a 3D spiral (1117B). If one looks into FIG. 11D closely, the tinted reference surface (205T) is nothing more than a 2D plane (i.e., a plane that has no z value); all the motion vectors (e.g. $V_A$, $V_B$, $V_C$, $V_D$ of FIG. 11D) generated by the operator's hand are in 2D format (i.e., x, y). After the navigational device (202) has projected said three lights indifferent colors onto said tinted reference surface (205T), a color gamut is formed thereon; thereafter, each geographical point on said tinted reference surface (205T) can be denoted by a unique color index data (e.g. CIE 1931 RGB). Compared to tracing the whereabouts of microscopic particles, the presently disclosed 3D navigational device provides another feature, i.e., measuring 3D absolute positional data (X, Y, and Z) by way of tint measurement. Correspondingly, the motion vectors shown in the presently disclosed 3D GUI (i.e., $V_A'$, $V_B'$, $V_C'$, and $V_D'$ of FIG. 11C) are all in 3D format, and their respective values are not influenced by the accumulated positional errors, which is a fundamental advantage the presently disclosed 3D GUI over the relative motion detection device such as the conventional 2D navigational device. Extending the above product design philosophy, the process of dimming/enhancing an illuminating light (213) can be done by manually moving a finger (206) on the gesture sensing feature (203), or by activating a neural network function embedded in the presently disclosed 3D GUI (207), or by clicking an icon to begin an automatic process, etc.

6.10 Using the Presently Disclosed 3D GUI to Work with 2D Windows

This section demonstrates how the presently disclosed 3D GUI can work with a 2D window (e.g. Microsoft® WORD®, POWERPOINT®, EXCEL®, or, a web page, etc.). A window used by the conventional art is literally a 2D plane having its normal vector pointing in a fixed direction (e.g. normal to the surface of the displaying device, such as 1307 denotes); FIG. 13A schematically shows a practical situation described in the above. Alternatively, the presently disclosed 3D GUI may work with a plurality of such 2D windows (e.g. 1303 and 1304 of FIG. 13B) each with their respective normal vectors, e.g. $\vec{N}_{doc\_1}$, $\vec{N}_{doc\_2}$, etc., pointing to various directions; FIG. 13B shows a practical situation described as the above (i.e., multiple windows).

Referring now to window (1306) of FIG. 13A. As one may notice, the layout of said window (1306) is largely similar to that of state of art 2D application program (e.g. Microsoft® WORD, etc.). Meanwhile, there are several key features in the presently disclosed 3D GUI (207) that are different from those of conventional 2D GUI (e.g. 105). First, in accord with the fundamental design rule of the presently disclosed 3D GUI, said window (1306) is in effect a 3D object (i.e., a plane that has z values for all geographical points thereon) lying in a 3D coordinate system (1302). That is, every pixel in said window (1306) can be denoted by a unique 3D address (X, Y, and Z). Second, said window (1306) has a normal vector; in this case, it is denoted by a symbol (1307), pointing to an arbitrary direction with regard to the normal vector of the displaying device (207). Third, there is a world coordinate system (1302) in said 3D GUI, whose origin is denoted as point V in FIG. 13A; in graphical art, said origin point V denotes the vanishing point of a perspective sketch (i.e., the size of a graphical object will be looked bigger when it is placed closer to the viewer, and vice versa). Fourth, the cursor (209) is also a 3D object, e.g. it can be placed at a position between the two windows shown in FIG. 13B (i.e., 1303 and 1304); the cursor (209) can be tilted (i.e., it will have a pitch, yaw, and roll angle with respect to said world coordinate system 1302), and it is aiming at a 3D direction denoted by the dashed line (1305), hereinafter called the line of aiming. Fifth, the menu bar and title bar (1301), or the "widgets" (such as the scrolling bar, etc., they are not shown because there are too many varieties for this feature), is also a 3D object (e.g. a 3D plane in a slender formation), which has its normal vector pointing to a direction in said 3D coordinate system (1302). Putting all the above properties together, the presently disclosed 3D GUI is like a 3D manifold (i.e., a 3D motif) holding a plurality of silhouette/object together, each of which is denoted by a unique plane whose normal vector, corner points, size, or depth value, etc., are different from those of the others. For example, a 3D motif provided by the presently disclosed 3D GUI can be in the formation of a 3D spiral; this has not been achieved by any prior art before. Note that when the 3D cursor (209) is aiming at the window (1304), through the line of aiming (1309), it casts a point of intersection, i.e., $P_{1304}$, on said window (1304). When said 3D cursor (209) is moved by the presently disclosed 3D navigational device (202), said point of intersection $P_{1304}$ will be moved accordingly (e.g. from $P_{1304}$ (x', y') to $P''_{1304}$ (x", y")).Through that unique attribute, $P_{1304}$ can serve as a cursor/pointer for the window (1304). When the point cursor $P_{1304}$ appears in the window (1304), ordinary 2D window applications such as selecting a few lines of texts, drawing a circle, changing fonts, selecting icon, . . . etc. of a Word program can be implemented by the presently disclosed 3D GUI. In other words, the libraries built for the conventional 2D GUI such as Adobe's Display PostScript, Apple's Quartz, or the other programs having their functionalities similar to that of Display PostScript, can be compatible with the presently disclosed 3D GUI. This compatibility provides an extraordinary convenience for a GUI development engineer in that a toolkit developed for the presently disclosed 3D GUI only needs minor modifications (e.g. set the Z values of an XYZ coordinate to be a constant, such as zero) in order to extend its utilities to the conventional 2D GUI. The same situation happens on the other window (1303) as well, i.e., all the above stated features are essentially the same as those of application planes (1306) and (1304).

Note that there is an arrow shaped 2D cursor (1310) lying in the window (1304). As a means of affiliation, this arrow shaped 2D cursor (1310) always aims its tip at the point cursor $P_{1304}$; the arrow shaped 2D cursor (1310 is essentially a conventional feature, i.e., all it can do is allow the operator to find out where said the activated area of pixels (i.e., $P_{1304}$ (x',y')) is located at more easily. On the other hand, the arrow shaped 2D cursor (1310) carries all generic deficiencies of prior art. As has been explained with reference to FIG. 1A, a conventional 2D cursor (111) cannot make the activated area of pixels P(x,y) to rotate without referring to the location of the other objects; likewise, the 2D cursor (1310) cannot make said the activated area of pixels $P_{1304}$ (x',y') to rotate. In the presently disclosed 3D GUI the above deficiency can be compensated for by the fundamental features of the presently disclosed 3D cursor (209). As FIG. 13B shows, the tilting condition of the 3D cursor (209) can be denoted by a rotational plane$abc_{1304}$; we have learned from section 6.3, the values of the parameters a, b, and c of the rotational plane abc (1304) are determined by the gesture sensing feature (203). Adding the ability of detecting spinning motion of mouse body (202), as FIG. 13B shows, a full set of cursor maneuvering data for the 3D cursor (209) can be denoted by (x, y, z, a, b, c, θ). This means that the above stated activated area of pixels (i.e., $P_{1304}$) can be categorized either by a 2D positional data (x', y'), or a full set of 3D cursor maneuvering data (x, y, z, a, b, c, θ), or any derivation from said full set of cursor maneuvering data (e.g. first, second order differentiation by time, etc.). In essence, the activated area of pixels (i.e., $P_{1304}$) is being treated as an object rather than a mathematical point by the presently disclosed 3D GUI (207); this justifies the title of the present disclosure document, i.e., the presently disclosed 3D GUI (i.e., 207) is a pervasive 3D As is understood by a person skilled in the art, the sections of the present disclosure are illustrative of the present disclosure rather than being limiting of the present disclosure. Revisions and modifications may be made to methods, processes, materials, structures, and dimensions through which is made and used a 3D GUI that imparts linear and nonlinear motion vectors corresponding to different degrees of freedom of a 3-dimensional object to its basic graphical elements, such as pixels, voxels, or to a complete 3D maneuverable system such as a robot, by utilizing both color detection and pattern detection on a tinted planar reference surface, while still providing such methods, processes, materials, structures and dimensions in accordance with the present disclosure as defined by the appended claims.

I claim:

1. A system comprising:
  A main memory and at least one processor coupled to the main memory in a computer, a display system, an electronic system, or an electro-mechanical system, configured to present on a display device a three-dimensional graphical user interface (3D GUI);
  wherein said 3D GUI processes graphical and motional data using pervasive features of 2D/3D geographical relationship-aware artificial intelligence (AI);
  wherein said pervasive features of 2D/3D geographical relationship-aware artificial intelligence (AI) comprise a plurality of vertices, between which relationships and embeddings are calculated based on their absolute 3D addresses in said 3D GUI;
  wherein said 3D GUI is configured to allow maneuvering an object in a 3D space represented by said 3D GUI, by a motion of more than three independent degrees of freedom, said motion being characterized by either linear or non-linear motion vectors, or both; and
  wherein said 3D space is coordinatized by a 2.5D coordinate system wherein a single coordinate is held fixed in direction and serves to define an axis of rotation; and
  wherein a direction is chosen in a plane perpendicular to said axis of rotation to define a perspective angle and a vanishing point; and
  wherein said linear and non-linear motion vectors represent translational motion and various forms of rotational motion respectively and are generated by a single gestural motion of a 3D navigational device moving on a tinted reference surface, and wherein said 3D navigational device provides absolute three-dimensional coordinate values without an input of other motion detection devices being applied, wherein graphical vectors of said object are directly used as input signals of a pervasive AI process module.

2. The system of claim 1, wherein accuracy of a three-dimensional positional representation of said object remains constant during said maneuvering, said accuracy not being subject to accumulated errors in the positional accuracy of said 3D navigational device after said object has been maneuvered by said 3D navigational device through a distance that measures an absolute change in position of said 3D navigational device along the reference surface.

3. The system of claim 1, wherein said 3D space is represented by said 3D GUI, wherein said 3D space contains a predetermined vector field that is configured to combine with either of said motion vectors provided by said navigational device so as to constitute a new motion vector for said object, wherein magnitude and directionality of said new motion vector are different from those generated by the maneuvering action of said navigational device.

4. The system of claim 1, wherein the 3D space represented by said 3D GUI contains a plurality of two-dimensional planes, each of which denotes a unique application program including a transformation to a 2.5 dimensional coordinate representation or an AI feature that is configured to be activated or de-activated.

5. The system of claim 4 wherein activating or de-activating said two-dimensional planes requires a provision of at least one object configured for activating or deactivating said two-dimensional planes and having a linear and a non-linear motion vector, wherein said at least one object is a cursor.

6. The system of claim 1, wherein an essential property of a cursor or a physical object, is that either is denoted by a matrix of data instead of a single value defining or characterizing a mathematical point, wherein said essential property may not be related to a motion vector.

7. The system of claim 1 further comprising a layered configuration of separate software modules that are loaded partially or in whole into said main memory and are separately dedicated to providing perspectives and AI functionalities for generating robotic kinematics, wherein said software modules act separately or in a collaborative manner.

8. The system of claim 1, wherein said 3D GUI is configured to allow a user to interact with said object displayed therein or with a physical object controlled in situ by said computer, electronic system, or electro-mechanical system using an operating system loaded into said main memory, by means of said linear or said nonlinear motion vectors or both said motion vectors, wherein said linear or said nonlinear motion vectors or both said motion vectors are applied to produce e-motion of a graphical entity that is as small as a pixel or a minimal graphical unit of said 3D GUI, a voxel.

9. A system comprising:
  a main memory and at least one processor coupled to the main memory, in a computer, electronic system, or electro-mechanical system, wherein the coupled system is configured to enhance a user's experience of engaging with three-dimensional (3D) graphical scenery presented on a 3D graphical rendering device and comprising a plurality of 3D vector graphic objects each having a volume as a fundamental property;

a 3D navigational device configured for manipulating said 3D vector graphic objects;

wherein said system is configured to use said 3D navigational device to adjust a perspective angle of a 2.5D coordinate system embedded in said 3D graphical rendering device, wherein said perspective angle is an angle of intersection between X and Z axes in said 2.5D coordinate system, or an angle of intersection between X and Y axes in said 2.5D coordinate system; wherein said system is configured to enable an operator to visually classify a plurality of graphical vectors into different classes or to do such classification using an artificial intelligence functionality, wherein said graphical vectors are entities for constructing said 3D vector graphic objects, or are graphical vectors having characteristics of position vectors, motion vectors or both, wherein each of said different classes denotes a unique set of features associated with said 3D vector graphic objects, and wherein characteristics of each set of class features are different from those of other classes, wherein said process of visually classifying or classifying said graphical vectors using said artificial intelligence functionality produces a compromising condition at a specific perspective angle which said compromising condition is reached from an initial 3D position of a particular graphical polygon, followed by a series of operations on said particular graphical polygon simulating translational motion and rotational motion vectors of a world space camera viewing said graphical polygon from different perspective angles.

10. The system of claim 9, wherein said system is configured to engage interactively with the user through manipulation of said 3D graphical scenery, wherein said 3D vector graphical objects presented in said 3D graphical scenery are denoted by a plurality of nodes, wherein said nodes include vertexes, characterized by a 3D address having X, Y and Z components and 3D motion vectors in six degrees of freedom having $\Delta X$, $\Delta Y$, and $\Delta Z$, and $\alpha$, $\beta$, and $\gamma$ components, wherein said plurality of nodes are classified into multiple classes based on interactions between a cursor and said plurality of nodes.

11. A computer system comprising:
a display;
a memory;
a system of one or more processors, coupled to said memory, including one or more display servers;
a three-dimensional graphical user interface (3D GUI) projected on said display provided by said one or more display servers, said display comprising a layered configuration of executable software modules stored in said memory and configured to interact with said processors and to be executed by said processors, wherein said software modules include modules providing 2D/3D geographical relationship-aware pervasive AI functionalities configured for processing data provided in a form of graphical networks of vertexes and links, wherein at least one of said 2D/3D geographical relationship-aware pervasive AI functionalities calculates linking relationships (embeddings) between a plurality of vertexes forming a graphical network of vertexes based on their geometric relationships of absolute three-dimensional addresses, directions, angles of intersection and magnitudes of a plurality of graphical vectors in a 3D coordinate system, wherein a portion of said graphical network of vertexes and a portion of said graphical vectors constitute several subsets of said graphical network, said subsets denoting specific features of said 3D GUI and whereupon said 3D GUI is configured to establish regions, denoted windows, on said display wherein graphical objects can be displayed in a three-dimensional coordinate system or a 2.5-dimensional coordinate system, said graphical objects being represented by their absolute three-dimensional positions in said three-dimensional coordinate system or said 2.5—dimensional coordinate system and said graphical objects being maneuverable while observing rules of translation and rotation of three-dimensional kinematics for objects having at least three independent degrees of freedom and without loss of positional accuracy resulting from said maneuvering; and a 3D navigational device configured to operationally interact with said 3D GUI through an application interface (API) that contains protocols for cursor control, robotics, and neural network, and to provide said absolute three-dimensional positions for said graphical objects to be represented in said 3D GUI and, by causing said software modules stored in said memory to be executed, said graphical objects are caused to be moved on said display between said absolute three-dimensional positions and with at least three independent degrees of freedom while obeying the rules of translation and rotation of three-dimensional kinematics, wherein said graphical vectors of said graphical objects are directly used as input signals of a pervasive AI process module.

12. The computer system of claim 11, wherein said software modules include processor-readable, executable instructions to generate robotic actions, and to create graphical actions obeying laws of three-dimensional kinematics and perspective.

13. The computer system of claim 11 wherein said software modules are further operationally managed by a display server whereby functions generated by said software modules are properly displayed in said windows.

14. The computer system of claim 11 wherein said software modules include processing modules that separately control cursor maneuver, perspective manipulation, robotics, and machine learning processes.

15. A computer-implemented method for providing simultaneous engagement of a three-dimensional graphical user interface (3D GUI) with a plurality of 3D objects, said method initiated by a predefined movement of a 3D navigational device for a purpose of activating a status of a feature of said navigational device used for selecting/deselecting an event, wherein said predefined movement comprises following steps taken by a user:

causing a 3D cursor represented in said 3D GUI to move in a two-dimensional plane in a corresponding manner to motion of a finger by placing said finger on an operational portion of a top surface of said 3D navigational device, while said user is moving said 3D navigational device over a two-dimensional tinted reference surface, whereby a tilting condition of said plane in a three-dimensional space represented in said 3D GUI is controlled by a position of said finger with respect to said operational portion of said top surface of said 3D navigational device; then using a straight line linking first and second terminals as a diagonal line, while said user depresses a button or equivalent entry mechanism of said feature at a beginning of a movement, at said first terminal of said 3D navigational device moving over said two dimensional reference surface, and, while holding said button/feature depressed until said cursor has moved along said two dimensional plane over a distance and thereby reached a second terminal, as a consequence of a dragging and depressing event thereby said 3D GUI constructs a shape specified, size fixed, and location identified volume in a 3D space, allowing the user to select/deselect said plurality of 3D objects enclosed by said volume.

* * * * *

UNITED STATES PATENT AND TRADEMARK OFFICE
CERTIFICATE OF CORRECTION

PATENT NO. : 12,135,859 B2
APPLICATION NO. : 16/056752
DATED : August 7, 2018
INVENTOR(S) : Wen-Chieh Geoffrey Lee Page 1 of 1

It is certified that error appears in the above-identified patent and that said Letters Patent is hereby corrected as shown below:

In the Specification

In Column 2, Line 36-38, please replace "Au", "Av", "Ax" and "Ay" with "$\Delta$u", "$\Delta$v", "$\Delta$x" and "$\Delta$y".

In Column 23, equation 11, in the top line of the middle matrix, please replace "sin" with "-sin".

Signed and Sealed this
First Day of April, 2025

Coke Morgan Stewart
*Acting Director of the United States Patent and Trademark Office*